(12) United States Patent
Divo

(10) Patent No.: US 7,876,428 B2
(45) Date of Patent: Jan. 25, 2011

(54) METHOD AND A DEVICE FOR MEASURING THE POWER OF AN OPHTHALMIC LENS BY COMBINED FEELING AND CONTACTLESS OVERALL MEASUREMENT

(75) Inventor: Fabien Divo, Charenton (FR)

(73) Assignee: Essilor International (Compagnie Generale d'Optique), Charenton-le-Pont (FR)

(*) Notice: Subject to any disclaimer, the term of this patent is extended or adjusted under 35 U.S.C. 154(b) by 721 days.

(21) Appl. No.: 11/806,746

(22) Filed: Jun. 4, 2007

(65) Prior Publication Data

US 2007/0273870 A1 Nov. 29, 2007

Related U.S. Application Data

(63) Continuation-in-part of application No. PCT/FR2005/002915, filed on Nov. 24, 2005.

(30) Foreign Application Priority Data

Dec. 3, 2004 (FR) .................................. 04 12855

(51) Int. Cl.
*G01B 9/00* (2006.01)
(52) U.S. Cl. ...................................... 356/124
(58) Field of Classification Search ........................ None
See application file for complete search history.

(56) References Cited

U.S. PATENT DOCUMENTS

| | | | |
|---|---|---|---|
| 2,878,567 A * | 3/1959 | Hofman et al. ................ 33/28 |
| 3,332,320 A * | 7/1967 | Lueck ......................... 356/125 |
| 5,469,261 A | 11/1995 | Hellmuth et al. |
| 6,409,574 B1 * | 6/2002 | Shibata ........................... 451/5 |
| 6,568,990 B2 * | 5/2003 | Siders et al. .................... 451/5 |
| 7,661,819 B2 * | 2/2010 | Mazoyer ...................... 351/178 |
| 2003/0015649 A1 * | 1/2003 | Levecq et al. ................ 250/215 |
| 2007/0264915 A1 * | 11/2007 | Mazoyer ....................... 451/64 |

FOREIGN PATENT DOCUMENTS

| | | |
|---|---|---|
| EP | 0 822 440 | 2/1998 |
| EP | 0 877 241 | 11/1998 |
| FR | 2475222 | 8/1981 |
| GB | 1592112 | 7/1981 |
| JP | 07072038 A * | 3/1995 |
| WO | WO 2005015148 A2 * | 2/2005 |
| WO | WO 2006061474 A1 * | 6/2006 |

* cited by examiner

*Primary Examiner*—Tarifur Chowdhury
*Assistant Examiner*—Gordon J Stock, Jr.
(74) *Attorney, Agent, or Firm*—Young & Thompson

(57) ABSTRACT

A method includes a step of contactless optical measurement of the local value of at least one refringence optical characteristic of the lens over defined local zone around the measurement point of the lens, and at least one step of determining the axial position of the measurement point on one of the faces of the lens; the axial position of the measurement point obtained is compared with the local value of the optical characteristic of the lens at the measurement point as determined from the contactless optical measurement, in order to deduce therefrom at least one vertex optical power of the lens at the measurement point.

20 Claims, 32 Drawing Sheets

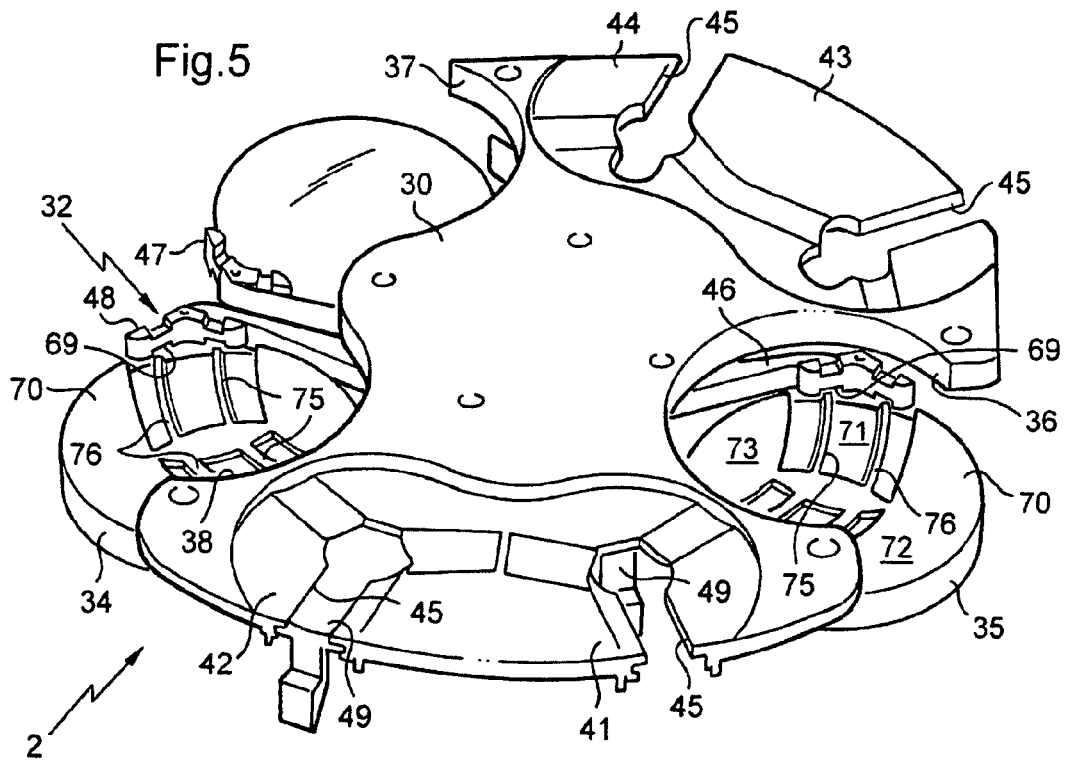
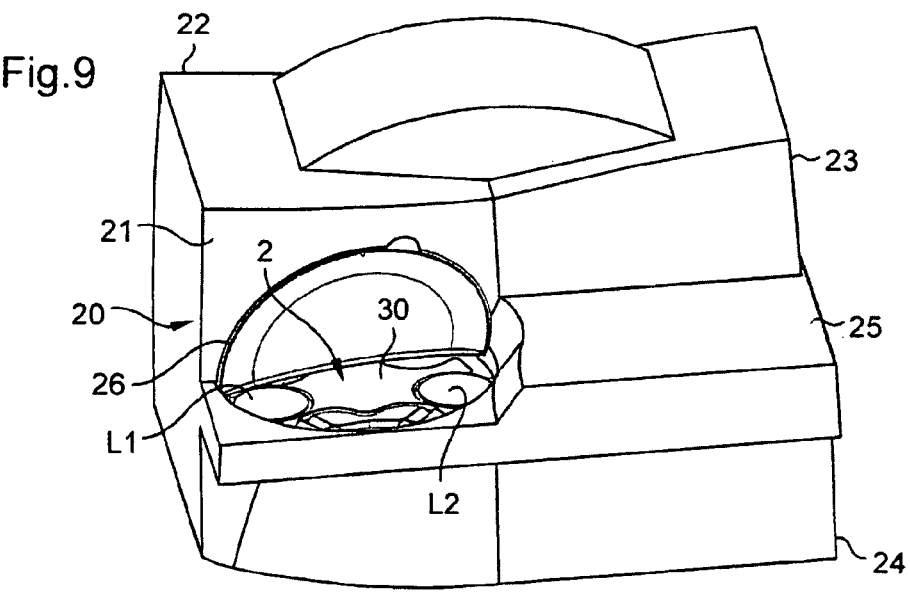

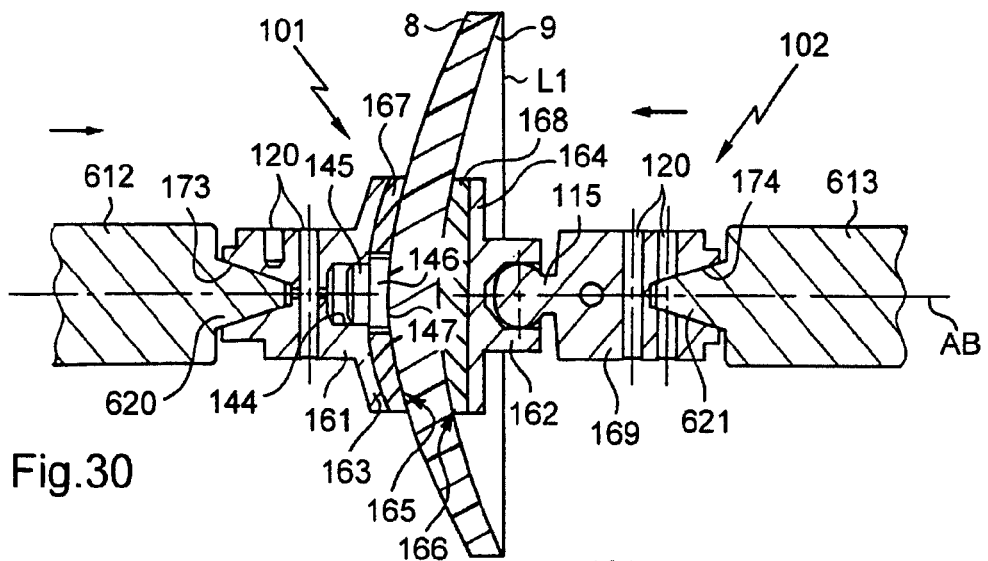
Fig.30
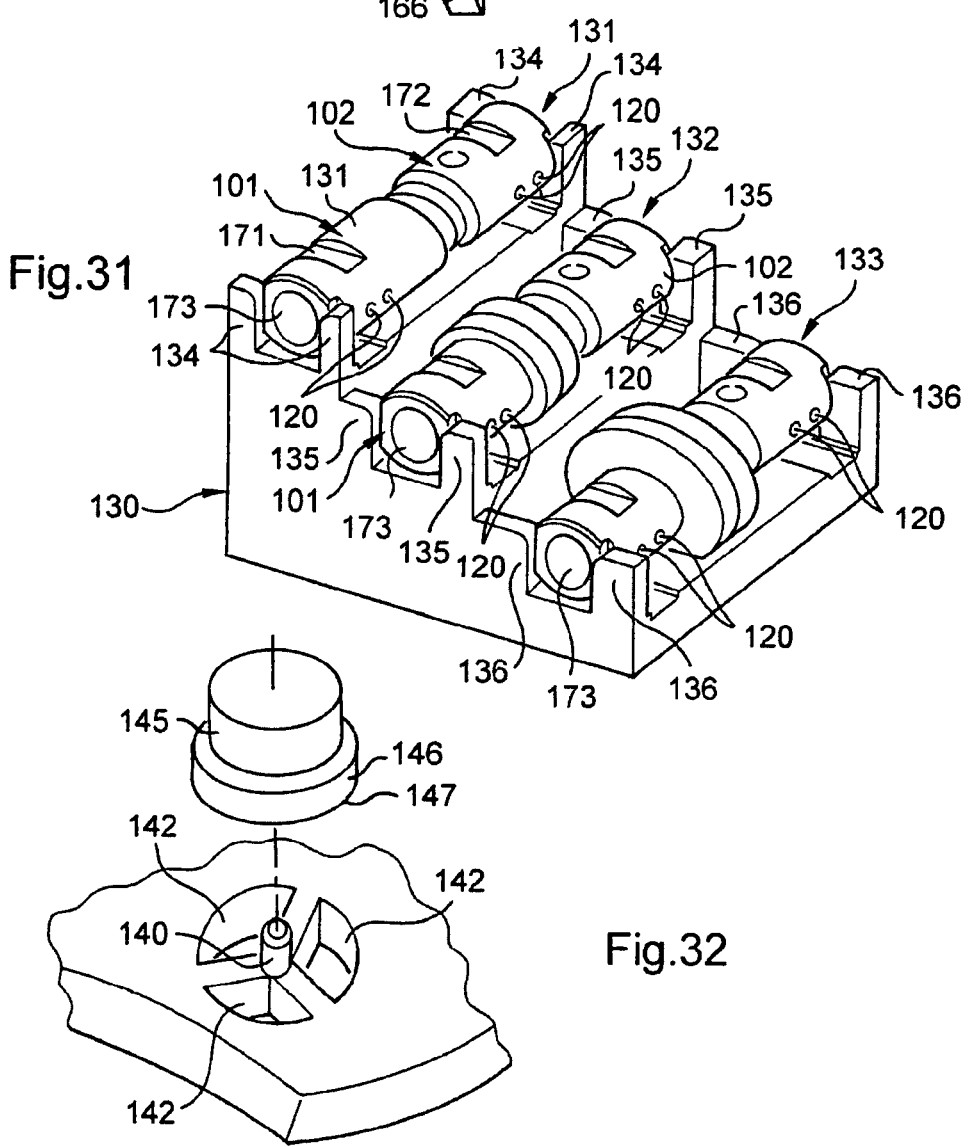
Fig.31
Fig.32

METHOD AND A DEVICE FOR MEASURING THE POWER OF AN OPHTHALMIC LENS BY COMBINED FEELING AND CONTACTLESS OVERALL MEASUREMENT

BACKGROUND OF THE INVENTION

1. Field of the Invention

The present invention relates in general to mounting ophthalmic lenses of a pair of eyesight-correcting eyeglasses on a frame, and it relates more particularly to a method and a device for preparing the lenses of a pair of eyeglasses for mounting on the frame selected by the wearer, and including means for performing an overall contactless optical measurement of a local optical characteristic of the lens, in combination with feeler means.

2. Description of the Related Art

Various measurement devices are known that operate either automatically, or manually, for measuring and detecting various characteristics of a single-vision or a progressive ophthalmic lens before or after it has been mounted on a frame, and in particular its power and centering or identification, and to do so without making contact, by performing optical analysis to produce an overall map. In particular, one such device is known from document FR-2 825 466 equivalent to US-2003/0015649 published on Jan. 23, 2003. In that kind of measurement device, the lens is presented between illumination means and analysis means in order to obtain a map of one or more of its optical characteristics. The optical map may be obtained by deflectometry (of the Hartmann, moire, etc. type) as in the above-mentioned document, or by interferometry, by wave propagation, etc. The user interface can then display not only the optical center or reference, but also maps of power and/or of powers and/or axial direction in one or more remarkable points of the lens.

The advantage of that type of contactless overall optical measurement device operating by mapping analysis lies in its flexibility in use and the way in which it can be automated.

However a major drawback of that kind of measurement device lies in its relative lack of accuracy, in particular when measuring local powers. Performance in terms of accuracy is clearly degraded, in particular in comparison with devices for performing localized measurements by means of an endpiece, of the frontofocometer type.

SUMMARY OF THE INVENTION

An object of the present invention is to propose a lens-measuring method and device that possess advanced functions for measuring local optical characteristics, and that offer simultaneously:

great flexibility and versatility in use, enabling local optical characteristics to be measured at any measurement point of interest on a lens and with any type of lens; and high measurement accuracy.

To this end, the invention provides a method of measuring the local power of an ophthalmic lens at a measurement point, the method comprising a step of contactless optical measurement of the local value of at least one refringence optical characteristic of said lens in a local zone defined around said measurement point of said lens, and at least one step of determining the axial position of said measurement point on one of the faces of the lens; the axial position of the measurement point as obtained is combined with the local value of the optical characteristic of the lens at the measurement point as determined from the contactless optical measurement, in order to deduce at least one vertex optical power of the lens at the measurement point.

The term "local" is used to mean that the zone measured and analyzed around the measurement point in question is of a size that is small compared with the diameter of the lens. In practice, such a local zone has a diameter or side of the order of a few millimeters (5 mm to 20 mm).

Once the point(s) of interest has/have been selected, the lens is felt at said point(s) to determine their positions. The feeling can be of any type that serves to determine the position of the measurement point under consideration, with or without contact.

The position obtained by feeling is then combined with the local value of the optical characteristic at the measurement point under consideration as obtained by the optical measurement, in order to deduce therefrom an accurate value for the ophthalmic power at each measurement point under consideration.

In an advantageous implementation, the optical measurement of the local value of the refringence optical characteristic of said lens comprises:

an overall optical measurement step during which the local values of the optical characteristic are measured at a plurality of local zones around a plurality of points of the lens, including the measurement point in question and other points;

a selection step of selecting the measurement point desired for the lens; and a deduction step of deducing the local value of the optical characteristic at said measurement point of the lens from the overall measurement.

The term "overall" measurement is used to mean that the lens is subjected to reading or detecting one of its optical characteristics at a plurality of points over a major fraction of its useful extent (typically a zone having a side or a radius of at least 20 mm) and not only in a local zone of small dimensions, as when measuring by means of a frontofocometer. The overall map of characteristics as sensed merely needs to be imaged, projected, or generated by any lighting means suitable for revealing the desired optical characteristic on the analysis means. It is necessary for it to be calculated, analyzed, displayed, or printed in full so as to make a complete map that is directly usable. It need not be made available in full to the user; the essential point is that the overall optical analysis image perceived by the analysis means enables at least one local value to be selected or extracted from one or more points of interest of the lens in a single analysis operation without moving the lens.

It will be understood that this combines several advantages:

the optical measurement is performed in a single operation, without moving the lens and without making contact therewith, and this is done at one or more arbitrary points over its extent, e.g. the reference points for far vision and for near vision; it suffices to present the lens between the illumination means and the analysis means in order to obtain overall analysis, possibly with a map, relating to one or more of its optical characteristics; and the ophthalmic measurement performed is very accurate.

According to an advantageous characteristic of the invention, the lens is received on a support prior to being felt with feeler means that are distinct from said support and that are movable relative to said support in at least one substantially axial direction of the lens. The term "substantially axial direction" is used to mean a direction that is parallel to an optical or geometrical axis of the lens, or in other words, a direction perpendicular to a mean plane of said lens. The feeler means are then advantageously also movable in a substantially transverse direction of the lens. The term "substantially transverse direction" is used to mean a direction perpendicular to the above-specified substantially axial direction.

According to another advantageous characteristic of the invention, the measurement point is felt on the rear face of the lens.

In a first implementation:
during said measurement step, the position of a focus of the lens at said measurement point is determined; and
the vertex optical power is deduced from the combination of the position of the measurement point as obtained by feeling and the position of the focus of the lens as determined by measurement.

In a second implementation:
during said measurement step, an approximate value is determined for a power of the lens at a measurement point of the lens; and
the approximate value for the power of the lens as obtained by measurement is corrected as a function of the position of the measurement point as obtained by feeling.

Advantageously, the axial position of the measurement point of the lens is the only geometrical characteristic of the measurement point of the lens that is used for determining the vertex optical power at said measurement point.

The invention also provides a method of automatically preparing an ophthalmic lens for mounting, the method comprising a measurement method according to any preceding claim and further comprising a step of blocking said lens on cutting-out means and a step of cutting out said lens, the feeling of said lens comprising a first feeling step prior to blocking said lens on the cutting-out means.

The invention also provides a device for measuring the local power of an ophthalmic lens at a measurement point, the device comprising contactless optical measuring means suitable for delivering a signal that is at least representative of the local value of at least one refringence optical characteristic of said lens at a local zone defined around said measurement point of said lens, and an electronic and computer processor system suitable for processing the signal delivered by the overall optical measurement means, and it comprises feeler means for feeling said lens and suitable for determining the axial position of said measurement point one of the faces of the lens, the electronic and computer processor system includes calculation instructions for combining the axial position of said measurement point obtained by feeling with the local value of the optical characteristic of the lens at the measurement point as determined by the electronic and computer system on the basis of the signal delivered by the overall optical measurement means, to deduce therefrom at least one optical power of the lens at said measurement point.

In an advantageous embodiment, the optical measurement means are suitable for delivering a signal representative of an overall optical measurement, having local values of the optical characteristic over a plurality of local zones around a plurality of points of the lens, including the measurement point under consideration and other points, the electronic and computer processor system being suitable for processing the signal delivered by the overall optical measurement means to select the desired measurement point of the lens to deduce from the overall measurement the local value of said optical characteristic at said measurement point of the lens.

Advantageously, the device further includes a support for receiving the lens, which support is distinct from the feeler means, said feeler means being movable relative to the support in at least one substantially axial direction of the lens.

The feeler means are then advantageously also movable in a substantially transverse direction of the lens.

Finally, the invention provides a device for automatically an ophthalmic lens for mounting, the device comprising a measurement device according to any preceding claim and further comprising:
cutting-out means for cutting out said lens and including blocking means for blocking said lens; and
transfer means for transferring said lens and arranged to move said ophthalmic lens between at least two distinct positions, including a measurement position presenting said lens in register with the measurement means, and a cutting-out position for cutting out said lens on the cutting-out means.

The electronic and computer processor system is designed to control the measurement means, the feeler means, the cutting-out device, and the transfer means in coordinated manner for automatically processing said lens.

The feeler means are distinct and independent of the cutting-out means and are arranged to perform a first feeling operation on said lens in an intermediate position that is distinct from its cutting-out position.

BRIEF DESCRIPTION OF THE DRAWING FIGURES

The following description with reference to the accompanying drawings of an embodiment given by way of non-limiting example makes it possible to understand clearly what the invention consists in and how it can be implemented.

In the accompanying drawings:

FIG. 5 is a perspective view of the carousel and the seats forming the reception and first and second transfer means;

FIG. 9 is a view similar to FIG. 3, two first ophthalmic lenses L1, L2 (or first job) of a first pair of eyeglasses being shown loaded on the reception and first and second transfer means, so as to occupy two loading locations that are separated from each other by two unloading locations;

Figure 19:
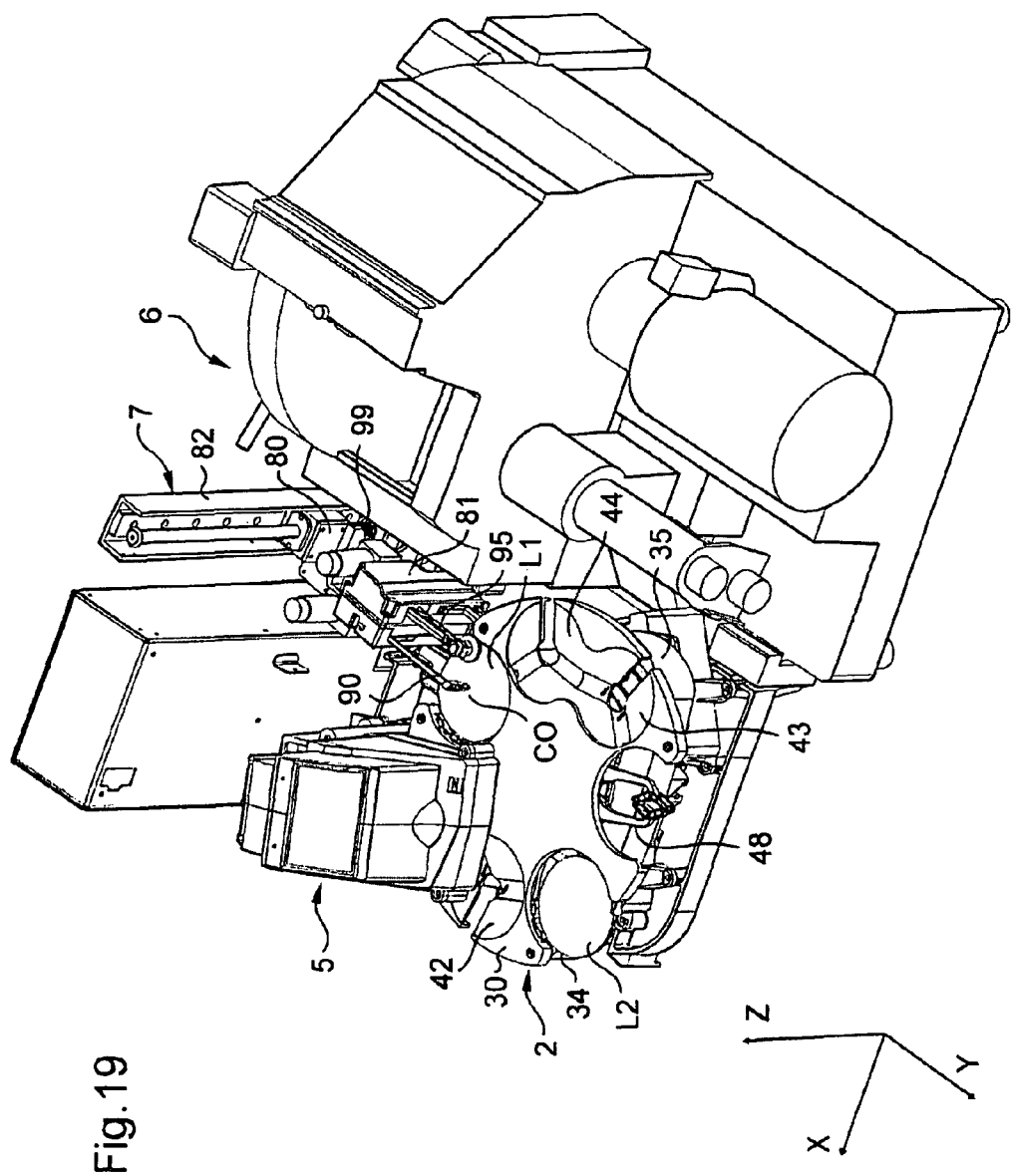
Figure 20:
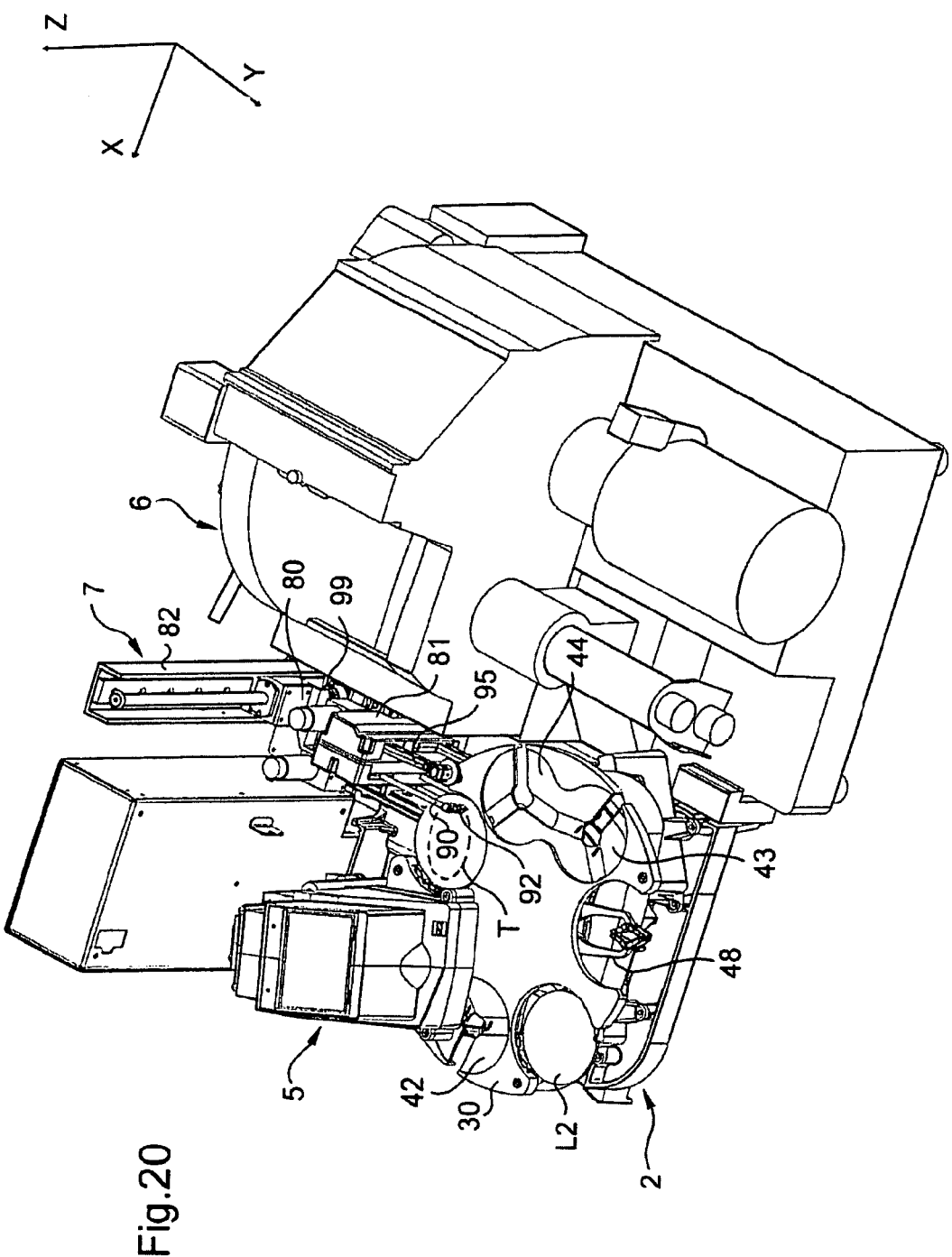
Figure 21:
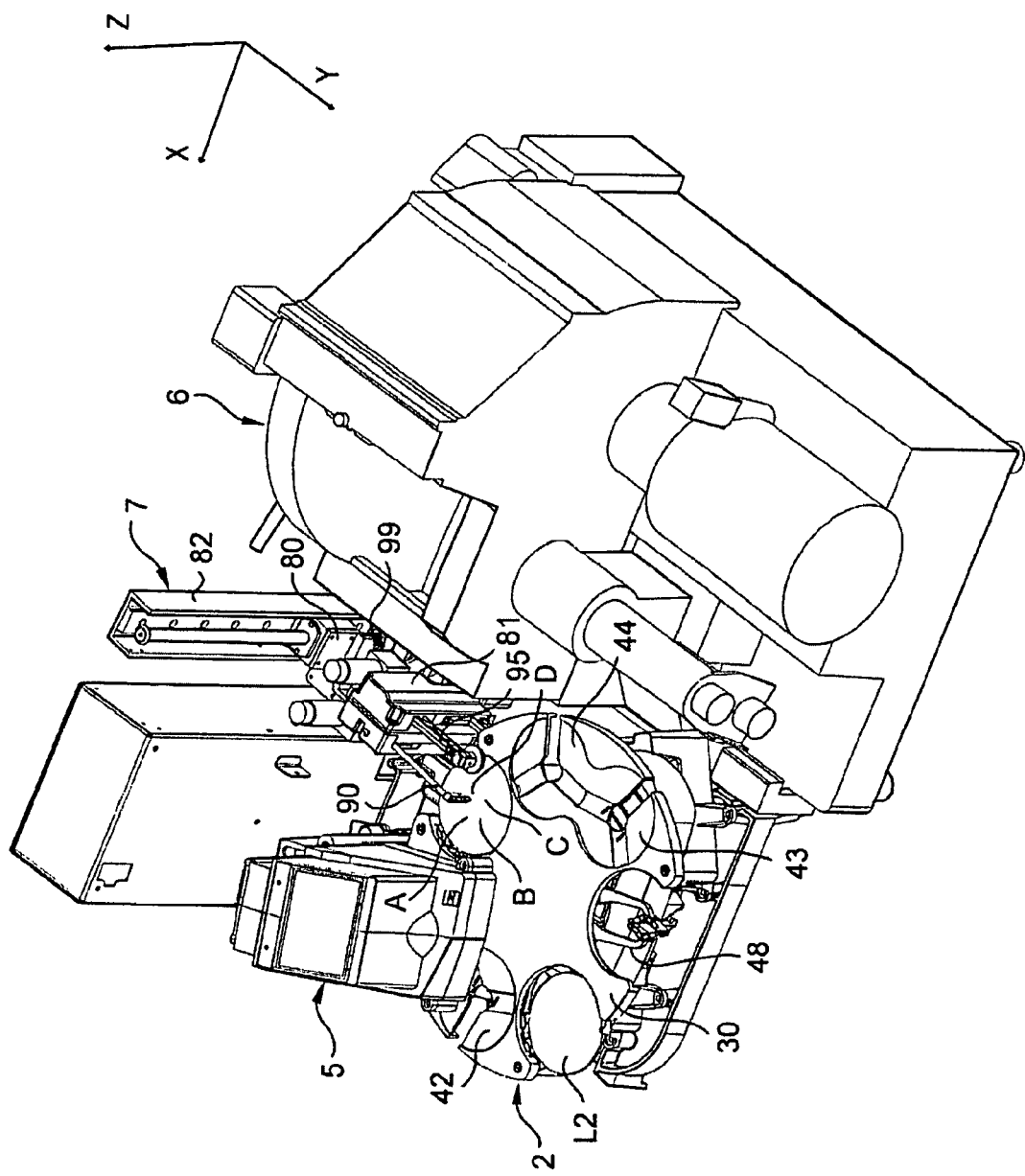
Figure 22:
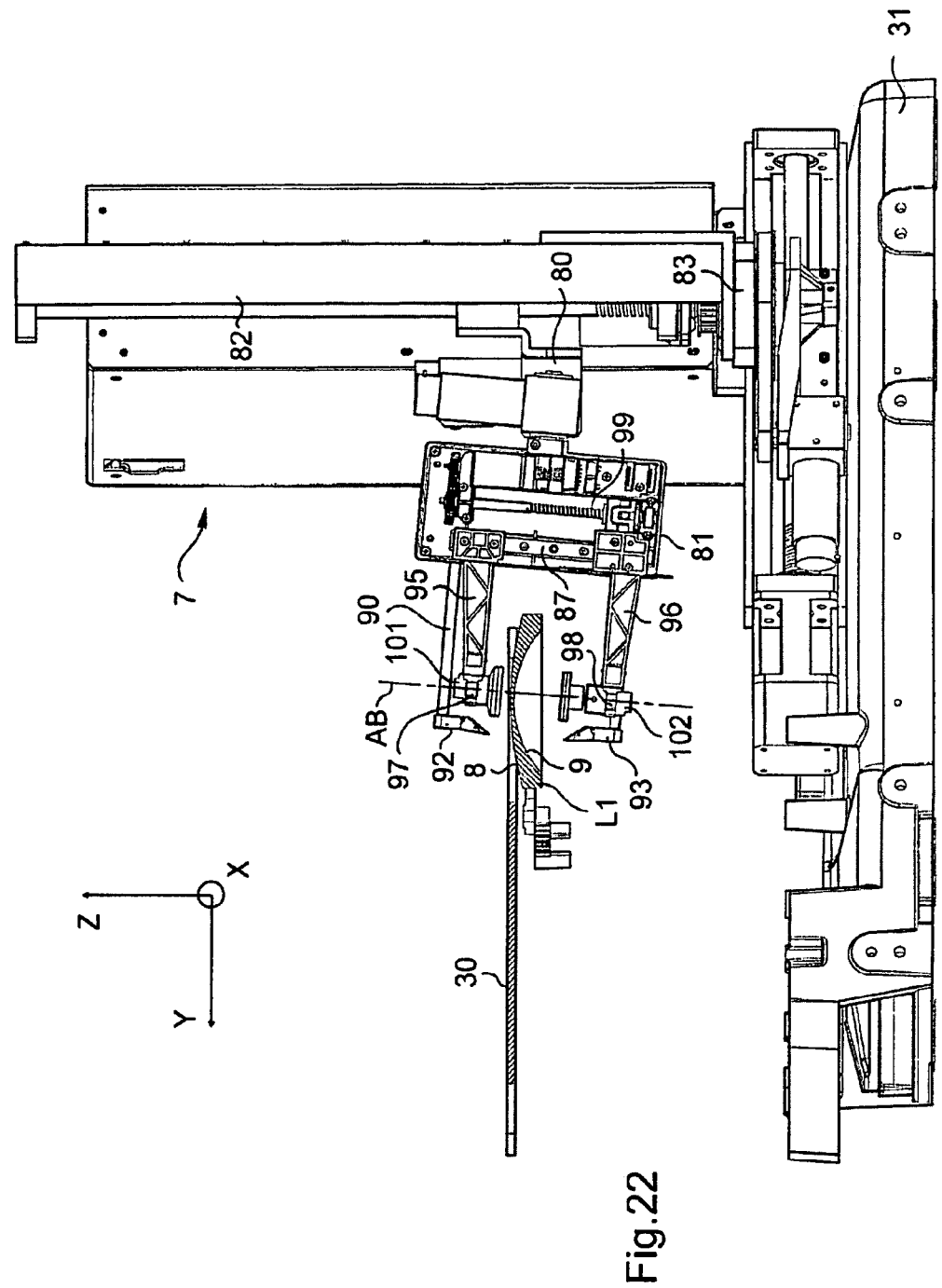
Figure 23:
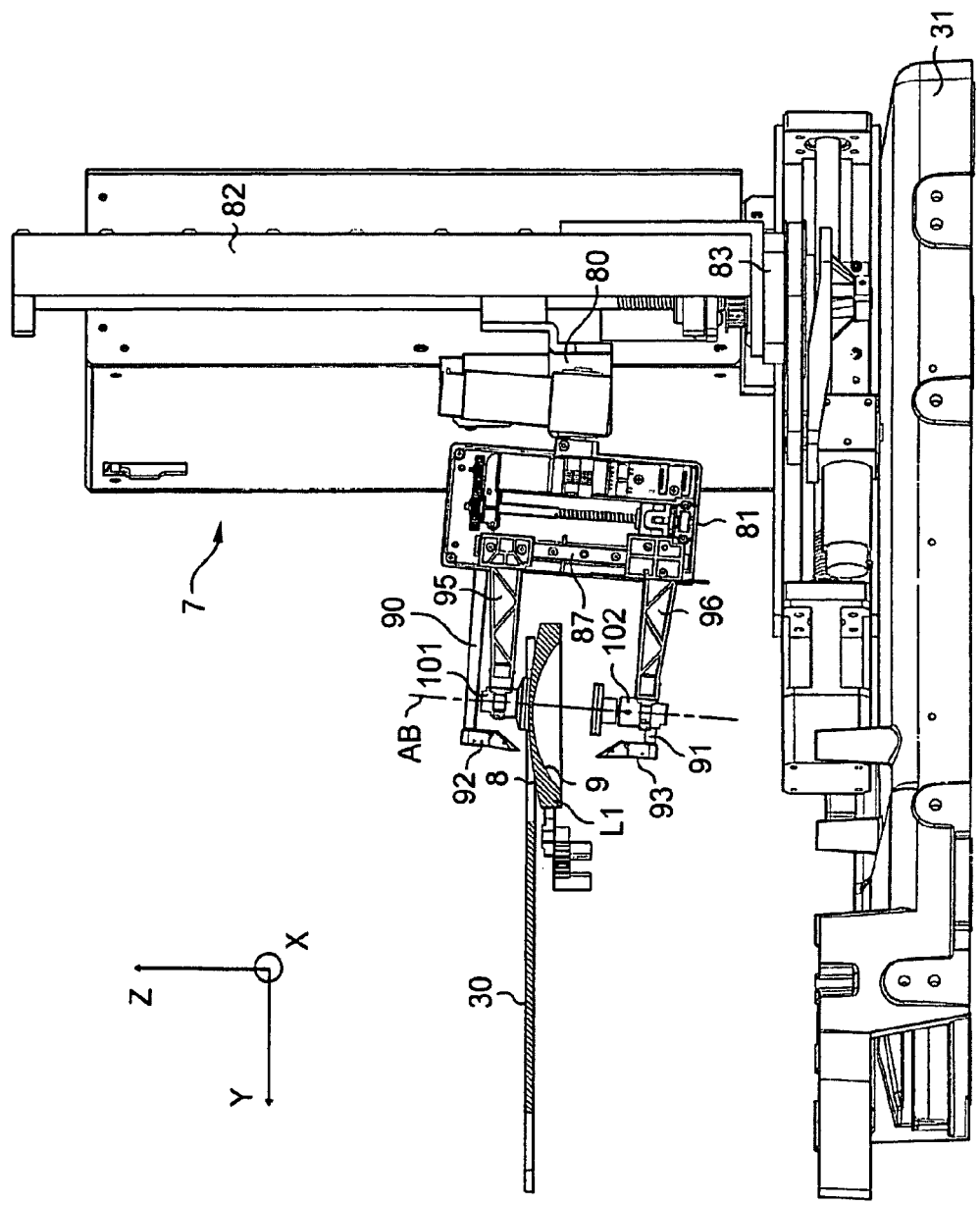
Figure 24:
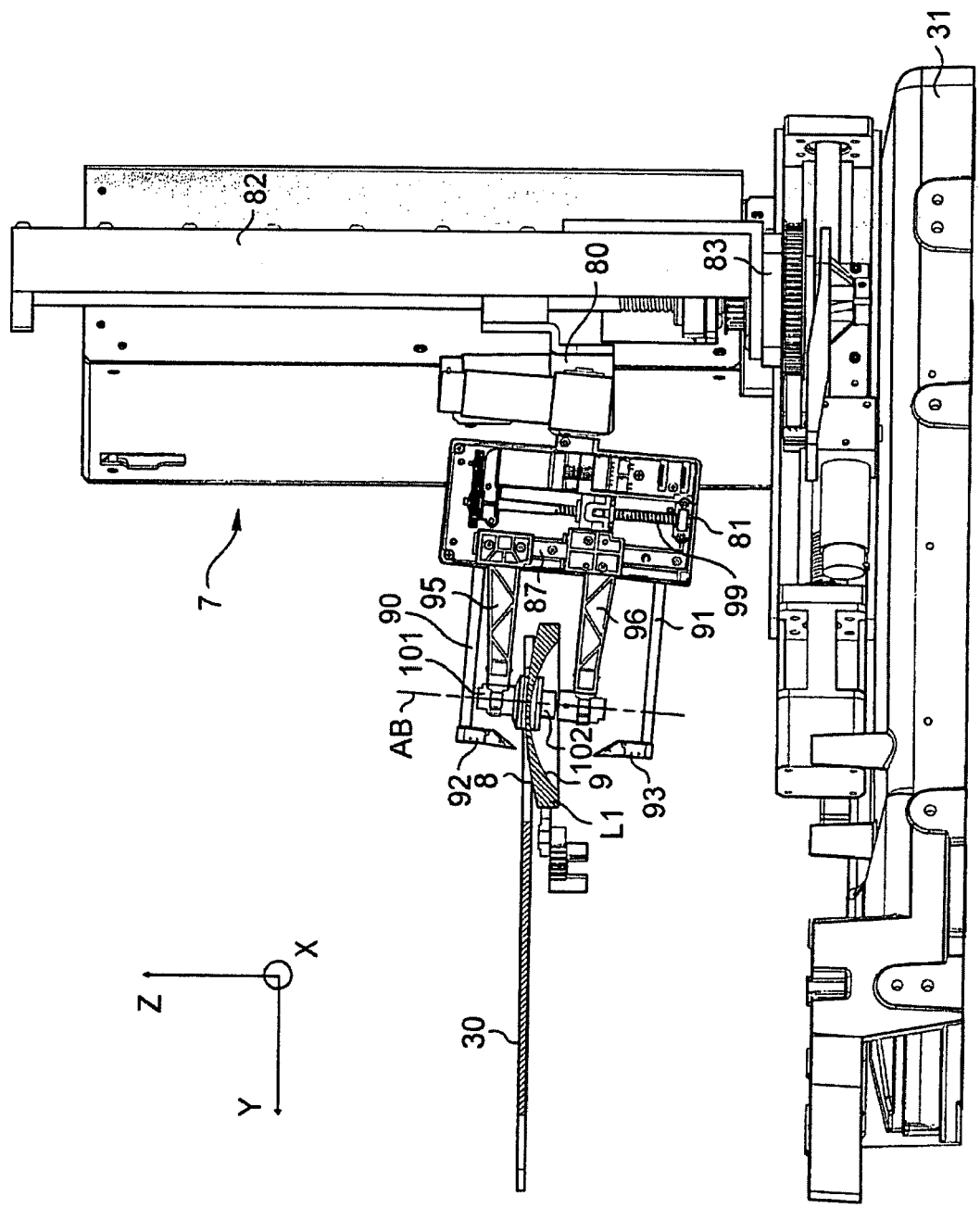
Figure 25:
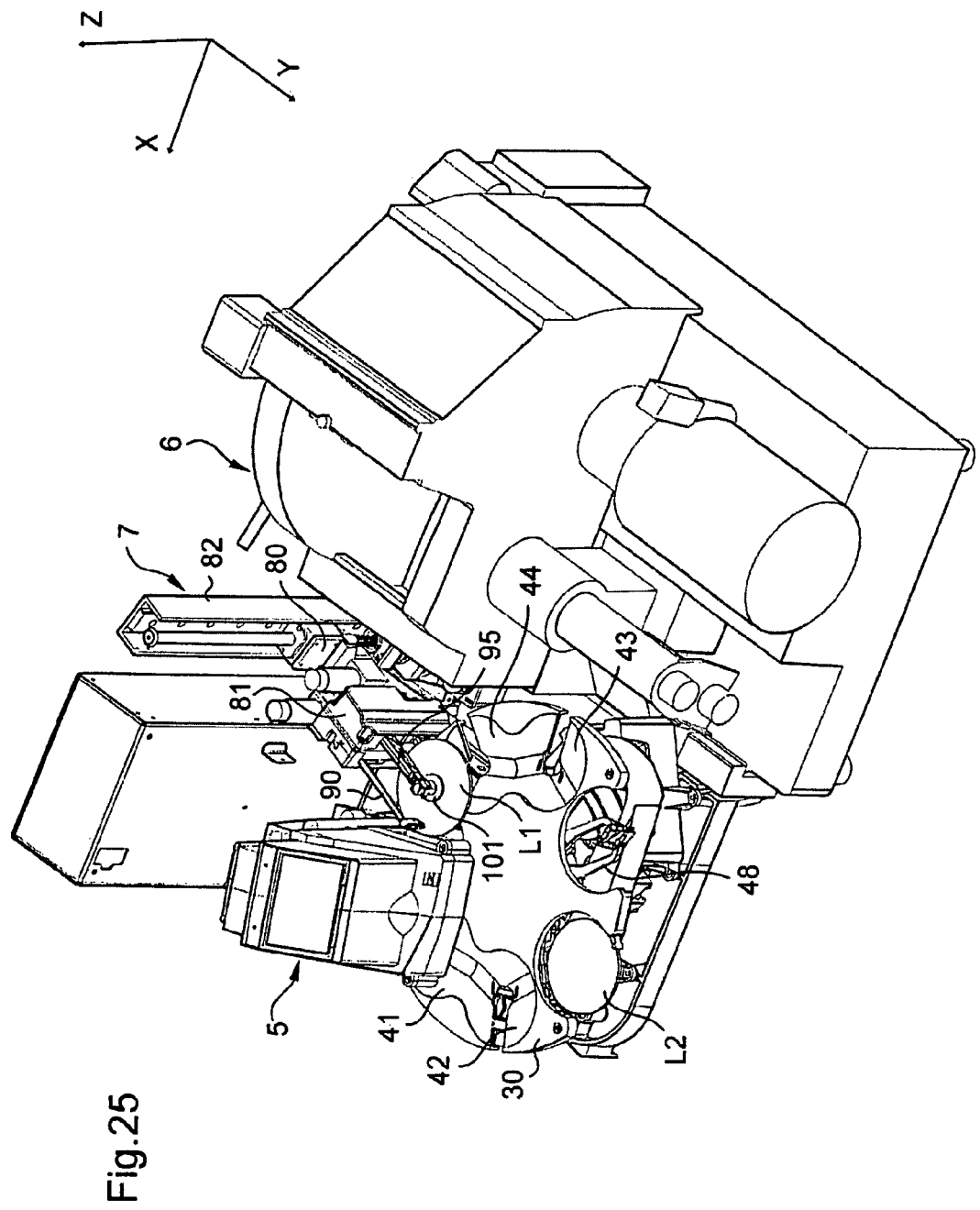
Figure 26:
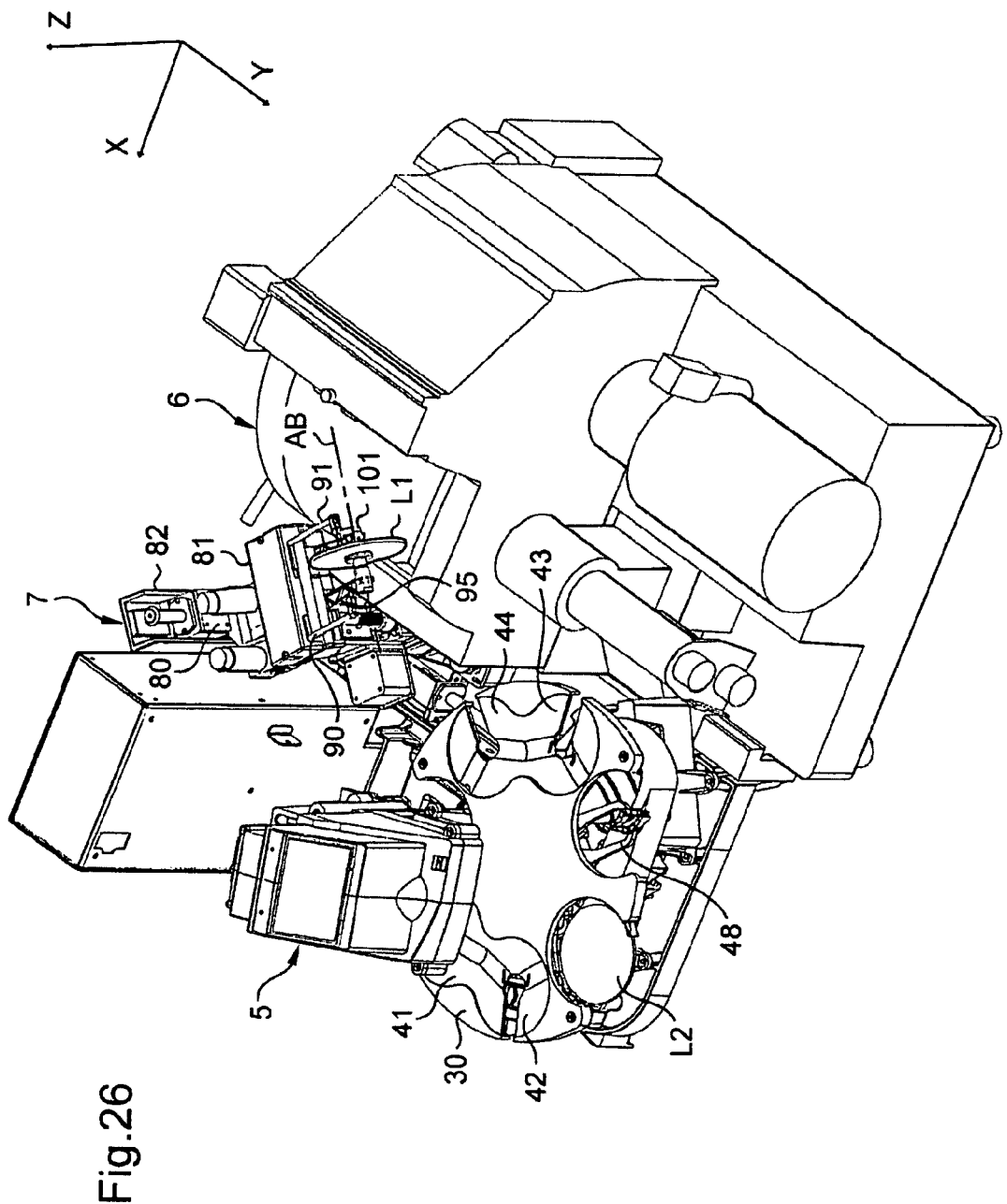
Figure 27:
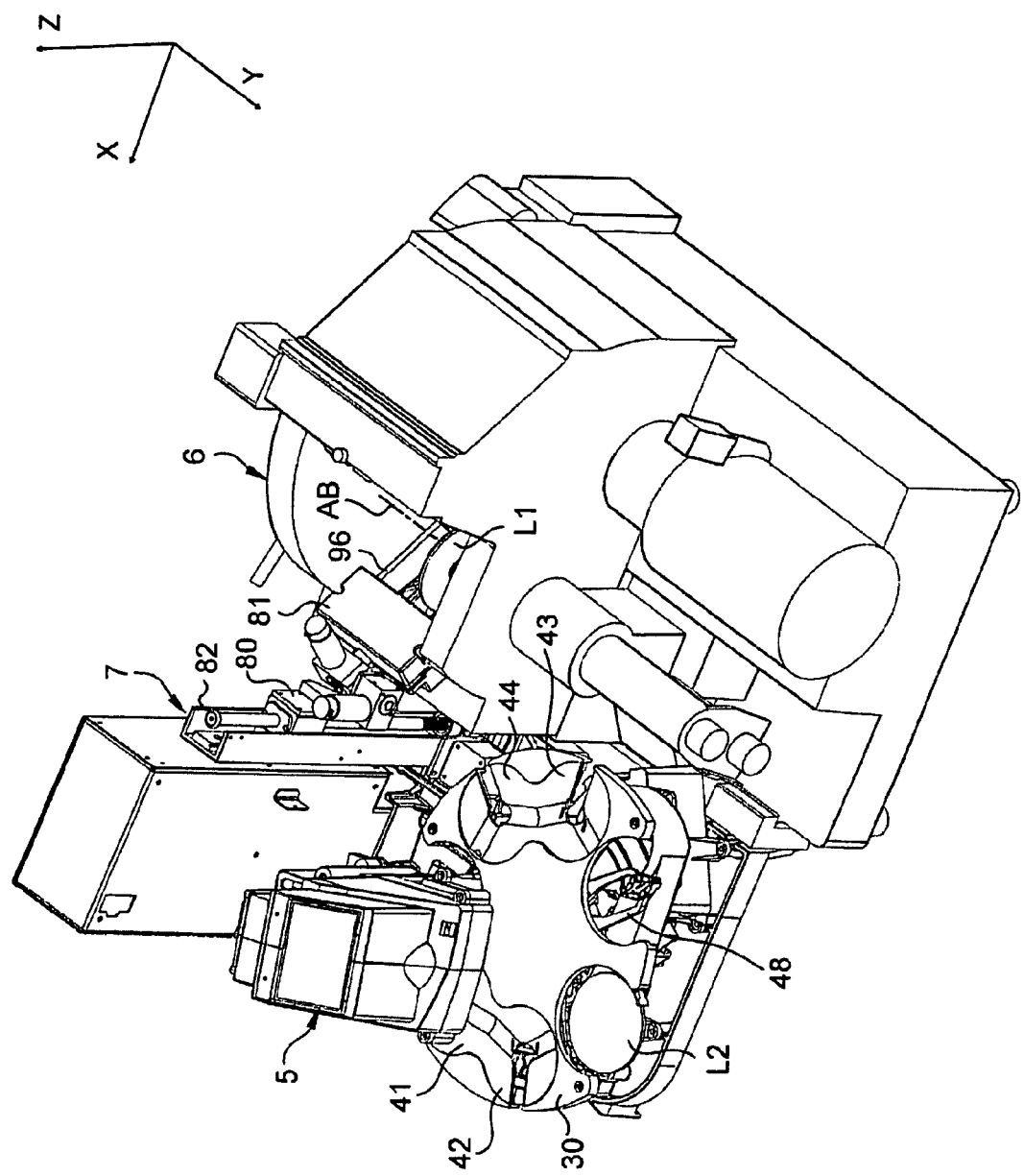
Figure 28:
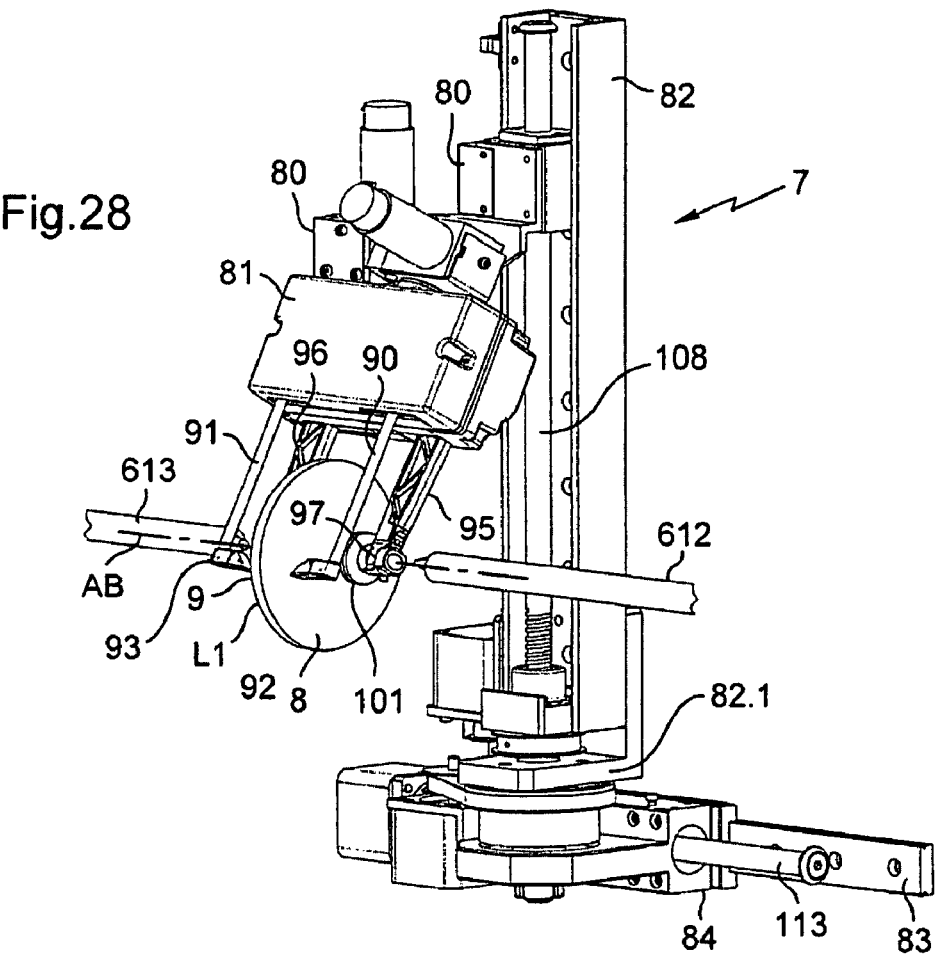
Figure 29:
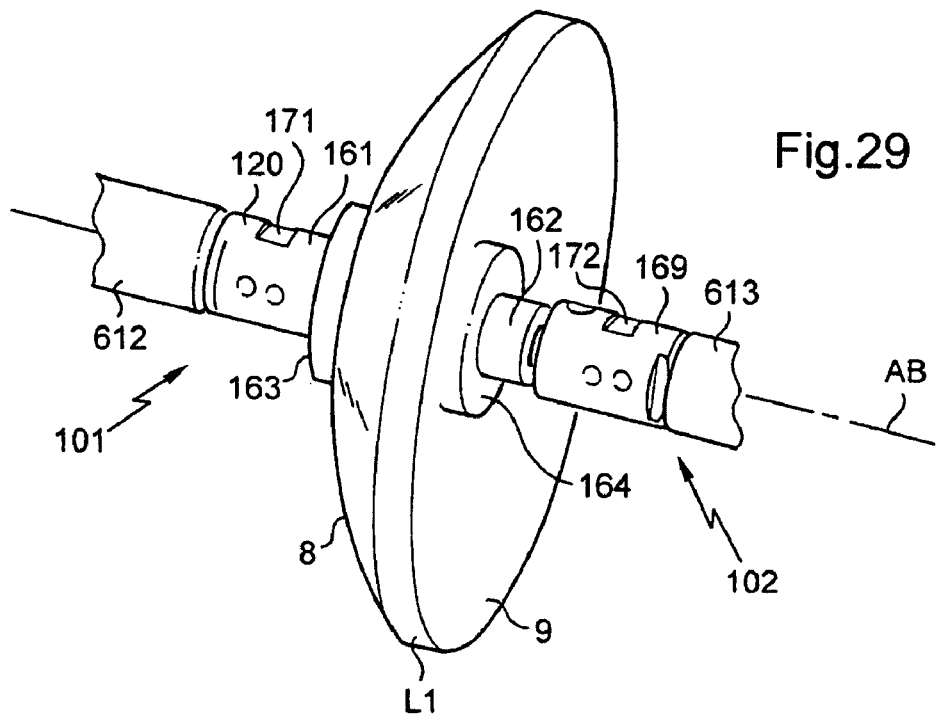
Figure 33:
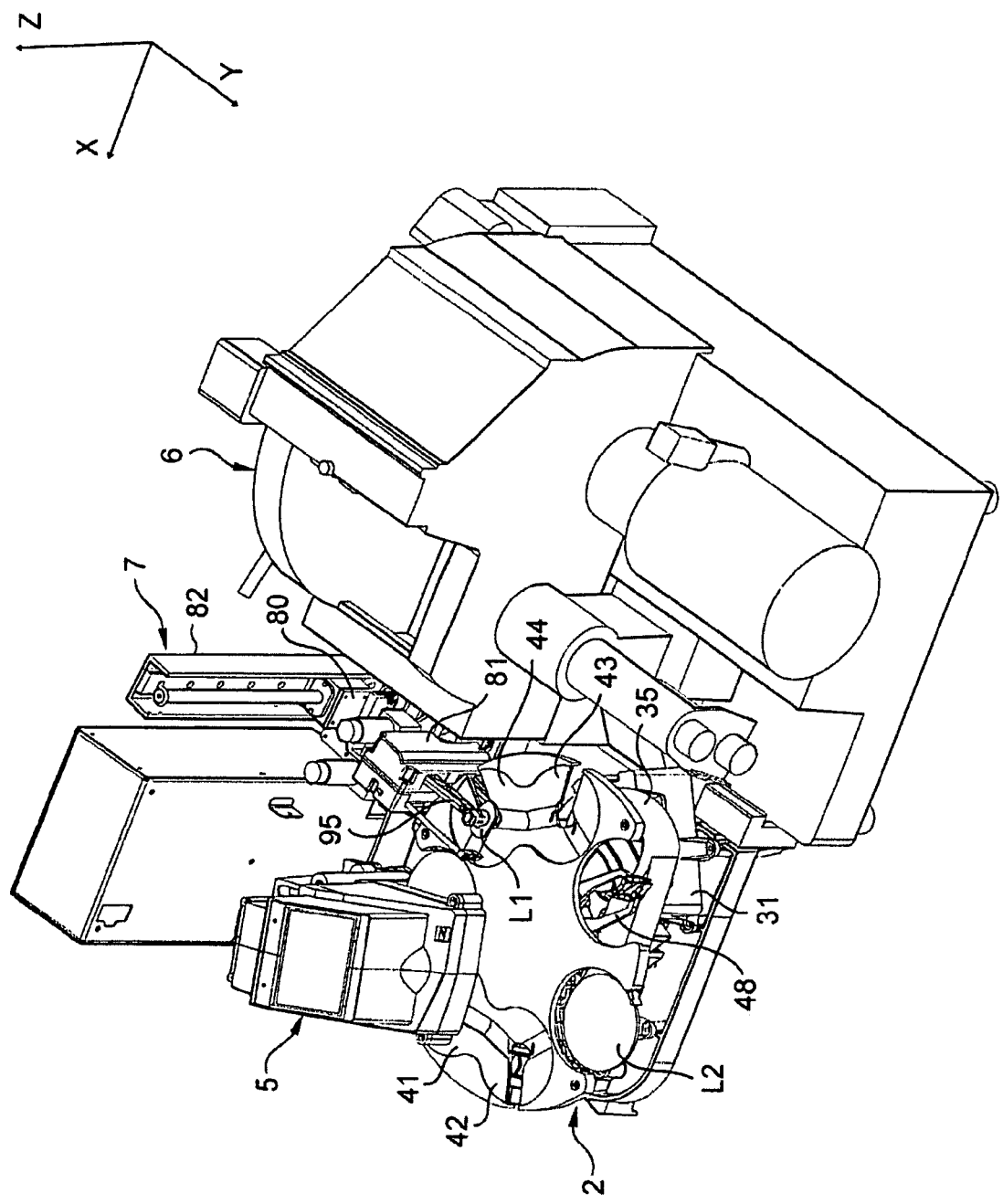
Figure 34:
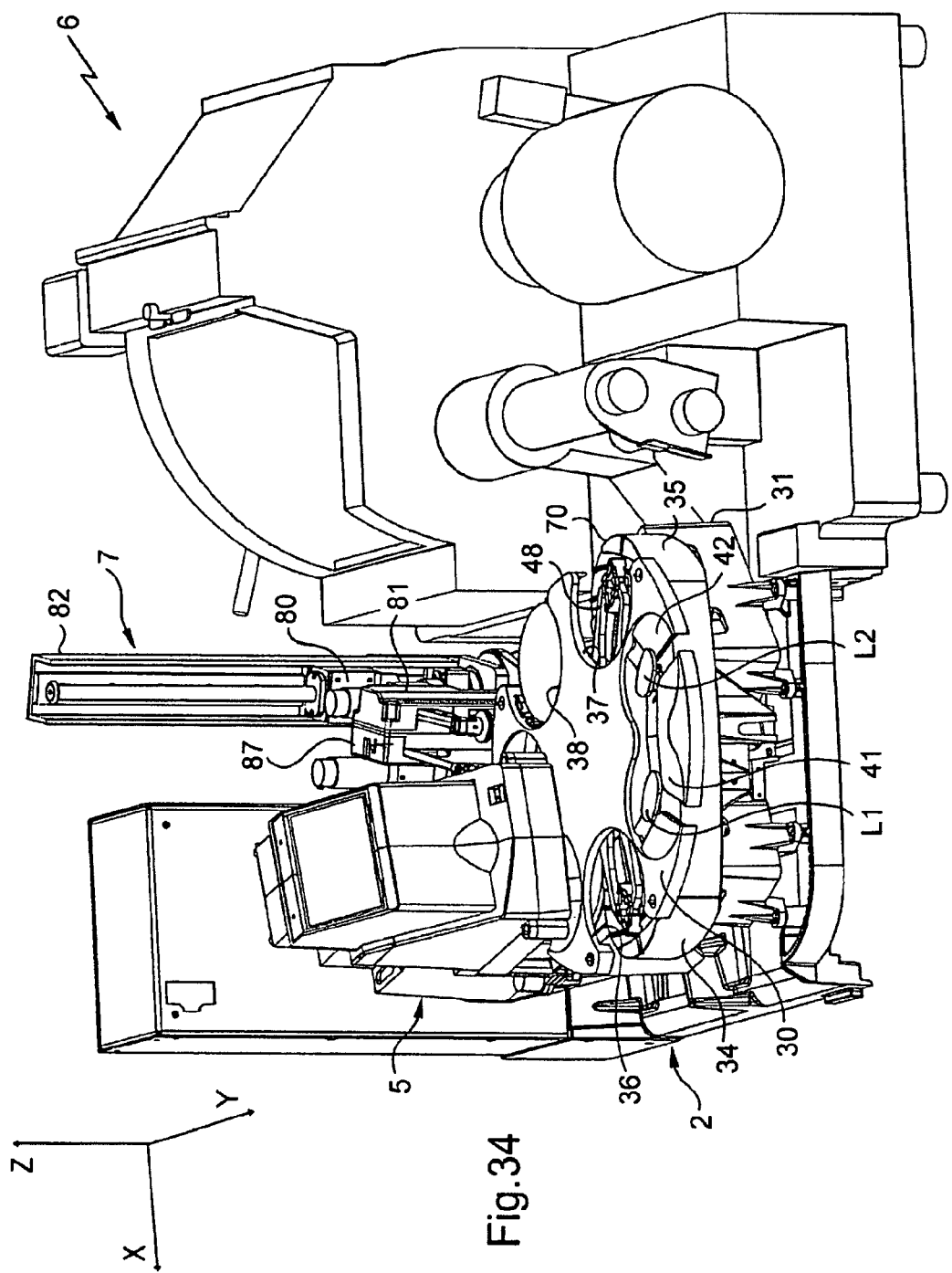
Figure 35:
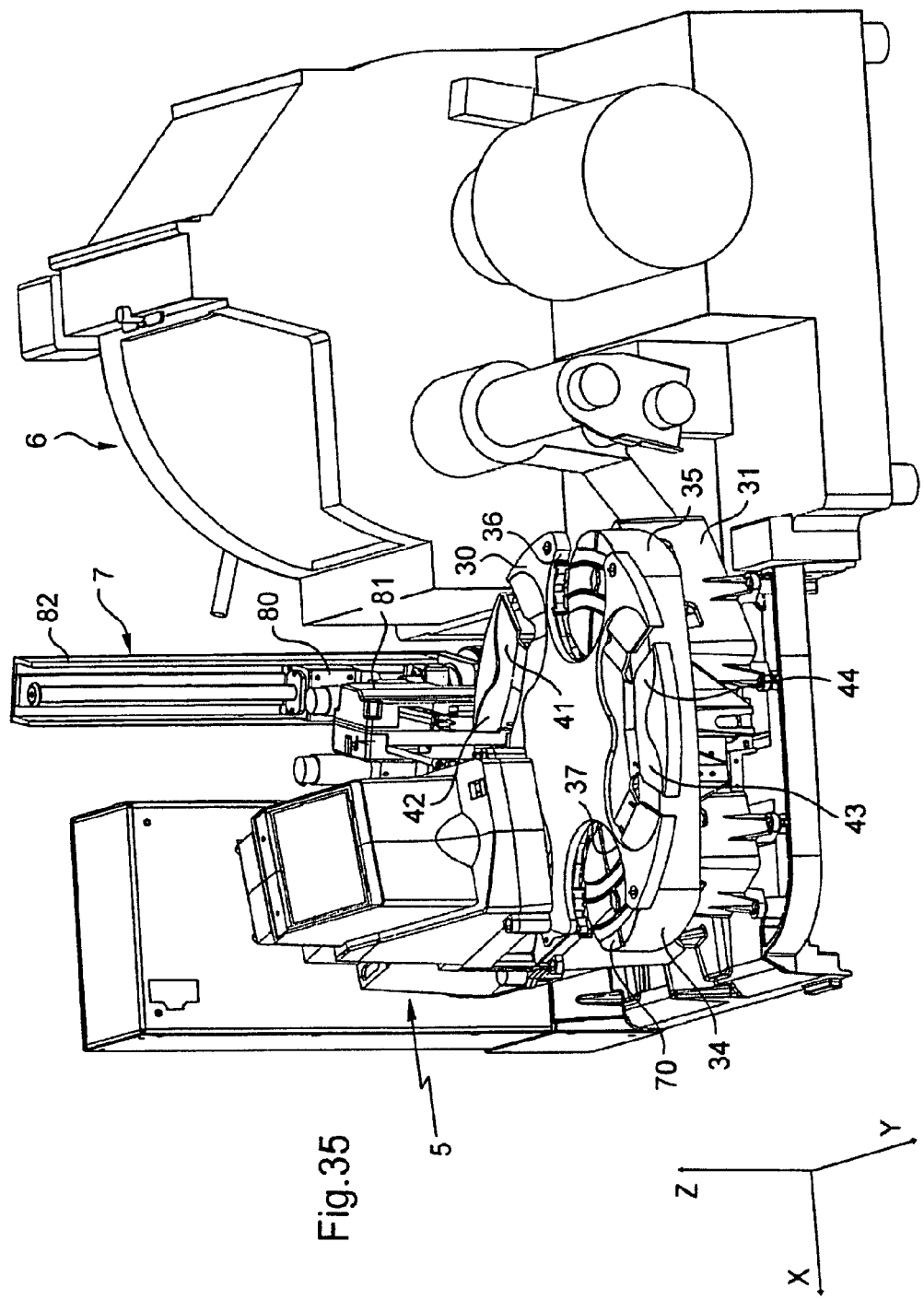
Figure 36:
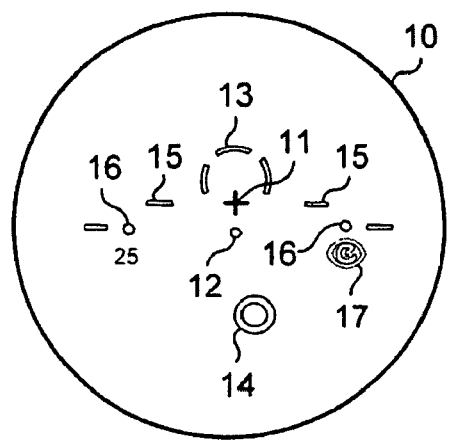
Figure 37:
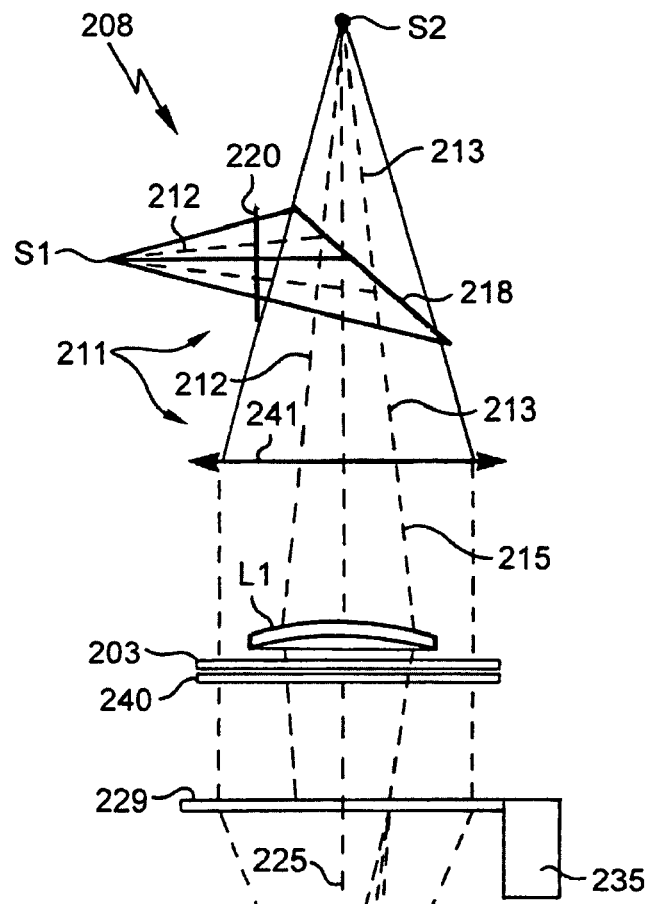
Figure 38:
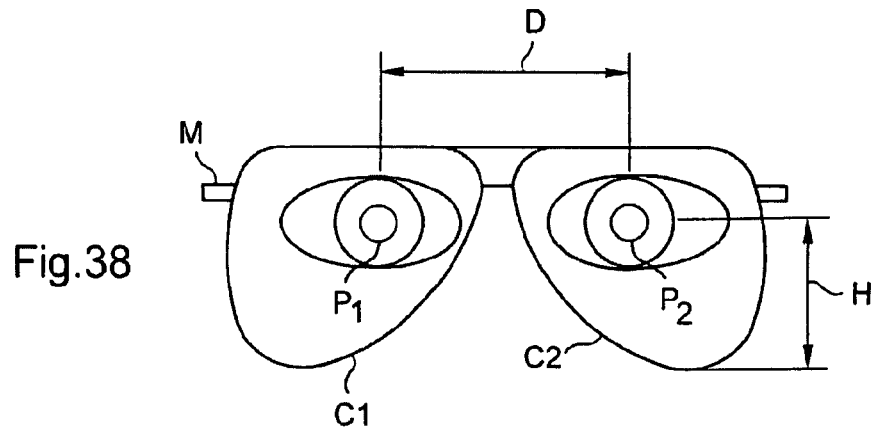
Figure 39:
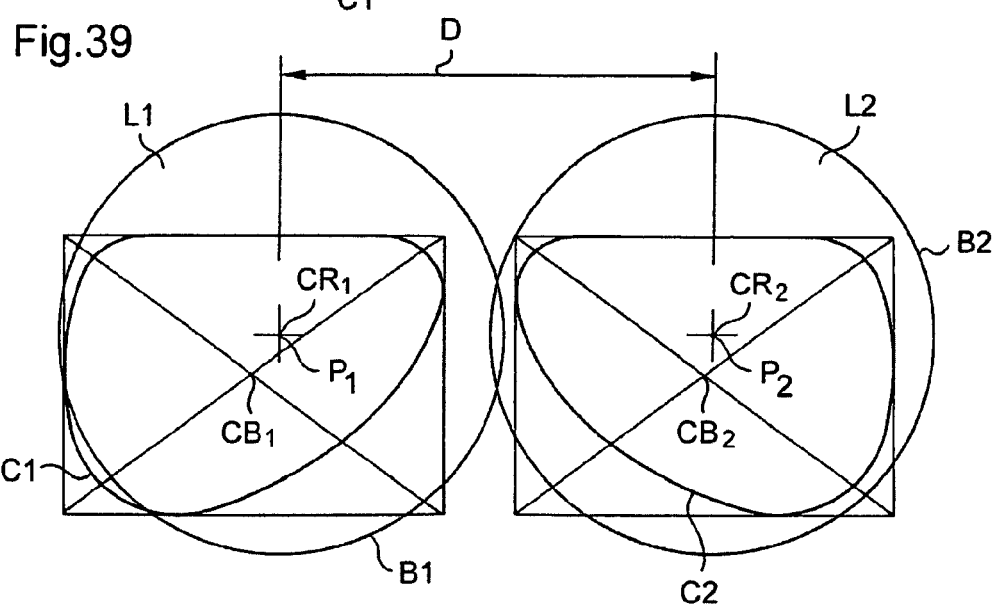
Figure 40:
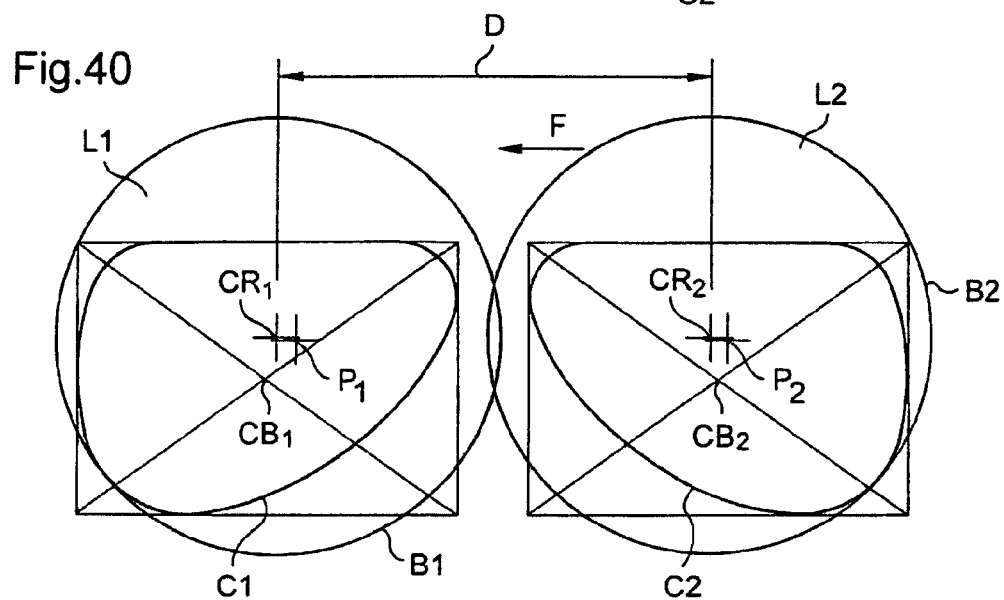
Figure 41:
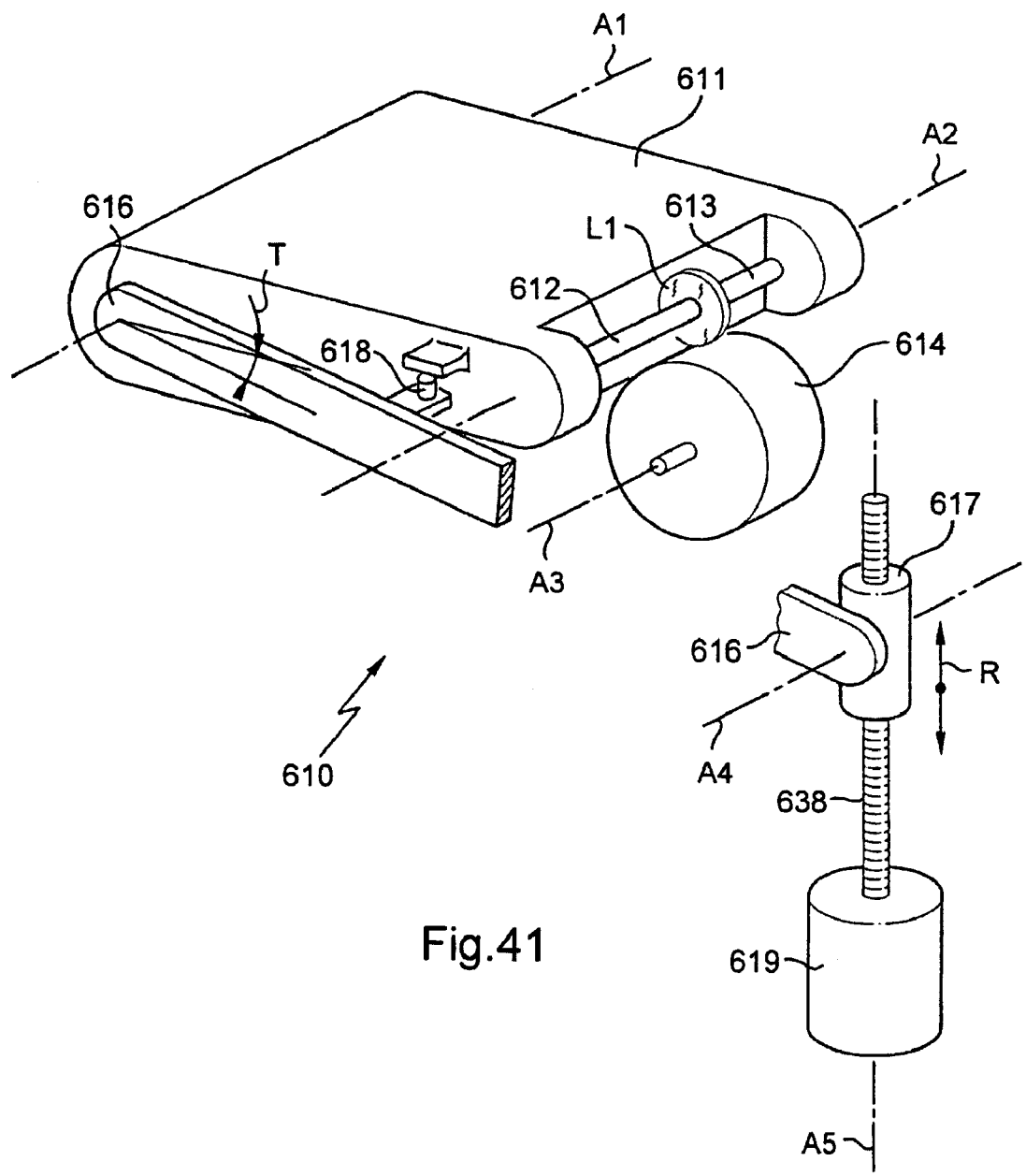

FIG. 19 is an elevation view of the automatic preparation device in which the feeler, gripper, and third transfer means are in a configuration for feeling the first lens in order to determine the height of a remarkable point such as the optical center of said lens relative to the measurement means in order to enable a vertex power of the lens to be calculated accurately at the remarkable point in question;

FIG. 20 is a perspective view of the preparation device in a configuration in which the feeler, gripper, and third transfer means are feeling the outline of the first lens;

FIG. 21 is a perspective view similar to FIG. 19 showing the preparation device in a configuration in which the feeler, gripper, and third transfer means are again feeling the first lens at least three points in order to determine the normal to the blocking points;

FIGS. 22 to 24 are elevation views of the automatic preparation device with the feeler, gripper, and third transfer means being partially in section, and being shown in three successive configurations for holding the first lens on a gripping and blocking axis corresponding to a remarkable axis of said lens, referred to as the boxing axis (defined below);

FIG. 25 is a perspective view of the preparation device in a configuration in which the first lens is undergoing the third transfer by the feeler, gripper, and third transfer means from its intermediate position towards the cutting-out device;

FIGS. 26 and 27 are perspective views of the preparation device in successive configurations of its third transfer followed by integration of the first lens in the cutting-out device;

FIG. 28 is a perspective view of the preparation device in a relay-passing configuration, in which the first lens is held both by the feeler, gripper, and third transfer means and by the blocking and rotary drive means of the cutting-out device;

FIGS. 29 and 30 are respectively a perspective view and a longitudinal section view of the first lens held between two chucks, themselves in engagement with two clamping and rotary drive shafts of the cutting-out device;

FIG. 31 is a perspective view of a magazine comprising a plurality of pairs of chucks for holding lenses of different sizes and/or coatings;

FIG. 32 is a fragmentary perspective view of the turntable showing a variant of the reception and first and second transfer means with an optional lens-centering peg;

FIG. 33 is a perspective view of the automatic preparation device in a configuration in which the first lens of the job, after being cut to shape and transferred in a fourth transfer is replaced by the third transfer means in an intermediate position on the reception and first and second transfer means;

FIG. 34 is a perspective view of the automatic preparation device in a configuration in which the first two lenses have been brought to a position for unloading by the reception and first and second transfer means;

FIG. 35 is a perspective view of the automatic preparation device in a configuration in which the reception and first and second transfer means are ready to receive a second pair of lenses of a second job, while the first lens of the first pair is still being processed in the cutting-out device and the second lens of said first pair is being processed by the measurement means;

FIG. 36 is a plan view of the front face of a progressive correcting lens having conventional marking formed on said lens;

FIG. 37 is a diagrammatic view of an embodiment of the device for measuring the characteristics of a lens;

FIG. 38 is a diagrammatic front view of a frame for a pair of eyeglasses in position on the nose of a wearer;

FIGS. 39 and 40 are front views showing diagrammatically the comparison and the combined centering of the two lenses of a given job under preparation; and FIG. 41 is a diagrammatic perspective view of the main components of the cutting-out means.

DETAILED DESCRIPTION OF THE INVENTION

Components of the Automatic Preparation Device

Figure 1:
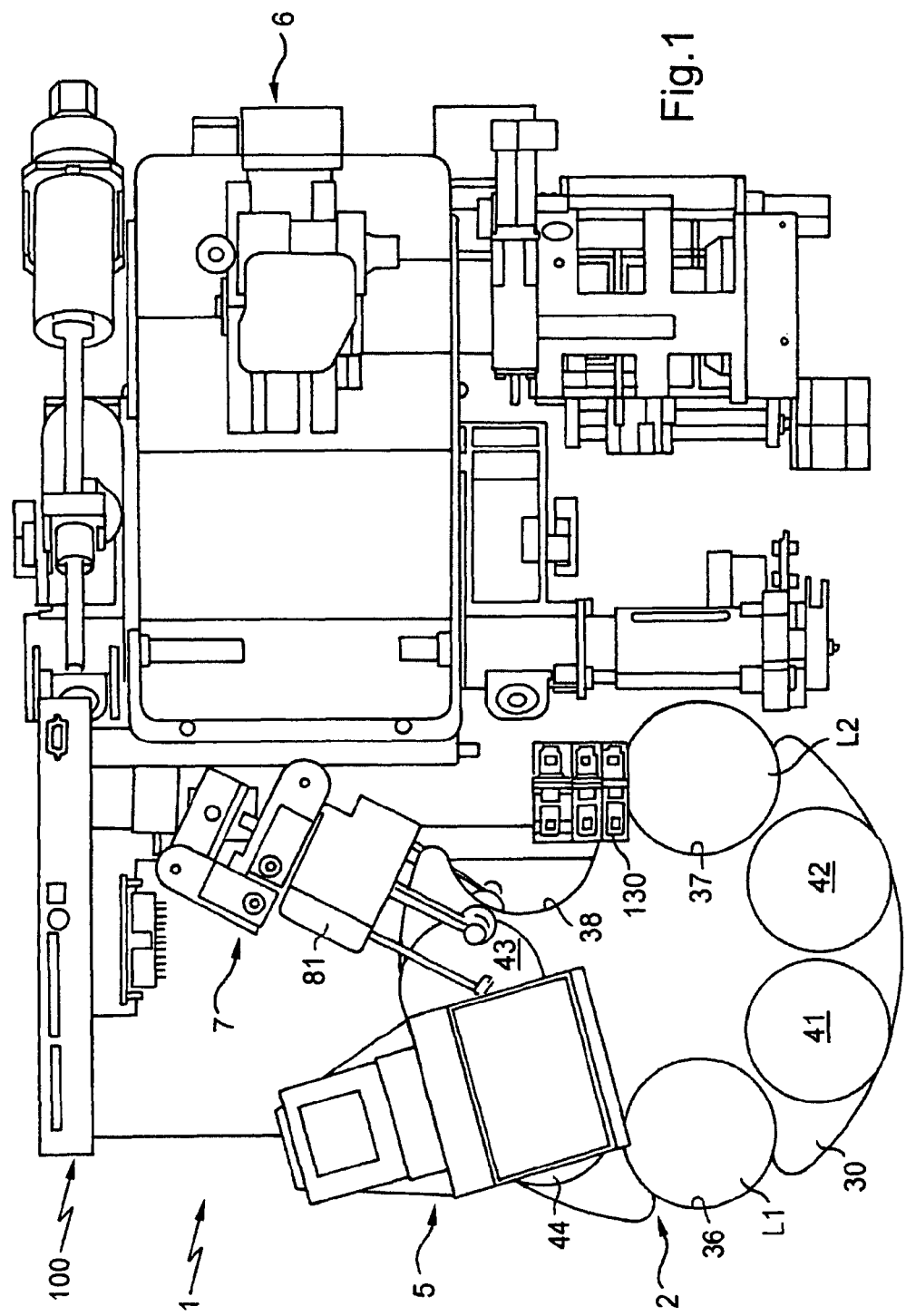
FIG. 1 is a diagrammatic plan view of the device of the present invention for automatically preparing ophthalmic lenses for mounting.
Figure 2:
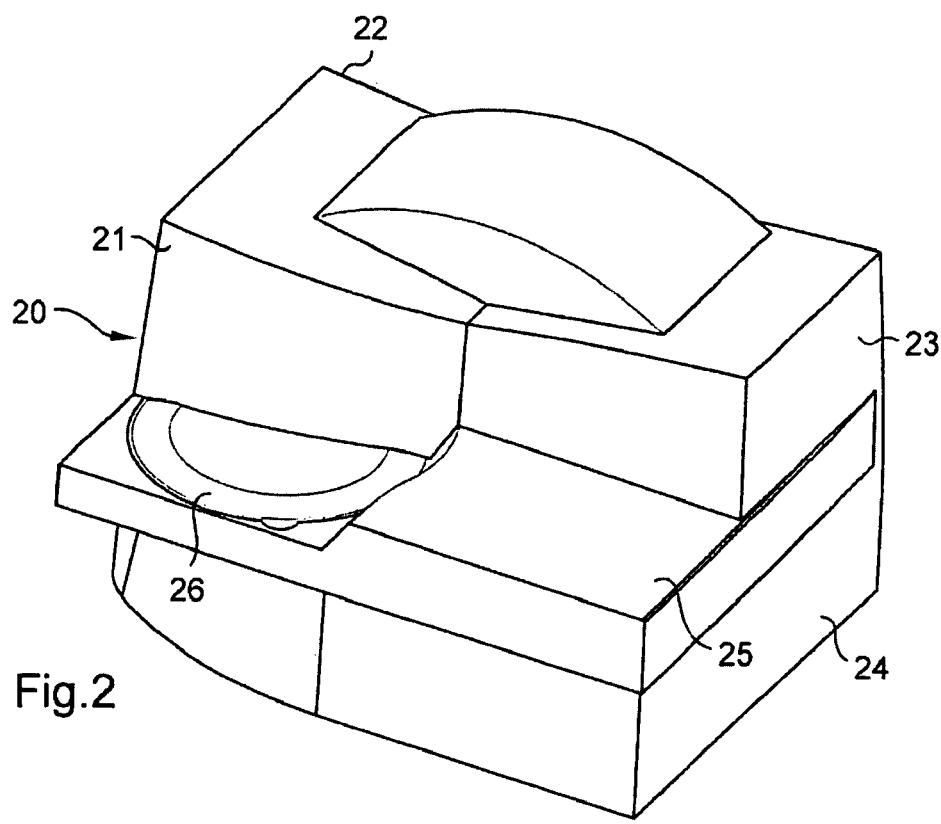
FIG. 2 is an overall perspective view of the outside of the automatic preparation device fitted with a cover.

As shown more particularly in FIGS. 1 and 2, the device 1 of the present invention for preparing lenses for mounting comprises a plurality of subassemblies mounted on a common frame:

a measurement device 5 for automatically measuring various characteristics of lenses L1 and L2 (which may for example be single-vision, multifocal having near or intermediate vision segment(s) with power discontinuity, or indeed multifocal with progressive addition of power), and in particular for measuring local ophthalmic powers at remarkable points such as the optical center of a single-vision lens or the far vision and near vision reference points, and for measuring at least one identification characteristic such as a centering, axis orientation, or localization of reference points for near vision and far vision of the lens;

a cutting-out device 6 for cutting ophthalmic lenses to shape;

combined reception and first and second transfer means 2 arranged to receive one or more ophthalmic lens jobs, e.g. one job comprising two lenses L1 and L2, and to make the lenses travel between a loading and unloading position, a measurement position in which the ophthalmic lens is presented in register with the measurement device 5 for measuring its identification characteristics, and an intermediate position for being taken in charge by the feeler, gripper, and third transfer means described below;

feeler, gripper, and third transfer means 7 designed and arranged firstly to feel each ophthalmic lens being prepared, and secondly to grip said lens in order to transfer it from the reception and first and second transfer means 2 to the cutting-out device 6;

an electronic and computer system 100 designed to execute an automatic processing method of the invention; and a cover 20 enclosing the entire assembly in order to protect it, and possessing a small access door 26.

Measurement Device

The measurement device 5 of the present invention performs several measurement functions on various characteristics of the lens. Amongst these various functions that are described in greater detail below, there are two main functions, one consisting in measuring the local optical powers of the lens at remarkable points thereof, and the other consisting in detecting and locating centering or identification characteristics of the lens in order to establish or position the lens appropriately in an overall frame of reference known to the device.

While performing its first function, the measurement device 5 operates without making contact, by overall mapping imaging, however that is associated with feeler means 7, which, as explained below, feel the lens in order to provide geometrical information in combination with the optical information delivered by the measurement device 5. In the example described below, this feeling is performed by making contact with the lens. Nevertheless, it will be understood that the person skilled in the art could replace that with contactless feeling operating in an equivalent manner to obtain geometrical position information.

In addition to the embodiment described below, the measurement device could be of any type enabling the lens to be presented between illumination means and analysis means in order to obtain an overall measurement of one or more optical characteristics at a plurality of points over the major fraction of its extent. Overall optical measurements can be obtained by measuring deflection (of the Hartmann, Moiré, etc. . . . type), by interferometry, by wave propagation, etc. The user interface may then display not only the optical or reference center, but also maps of powers and/or axial orientations at one or more remarkable points of the lens.

In order to understand the second centering function performed by the measurement device 5, and more generally the difficulty solved by the invention, it is necessary to recall that when mounting an ophthalmic lens on a frame, it is important for the visual comfort of the wearer to ensure that the lens is appropriately positioned relative to the eye for which it serves to correct defective refraction or accommodation.

Overall, an ophthalmic lens is centered when there is overlap between firstly the optical center (for single-vision lenses or multifocal lenses with a power discontinuity), or the reference center (for progressive lenses), of the ophthalmic lens as specified during design, and secondly the center of the pupil of the eye, or in other words when the line of sight passes through the optical center or the reference center of the ophthalmic lens. Centering is thus the result of bringing together two items of geometrico-optical data: the morphology of the wearer's pupil and the position on the lens of the optical center or the reference center. In order to perform the desired optical function, the lens must also be appropriately oriented about its optical axis.

With reference more particularly to ophthalmic lenses providing progressive addition of power, it is known that, during fabrication, any progressive lens is provided with temporary identification in the form of marking based on paint, and with permanent identification in the form of etching. The temporary marking makes it easy to center the lens before it is mounted. After the temporary marking has been removed, the permanent marking makes it possible, on a patient's frame, to identify the nature of the progressive ophthalmic lens, the value of its addition, and also to verify or reestablish the exact centering of said lens. It will be understood that the temporary marking is removed by the optician before handing the eyeglasses over to a client, and that, where necessary, the temporary marking can be reestablished on the basis of the permanent etched marking which remains on the ophthalmic lens.

More precisely, as shown in FIG. 36, the temporary marking conventionally comprises:

a centering or mounting cross 11 marking the center of the far vision zone, for positioning in register with the center of the wearer's pupil when looking straight ahead at infinity; it enables the power progression of the lens L1 to be positioned vertically and horizontally relative to the eye in such a manner that the wearer can easily find, in the manner determined by the designer of the lens, the corrective power that is needed whether for far vision, intermediate vision, or near vision;

depending on the type of lens, a central point 12 that is situated in the range 2 millimeters (mm) to 6 mm beneath the mounting cross 11 and that locates the "optical center" of the lens L1; this "optical center", for a progressive lens, is conventionally the "prism reference" where the nominal prismatic power of the lens L1 corresponding to the wearer's prescription is measured;

a circle 13 for measuring the far vision power of the lens, which circle is situated in the upper portion of the lens L1, immediately above the mounting cross 11, and locates the reference point for far vision; it is thus the location where a frontofocometer should be positioned for measuring the far vision power of the lens L1;

a circle 14 for measuring the near vision power of the lens, which circle is situated in the lower portion of the lens L1 and surrounds the center of the reference point or center of the near vision zone; this center is shifted towards the nose through 2 mm to 3 mm, and the distance between it and the mounting cross 10 constitutes the nominal length of the progression of the lens L1; and one or more lines 15 identifying the horizontal for the lens L1 and for use in centering.

As also shown in FIG. 36, the permanent marking generally comprises:

two small circles or signs 16 located on the horizontal of the lens L1 passing through its optical center and always situated at 17 mm on either side of the optical center 12; these etchings serve to find the horizontal and vertical centering of the lens;

a sign 17 serving to identify the brand and the exact nature of the progressive lens (e.g. V for Varilux®) that is etched under the small circle or nasal-side sign; and a 2- or 3-digit number representing the value of the addition (e.g. 30 or 300 for an addition of 3.00 D) which is etched under the small circle or temporal-side sign.

It should be recalled that for multiple-focus lenses presenting one or more lines of power discontinuity (e.g. defining a near vision zone known as a "segment"), these lines themselves act as permanent marks.

The device 5 for automatically measuring characteristics of an ophthalmic lens L1 is shown diagrammatically in FIG. 37. This automatic measurement device comprises a support for the lens L1, in this case a horizontal support constituted by the carousel forming part of the reception and first and second transfer means 2 that are described below. At this point it suffices to understand that the first transfer means are suitable for bringing the lens under examination into a measurement position situated in register with the measurement device and centered on the optical axis of the measurement device, as is explained in greater detail below. Beneath this measurement position for the lens L1, a transparent glass plate protects the inside of the device. On either side of this measurement position for the lens L1, the measurement device includes, on a mainly vertical optical axis, firstly lighting means 208 including an optical system 211 for providing a light beam directed towards the lens L1 in its measurement position, and secondly analyzer means 210 for analyzing the image transmitted by the lens L1 in the measurement position.

The optical system 211 is arranged to define two possible light paths 212 and 213 for said light beam, which paths are switchable, i.e. they can be activated in alternation. In the example shown, the lighting means comprise at least two switchable light sources S1 and S2 corresponding respectively to the two above-mentioned light paths. In other words, when the source S1 is on, the source S2 is off, and vice versa. The two light paths 212 and 213 have a common portion 215 upstream from the lens L1, which common portion is determined more particularly between a semireflecting oblique mirror 218 and the lens L1. The mirror marks the intersection between the two light paths. The mirror 218 may be replaced by a splitter cube or a removable mirror.

A first mask 220 forming a Hartmann matrix or the like is placed on only one of the paths (the path 212) at a location such that it occupies a position that is predetermined relative to a vertical main optical axis 225 of said analysis means 210. This optical axis 225 is the axis common to certain lenses of the optical system that are centered relative to the source S1, and of a light receiver 228 forming part of the analysis means 210 and situated on the other side of the lens L1 in the measurement position. The analysis means also include a frosted translucent screen 229 interposed perpendicularly to the optical axis 225 between the lens L1 in the measurement position and said light receiver 228. The light receiver may be a matrix sensor or a camera with an objective lens. If the light receiver is a matrix sensor, it is associated with an objective lens 231, and possibly also with a diaphragm that is not given in the example shown. If the light receiver is a camera, these elements are replaced by the lens system of the camera. The ground translucent screen 229 is preferably made of glass or the like with a ground surface. It constitutes a disk that is mounted to rotate and that can be driven in rotation by a motor 235 about the optical axis 225.

Returning to the optical system 211 associated with the sources S1 and S2, the first light source S1 of these two sources is a point light source suitable for providing a diverging beam that illuminates the first mask 220 along a first path 212 prior to being reflected on the oblique mirror 218 so as to travel along the common portion of the light path 215, thereby illuminating the ophthalmic lens L1. The oblique mirror 218 is at an angle of 45° relative to the optical axis 225 such that the beam coming from the source S1 is reflected on the mirror and is directed towards the ophthalmic lens L1. Downstream from the first mask 220, and thus on the first light path 212, the light emitted by the source S2 is split up into a plurality of distinct light rays, with the Hartmann type first mask 220 performing its beam splitter function.

The source S1 may optionally be movable along the optical axis or an axis perpendicular thereto, but when activated it always illuminates the first mask 220. The optical system also includes a collimator lens 241 centered on the optical axis 225 and placed between the mirror 218 and the measured ophthalmic lens L1. This lens 241 serves to generate a parallel light beam of size that is large, greater than that of the lens L1, and to make an image of the first mark 220 on the surface of the ophthalmic lens L1.

A second light source S2 is arranged to illuminate the lens L1 in the measurement position via the second light path 213, excluding the first mask 220 that forms the Hartmann matrix. Light from this second light source passes through the semireflecting mirror 218 marking the intersection between the two light paths 212, 213. This source S2 is a point source suitable for delivering a diverging beam directed towards the mirror 218. The axis of the beam generated by the source S2 is perpendicular to the beam generated by the source S1 upstream from the mirror 218 and it passes through this mirror without being deflected. It then illuminates the ophthalmic lens L1 without being subjected to any beam separation splitting by any splitter element of the Hartmann mask type or the like.

A second Hartmann type mask 240 or similar beam separator is placed downstream from the ophthalmic lens L1, i.e. between the lens and the image analysis means 210. Specifically, the mask 240 is situated under the protective glass 203, and adjacent thereto. This second mask 240 can be engaged and disengaged at will, under the control of the electronic and computer system 100.

In practice, the second mask can be made in the form of a transparent liquid crystal display (LCD) screen or the like, as in the example shown. It may also be constituted by a passive mask that is permanent and mounted to move relative to the ophthalmic lens, so as to be suitable for being moved out of the way so as to uncover at least a portion of the ophthalmic lens when said portion is to be examined without the second mask, in a manner that is explained below.

Under such conditions, terms such as "engageable" and "disengageable" mean that the mask in question either does or does not perform its function of splitting up the light beam upstream or downstream from the lens over all or part of the surface of the ophthalmic lens. Specifically, it will be understood that the engagement or disengagement of the mask can be performed in different manners depending on the type of mask used.

When the mask is of the passive type, e.g. constituted by a support with one or more patterns marked on the support, such as a grid or a perforated plate, then the term "disengageable" means in particular that the mask can, in particular, be retracted mechanically in full or in part, so the mask is mounted to move relative to the lens (either by the mask itself being movable or by the lens being movable while the mask remains stationary) so as to enable at least a portion of the corresponding surface of the lens to be disengaged and illuminated or read directly with the complete light beam, i.e. without said beam being split up. The term "disengageable" can also mean optically bypassable, as is the case for the mask 220.

When the mask is of the active type and consists for example of a dynamic display screen such as a CRT or LCD screen, then the term "disengageable" means "deactivatable": the electronics controls the screen so that it switches off all of its splitter patterns over at least a zone of the screen corresponding to the zone of the lens that is to be read without the beam being split up.

In the example shown, the mask 240 is of the LCD active type, so it is deactivatable, while the mask 220 is of the passive type (permanent) and is optically bypassable (by having two alternative light paths 212 and 213). Nevertheless, in a variant, provision could be made for the mask 220 that is situated between the source and the lens to be of the active type, such as an LCD screen, suitable for being activated and deactivated electronically, like the mask 240 situated between the lens and the translucent screen.

In operation, the measurement device as constituted in this way can take up three states corresponding to three modes of operation:

State 1: the source S1 is activated and illuminates the lens L1 through the first mask 220 (this first mask thus being "activated"), the source S2 being off and the second mask 240 being deactivated; in other words, the first mask 220 is the only mask engaged.

State 2: the source S2 is activated and the second mask 240 is activated, the source S1 being off (the first mask 220 thus being, so to speak, "deactivated); the second mask 240 is thus the only mask engaged.

State 3: only the source S2 is activated, the source S1 and its associated mask 220 being deactivated, and the second mask 240 being deactivated (or retracted) at least in part; thus both masks 220 and 240 are disengaged simultaneously.

In state 1, the source S1 and its associated mask 220 are activated and they are used for correcting read error and for repositioning the marks, identifiers, or indicators (etching, marking, segments) on the front face of the lens as seen on the screen 229 by the sensor 218, and due to prismatic deflection through the ophthalmic lens L1.

In state 2, the source S2 and its associated mask 240 are activated together while the source S1 is deactivated, to perform overall analysis of one or more optical characteristics at a plurality of points over the entire extent of the lens, in order to measure said optical characteristic(s) at one or more isolated remarkable points (such as the reference points for near vision and for far vision of a progressive lens, or the optical center(s) of a single-vision lens or a multifocal lens having power discontinuity) or, possibly, to establish a map of the ophthalmic lens L1 (in particular by measuring power and/or astigmatism at a plurality of points on the lens) and determining the optical center of the ophthalmic lens L1 when it is of the non-progressive type.

In state 3, the source S2 is activated on its own, with both the source S1 and the second mask 240 being deactivated, in order to determine printed marks, etching in relief, and segments (for bifocal and trifocal lenses), which operation requires a disengaged view of the ophthalmic lens, at least locally.

The above-mentioned light sources S1 and S2 may be light-emitting diodes (LEDs) or laser diodes, preferably associated with respective optical fibers.

There follows a description of the manner in which the measurement device can be used to determine a certain number of optical characteristics of the ophthalmic lens L1 in the measurement position.

First Function: Identifying the Ophthalmic Lens

Before anything else, it is useful to be able to recognize the type of ophthalmic lens under analysis (single-vision, multifocal, or progressive) in order to avoid errors. To do this, the source S2 is used together with the second mask 240 forming a Hartmann matrix. The measurement device is in its state 2 or its state 3. The beam on the second light path 213 is transformed by the second mask 240 into a plurality of individual fine rays corresponding to the configuration of the mask. Each of these rays strikes the front face of the lens L1 parallel to the optical axis 225, i.e. generally perpendicularly to the midplane of the ophthalmic lens L1 (and thus specifically vertically, since the ophthalmic lens L1 is held horizontally by the reception and first and second transfer means 2, as explained below). These rays are deflected by the ophthalmic lens L1 and they are displayed in the form of light spots on the rotating translucent screen 229. The screen is imaged on the matrix sensor associated with the afocal system or on the sensor of the camera, and the spots are analyzed by an electronic and computer processor system (associated with or integrated in the electronic and computer system 100) in order to determine their offsets.

If the lens is of the single-focus type, the offsets of the points of the mask (i.e. the light spots that appear on the translucent screen) after being deflected by the lens progress radially from the center towards the periphery compared with the positions of the same points when no ophthalmic lens is present on the optical axis of the measurement device. The positions of the points of the Hartmann mask on the screen when no lens is present in front of the measurement device are measured during a calibration stage.

For a converging lens, the spots are offset towards the optical axis, by an amount that increases with increasing power of the ophthalmic lens to be measured.

When the lens under analysis is progressive, the distribution of the points does not present axial symmetry.

Consequently, measuring displacement in this way enables the type of the lens to be determined.

Other means and methods for determining lens type are well known to the person skilled in the art and could be used in the context of the present invention instead of the example given above.

Second Function: Determining the Line of Progression of a Progressive Lens

In the measurement conditions specified above (state 2), it is found that for a progressive lens, the offset of the points varies along a line referred to as the "progression line". In order to determine this progression line, calculation is used to determine the direction of the power gradient by calculating power at different points of the lens, e.g. using the method specified below. This direction is the progression line. It is thus possible to measure and calculate the orientation of the progression line which is an important characteristic of a progressive lens. It should be observed that these calculations are carried out on the basis of two data series, firstly the configuration of the points of the Hartmann second mask 240 on the translucent screen when no ophthalmic lens is present on the optical axis of the measurement device, and secondly the corresponding configuration of the same points when it results from the set of deflections imparted to the rays by the ophthalmic lens L1.

Third Function: Determining the Optical Center for a Non-Progressive Lens

If the ophthalmic lens L1 has been identified as being of the single-vision type, it is easy to determine the position of the optical center of the lens. With the device still in its state 2, it suffices to compare the points of the reference mask (appearing on the translucent screen 229 when no lens is present on the optical axis of the measurement device) with the corresponding points of the mask viewed on the translucent screen after deflection by the lens. In principle, the point of the second mask 240 that is not deflected corresponds to the position of the optical center. Since in general there is not any ray that is subjected to no deflection, it is necessary to perform interpolation from the least-deflected rays, e.g. by applying the least squares method on a polynomial model.

Fourth Function: Calculating the Power and the Astigmatism of the Ophthalmic Lens For a single-vision lens, it is known that the distance between the focus and the rear face of the ophthalmic lens represents the vertex power. The position of the rear face of the ophthalmic lens L1 is given a posteriori by feeling using feeler, gripper, and third transfer means 7, as explained more fully below. In order to determine the focus, the device remains in its state 2, and use is made again of the image on the translucent screen of the second mask 240 that forms a Hartmann matrix. For this purpose, comparisons are made between the positions of corresponding points between the calibration image (taken before putting the ophthalmic lens in place) and the image after the ophthalmic lens has been interposed. Given the distance between the mask 240 and the screen 229 (known by construction), the deflection angle of the light rays coming from the beam separation performed by the mask 240 are deduced by calculation.

For a plurality of adjacent points, comparisons are made between the positions and the directions of the light rays, thus making it possible to calculate the position of the focus on the optical axis (and thus its power which is the reciprocal of the distance between the focus and the ophthalmic lens) and the astigmatism of the ophthalmic lens (the value and the axis of the astigmatism) if there is any astigmatism. These measurements are local and can be repeated over different zones of the ophthalmic lens, thus making it possible to obtain a map of the powers of the ophthalmic lens.

Fifth Function: Determining the Center Point and the Horizontal Axis of a Progressive Lens It is known that for any point of an ophthalmic lens it is possible to assume that the front face and the rear face of the lens form an angle that can be treated as a prism. Furthermore, in a progressive lens, addition is defined as being the difference between the maximum power and the minimum power of the ophthalmic lens.

In general, the reference point of the prism is defined as being the point where the prism of the ophthalmic lens is equal to the prescribed prism. On a progressive lens, the prism reference point (PRP) can be treated as being the optical center of a single-vision lens (and by abuse of language it is sometimes called the optical center) and it is situated at the center of a line between two reference marks etched on the front face of the lens. As a general rule, this point is also identified by a specially printed mark.

In any event, identifying the prism reference point or any other remarkable point suitable for use in centering the ophthalmic lens L1 when said lens is a progressive lens, is performed in state 3 by illuminating the lens L1 from the light source S2, i.e. avoiding the Hartmann first mask 220. The image transmitted by the ophthalmic lens L1 appears on the translucent glass 229 and is perceived by the light receiver 228. Reading is accompanied by suitable image processing in order to identify the etched marks or the other marking and in order to determine the positions thereof in a known fixed frame of reference of the electronic and computer system 100. This viewing of the etched or other marks and determination of the prism reference point then makes it possible to determine the centering point of the progressive lens (mounting cross) which needs to be made to coincide with the position of the center of the pupil of the wearer's eye and the horizontal axis that gives the orientation of the ophthalmic lens in the frame.

Sixth Function: Determining the Position of the Segment for a Bifocal Lens

The source S2 is used again without a mask (state 3 of the measurement device) serving to view the image of the ophthalmic lens L1 on the translucent screen. Appropriate image processing enables variations in light intensity on the screen to be observed better and consequently makes it possible to obtain a sharp outline for the boundary of the segment, and thus to determine its position accurately.

Seventh Function: Determining the Shape and the Dimensions of the Ophthalmic Lens These characteristics are determined by illuminating the ophthalmic lens from the source S2 without the Hartmann mask (state 3 of the measurement device) and by performing suitable image processing in order to distinguish better the outlines of the ophthalmic lens. Prior to cutting out, the ophthalmic lens is generally circular and this analysis serves mainly to determine its diameter. Nevertheless, it can happen that the ophthalmic lens already has a shape that is close to the shape of the frame for which it is intended. The image processing serves to determine the shape and the dimensions of a non-circular ophthalmic lens. Determining the shape and the dimensions of the ophthalmic lens make it possible to verify whether it is large enough to be held in the selected frame or shape.

Eighth Function: Correcting Reading Errors Due to Prismatic Deflections Induced by the Ophthalmic Lens Under Measurement It should be observed that for all of the above-mentioned parameters that are acquired by illuminating the ophthalmic lens using the source S2 alone, i.e. excluding the two Hartmann masks 220 and 240, it is possible to reprocess the measurements in order to transfer the positions of the marking etching or segment read on the translucent screen onto the front face of the ophthalmic lens. The source S2 makes it possible to see the marking, etching, or segment, but does not make it possible to determine the real positions thereof on the front face of the ophthalmic lens. In contrast, the source S1 associated with the first matrix 220 does enable the precise positions of said elements on the front face of the ophthalmic lens to be calculated from the information acquired with S2.

The procedure is as follows. It is assumed that consideration is being given to a light spot A on the translucent screen 220, corresponding to one of the holes in the Hartmann mask. The corresponding light ray strikes the front face of the ophthalmic lens L1 at A'. In a first step, the source S2 is switched on and the corresponding image that appears on the translucent screen is stored. Then, the source S1 is switched on and the source S2 is switched off. The image of the Hartmann mask then appears on the translucent screen 229. By construction, the height of each hole in the Hartmann mask (distance of the hole from the optical axis 225) is known. Consequently, for a given ray, the height of the corresponding ray at its point of entry on the front face of the ophthalmic lens L1 is known. I.e. the height of the point A' corresponding to the point A is known. Consequently, it is possible to apply a correction to the point A so as to determine A'. It is thus possible to find the position on the lens itself, of any marking read on the translucent screen, and thus improve the accuracy of such measurement. In other words, the use of the Hartmann mask 220 in association with the light source S1 (said Hartmann mask being placed upstream from the ophthalmic lens L1), makes it possible to improve all of the measurements that are carried out by illuminating the lens using a source S2 that follows a light path excluding said mask.

Ninth Function: Correcting Errors in Measuring Powers on all Types of Lens and in Centering and Finding the Axis of Single-Vision Lenses The two masks 220 and 240 situated on opposite sides of the lens make it possible in combination to correct at least in part errors due to faulty positioning of the lens and concerning centering, locating the orientation of the axis, and measuring power.

For various reasons, e.g. faulty positioning of the lens for measurement on the support turntable 30 when changing lens, or misalignment of the measurement device relative to the turntable 30 supporting the lens for measurement, it can happen that the lens present in register with the measurement device has its axis at an angle that is not negligible relative to the main axis 225 of the measurement device. Such lack of horizontally in the positioning of the lens for measurement leads to optical aberrations in the wave front in the vicinity of the point where it is desired to make a measurement (which may be the optical center or any other remarkable point of the lens on which it is desired to measure an optical characteristic) and can also lead to the ray passing through this point being offset. These optical aberrations or offsets of the rays at the point of interest falsify the measurements of the optical characteristics, and in particular can falsify the measurements of powers and of local optical axes of the lens when the lens is of any type and in particular when the lens presents progressive power variation, and can also falsify the measurements of the position of the optical center and the orientation of the main axis of astigmatism when the lens is of the single-vision type.

In particular, it can thus happen that an error $e_1$ is made in measuring the position of the optical center of a single-vision lens, which error is approximately equal to the following product:

$$e_1 = i \cdot d_1$$

where i is the angle of inclination of the optical axis of the lens relative to the main axis of the measurement device, i.e. specifically relative to the vertical, and where $d_1$ is the distance between the main image plane and the convex front face of the lens (when said face is the top face looking towards the sources S1 and S2, as in the example described).

Because of the possibilities made available by combining two beam splitter masks that are situated on either side of the lens, it is possible to measure this error and thus correct it at least in part. The procedure is as follows.

The optical center is measured in application of the third function described above, using state 2 of the device, and with only the second mask 240 being engaged.

Thereafter, the offset $e_2$ at said point that results from the error of inclination i of the lens to which a ray might have been subjected is measured using state 1 of the device, with only the first mask 220 being engaged.

If this offset is zero, then it is deduced that the lens is properly positioned, i.e. properly horizontal (zero inclination, i=0).

Otherwise, the angle of inclination i of the optical axis of the lens under measurement is calculated approximately by using the following formula:

$$i \approx e_2/d_2$$

where $e_2$ is the measured offset, and $d_2$ is the mean distance depending on the power of the lens under measurement between the main object plane and the main image plane of the lens under measurement.

A correction equal to the error $e_1 \approx i \cdot d_{1m}$ is then applied to the measured position for the optical center, where $d_{1m}$ is an averaged estimate, depending in particular on the power of the lens, and the distance between the main image plane and the convex front face of the lens (when said face is the top face facing the sources S1 and S2, as in this example).

Cutting-Out Device

The cutting-out device 6 can be made in the form of any cutting-out machine or machine for removing material that is adapted to changing the outline of the ophthalmic lens so as to match that of the rim of a selected frame. By way of example, such a machine may be constituted by an edger cutting and/or grinding mechanically, a laser cutting machine, a water jet cutting machine, etc.

Specifically, and as in the example shown, it may be an edger of the kind conventionally used for cutting out ophthalmic lenses for eyeglasses that are made of mineral or plastics material. Such an edger comprises mainly, on a frame, a machining station which is fitted with one or more edging cutters and grindwheels and one or more chamfering grindwheels mounted to rotate about an axis under the control of a drive motor, and a carriage which is fitted parallel to the axis of said grindwheels with two coaxial clamping and rotary drive shafts for the lens. These shafts are suitable for holding the lens for treatment axially and they are mounted to rotate under the control of a drive motor.

The carriage is mounted to move on the frame, but transversely relative to the axis of the grindwheels, under the control of thrust means urging it towards said axis, and secondly axially parallel to the axis of said grindwheels, under the control of suitable control means.

For transverse movement relative to the axis of the grindwheels, which is necessary in order to press the ophthalmic lens for treatment against them, the carriage may, for example, be mounted to pivot on a shaft parallel to said axis (the carriage can then be referred to as a "rocker") or it may be mounted to move in translation perpendicularly thereto.

More precisely, in the example shown diagrammatically in FIG. 41, the cutting-out device 6 comprises, in conventional manner, an edger 610. Specifically, the edger carries firstly a rocker 611 mounted to pivot freely about a first axis A1, in practice a horizontal axis, on a frame 601 associated with the main structure of the preparation device, and which, for supporting and holding an ophthalmic lens such as L1 that is to be machined, is fitted with two clamping and drive shafts 612, 613 that are in line with each other along a second axis A2 parallel to the first axis A1 and suitable driven in rotation by a motor (likewise not shown), and secondly at least one grindwheel 614 which is constrained to rotate on a third axis A3 parallel to the first axis A1 and which is also suitably driven in rotation by a motor that is not shown. For simplification purposes, the axes A1, A2, and A3 are represented by chain-dotted lines in FIG. 41.

In practice, the edger 610 has a set comprising a plurality of grindwheels such as 614 mounted one after another on the third axis A3 in order to blank out and finish the ophthalmic lens L1 that is to be machined, the entire assembly being carried by a carriage, likewise not shown, mounted to move in translation along the first axis A1. These various grindwheels are each adapted to the material of the lens being cut out and to the type of operation that is to be performed (blanking out, finishing, grooving, etc.).

The grindwheel 614 (or more precisely the entire set of grindwheels) is movable in translation along the axis A3 and is controlled in this movement by motor drive means that are not shown.

In practice the edger is automatic, commonly said to be numerically controlled, with the machine 610 of the invention further including a link 616 that is hinged at one end to the frame about the same first axis A1 as the rocker 611, and at its other end hinged to a nut 617 about a fourth axis A4 parallel to the first axis A1. The nut 617 is mounted to move along a fifth axis A5, commonly referred to as the restitution axis, extending perpendicularly to the first axis A1, there being a contact sensor 618 acting between the link 616 and the rocker 611. The pivot angle of the rocker 611 about the axis A1 relative to the horizontal is referenced T. This angle T is linearly associated with the vertical movement in translation of the nut 617 along the axis A5, which movement is written R.

For example, as shown in FIG. 41, the nut 617 is a tapped nut in screw engagement with a threaded rod 638 that is in alignment on the fifth axis A5 and is rotated by a motor 619.

By way of example, the contact sensor 618 is constituted by a Hall effect cell.

When the ophthalmic lens for machining, appropriately clamped between the two shafts 612 and 613 is brought into contact with the grindwheel 614, it has material removed selectively therefrom until the rocker 611 comes into abutment against the link 616 by bearing against the contact sensor 618, which duly detects the abutment.

In a variant, provision could be made for the rocker 611 to be hinged directly to the nut 617 mounted to move along the restitution axis A5. A strain gauge is associated with the rocker to measure the machining advance force applied to the lens. This thus measures continuously throughout machining the machining advance force applied to the lens, and then the progress of the nut 617 and thus of the rocker 611 is controlled so that this force remains below a maximum setpoint value. For each lens, this setpoint value is adapted to the material and to the shape of the lens.

In any event, in order to machine the ophthalmic lens L1 around a given outline, it thus suffices firstly to move the nut 617 accordingly along the fifth axis A5 under the control of the motor 619, and secondly to cause the shafts 612, 613 to pivot together about the second axis A2, in practice under the control of the motor that controls them, so that all of the points of the outline of the ophthalmic lens L1 are involved in succession.

The electronic and computer system 100 is appropriately programmed for this purpose to coordinate these two operations.

The above dispositions are well known in themselves and they do not form part of the present invention proper, so they are not described in greater detail herein.

Combined Reception and First and Second Transfer Means

The reception and first and second transfer means 2 are in the form of a carousel which is described more particularly with reference to FIGS. 4 to 8 and which comprises:

a loading and unloading turntable 30 mounted on the common frame to turn under the control of control means (specifically an electric motor that is not shown) itself controlled by the electronic and computer system 100, about an axis of rotation that passes substantially through the center of the turntable, perpendicularly to its plane;

a support structure 31 secured to the common frame;

reception seats 34, 35 on which the lenses L1 and L2 are to rest while being loaded onto the turntable 30;

at least three loading places 36 to 38 and at least four unloading places 41 to 44 on the loading and unloading turntable 30; and means 32 for preventing lenses L1 and L2 loaded on the turntable 30 at the loading places 36 to 38 from moving.

In the example shown, the loading places 36 to 38 are constituted by a corresponding number of notches or recesses. These three notches 36 to 38 are identical, each presenting a shape that is substantially circular and of diameter slightly greater than the standard diameter (about 70 mm) of lenses L1 and L2 for cutting to shape. The three notches are arranged to open out into the periphery of the loading and unloading turntable 30. These openings give access to at least two seats 34, 35 on which the lenses for cutting to shape rest. Clamps 32 constituting the means for preventing the lenses from moving (FIGS. 6 to 8) are hinged in register with the loading places 36 to 38.

As shown in the figures, and in particular in FIG. 5 which is a detail view of the turntable 30, the four unloading places 41 to 44 are constituted by hollows or cups formed in the surface of the turntable 30. These hollows or depressions are circular in shape and of diameter that is always greater than the diameter of the lenses L1 and L2 after they have been cut to shape.

Substantially radial slots 45 are formed from the center of each unloading hollow 41 to 44 to the peripheral edge of the turntable 30 into which the slots open out. These slots are for enabling the lenses to be handled after being cut to shape by the third and fourth transfer means, as explained below.

Each slot 45 is arranged to form a slideway for receiving an associated tongue 49 that is mounted in the slot 45 with which it is associated to slide between an outer position overlapping the corresponding slot 45, as illustrated by the position of the tongue 49 associated with the unloading recess 42 in FIG. 5, and a retracted inner position in which it is retracted towards the center of the turntable 30 under the turntable 30, as illustrated by the position of the tongue 49 associated with the unloading recess 41 in FIG. 5. Each tongue 49 is connected to a return spring situated under the turntable 30 (not visible in the figures) and urging it towards the outer position in which it overlaps the slot 45.

In a variant, provision could also be made for the overlap tongues 49 to be mounted on the turntable of the carousel to pivot between a retracted position and a position overlapping each corresponding slot. The pivoting of each tongue could then advantageously by controlled by the same mechanism as is used for actuating the clamps.

Alternatively, provision could also be made for the hollows or cups 41 to 44 to be entirely closed and to present no openings so as to be watertight.

In any event, the hollows or cups 41 to 44 present respective closure tongues or else they are closed, and it can be seen that they are arranged in such a manner as to collect the drops of lubricant coming from each lens after it has been cut to shape. This avoids wetting the component parts that might be subject to corrosion, or the electronics, or the parts that are required to be very clean as applies in particular to the optical measurement device 5.

In preferred manner, a first loading place 36 is diametrically opposite the other two loading places 37 and 38, themselves situated side by side. The four unloading places 41 to 44 are grouped together in pairs. Thus, a first pair of unloading places 41, 42 is interposed between the two loading places 36, 37, while the other two unloading places 43, 44 are situated between the loading places 36 and 38.

This provides a loading and unloading turntable 30 that is very compact, serving to maximize the number of pairs of lenses that can be processed in a small volume. The loading places and the unloading places are regularly distributed around the periphery of the turntable and they all have substantially the same area.

The means 32 for holding the lenses in place comprise clamps 46 to 48, each situated vertically above a corresponding loading place 36 to 38. Each of these clamps comprises two branches 50 and 51 with their roots 53 hinged on a hub 54 and with their free ends 55 being provided with generally V-shaped hinged fingers 56.

The hub 54 is constrained to rotate with the loading and unloading turntable 30 in such a manner that the clamps 46 to 48 are rotated simultaneously with the turntable. Each clamp thus remains in register with a respective one of the loading places 36 to 38.

Each of the clamps 46 to 48 is urged towards a closed position by a respective resilient element such as a return spring 57 placed between the roots 53 of the two branches 50, 51 of each clamp.

Furthermore, the three clamps 46 to 48 are driven into an open position in which they can take hold of a lens by a special drive mechanism 58. As can be seen more particularly in FIGS. 7 and 8, the drive mechanism 58 consists in a system of cogwheels and belts serving to control rotation of three heads 60, each situated in the vicinity of a respective clamp root 53. Each of these heads is designed to co-operate in alternation like a screwdriver with complementary actuator forks 61, each carried by a respective one of the clamps 46 to 48.

The drive mechanism 58 is mounted stationary on the structure 31 and therefore does not turn with the turntable 30 and the hub 54. It comprises three assemblies, each constituted by a drive pulley 62, a cogwheel 63, and a belt 64 tensioned between the pulley and the cogwheel. The cogwheel 63 carries the finger 60 that is itself situated on the circular path of the fork 61 with which it co-operates.

Thus, when the loading and unloading turntable 30 and the clamps 46 to 48 are brought into a reference position, also referred to as the loading/unloading position, the forks 61 are brought into co-operation with the heads 60, each of the heads 60 penetrating into turn in the corresponding fork 61. The drive pulleys 62 are then caused to turn so as to turn the cogwheels 63 and thus the forks 61 engaged with the heads 60, enabling the clamps 46 to 48 to be opened by moving the branches 50, 51 apart against the springs 53.

Figure 8:
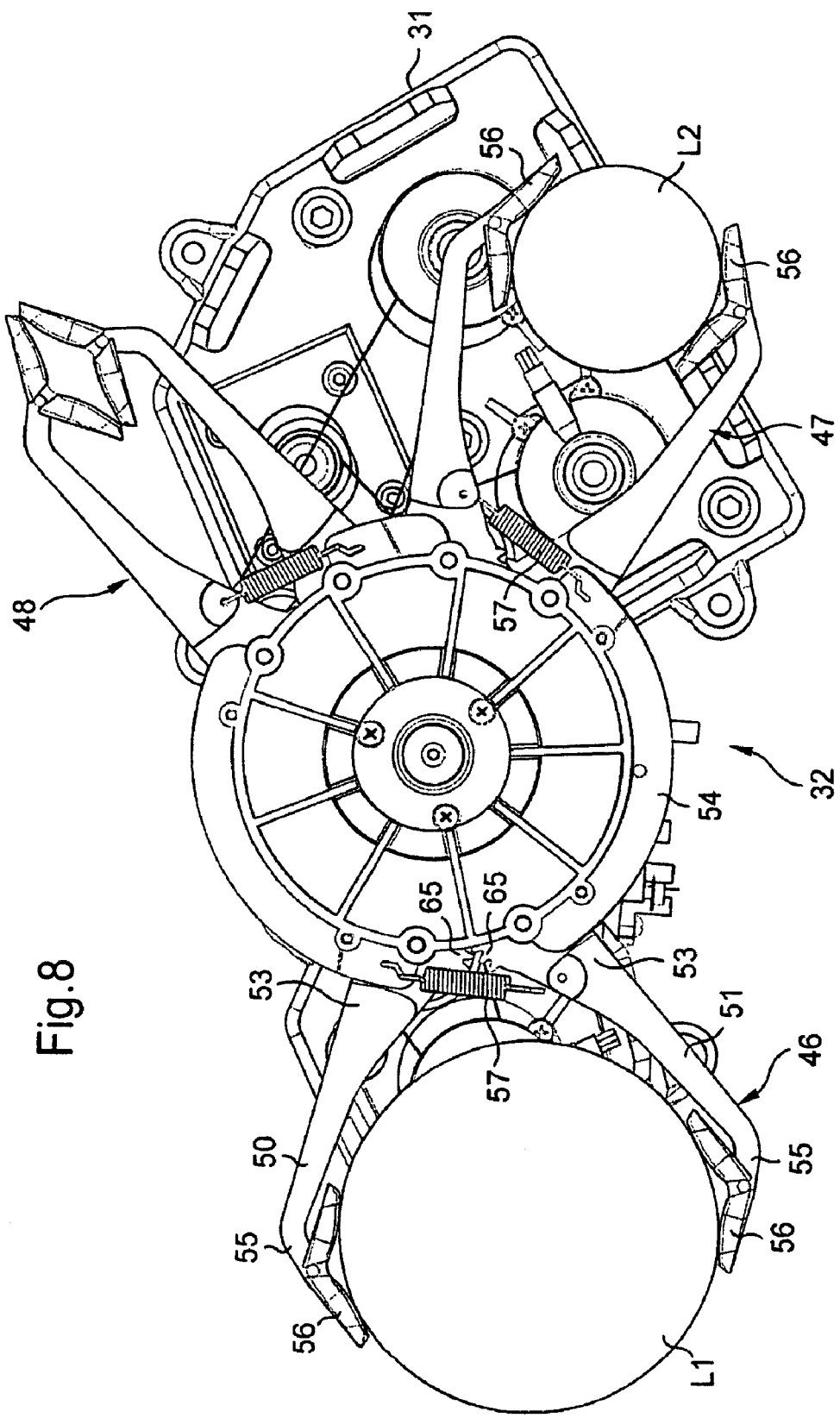

In order to simplify the mechanism, the roots 53 of the branches 50, 51 of each of the clamps 46 to 48 co-operate mutually by gearing. For this purpose, and as can be seen in FIG. 8, each of the roots 53 possesses a toothed arc 65 facing towards the adjacent root 53. It thus suffices for the fork 61 to be carried by only one of the two branches 50 and 51 of a clamp for both of the branches to be moved and for the clamp to be opened.

It will thus be understood that with each of the clamps 46 to 48 being urged towards the closed position by its spring 57, the actuator fork 61 that enables the clamp to be opened is arranged to come into engagement with a corresponding complementary actuator head 60 of the drive mechanism when the carousel 2 is in a determined position, and only when it is in that position. It should be observed that the drive mechanism 60 to 65 is not on board the carousel 2, but on the contrary it is stationary, being associated with the structure of the device. As a result, only the on-board clamps 46 to 48 revolve with the carousel, thereby avoiding any moving electrical connection. In addition, the carousel is lighter in weight, thus presenting lower inertia and thus being easier to control accurately in turning.

Furthermore, each of the fingers 56 of the clamps 46 to 48 presents an inside face 56.1 for engaging a lens, which face is curved in shape and occupies a substantially vertical plane. The height of this gripping face of each finger is sufficient relative to the thickness of the lenses to be capable of taking hold of said lenses firmly via their edge faces. For example, provision could be made for a height lying in the range 10 mm to 20 mm that is suitable for all prescriptions. The bottom flanks 68 of the fingers 56 are provided with crenellations 69. In addition, and as can be seen in FIG. 6A, the projecting portions 68.1 of the crenellations of the bottom flank 68 of each finger 56 projects horizontally inwards so as to form a wedge-shaped scraper tooth 68.1 serving to receive the lens when the clamps tighten.

Figure 4:
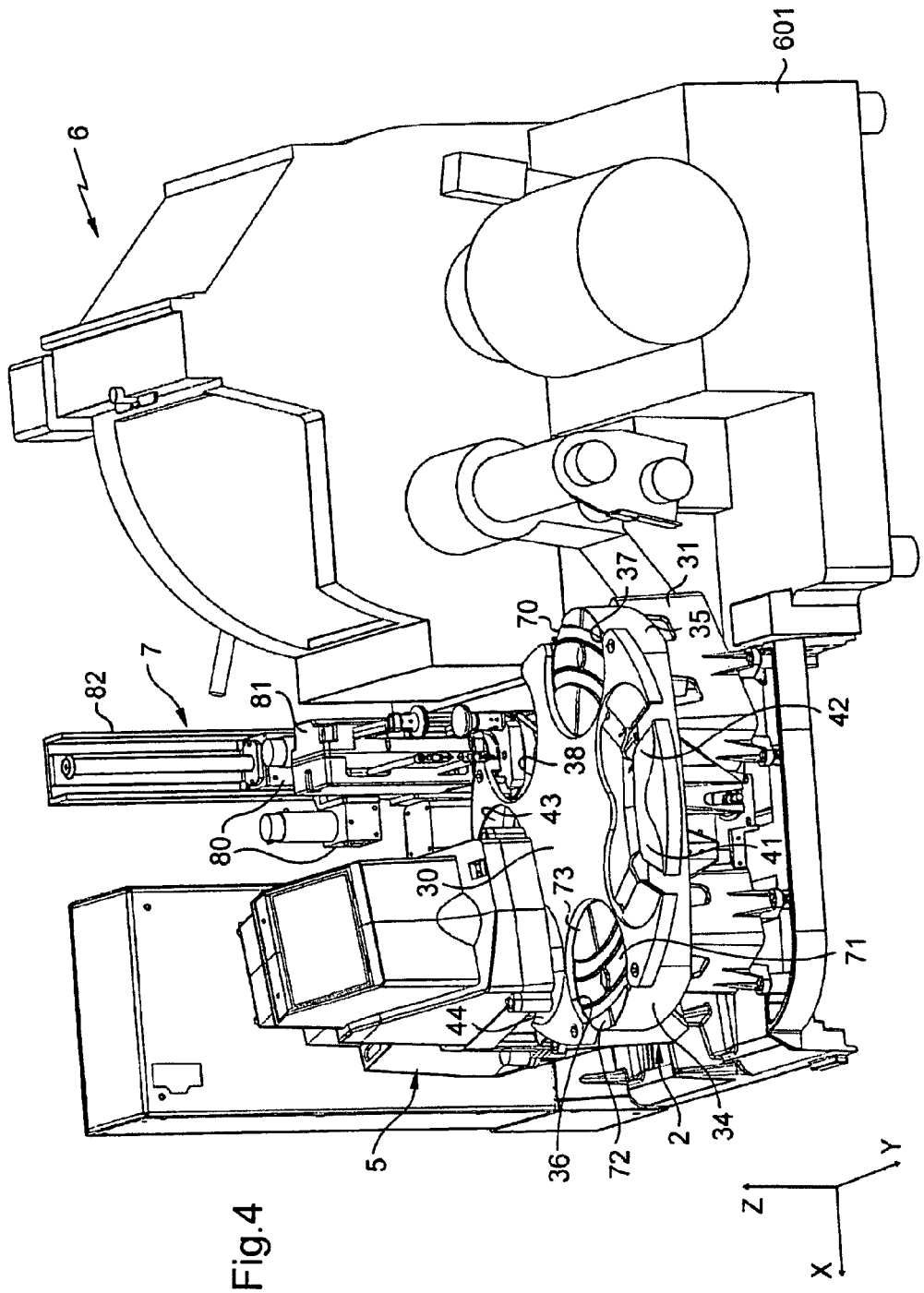
FIG. 4 is a perspective view of the inside of the automatic preparation device.
Figure 6:
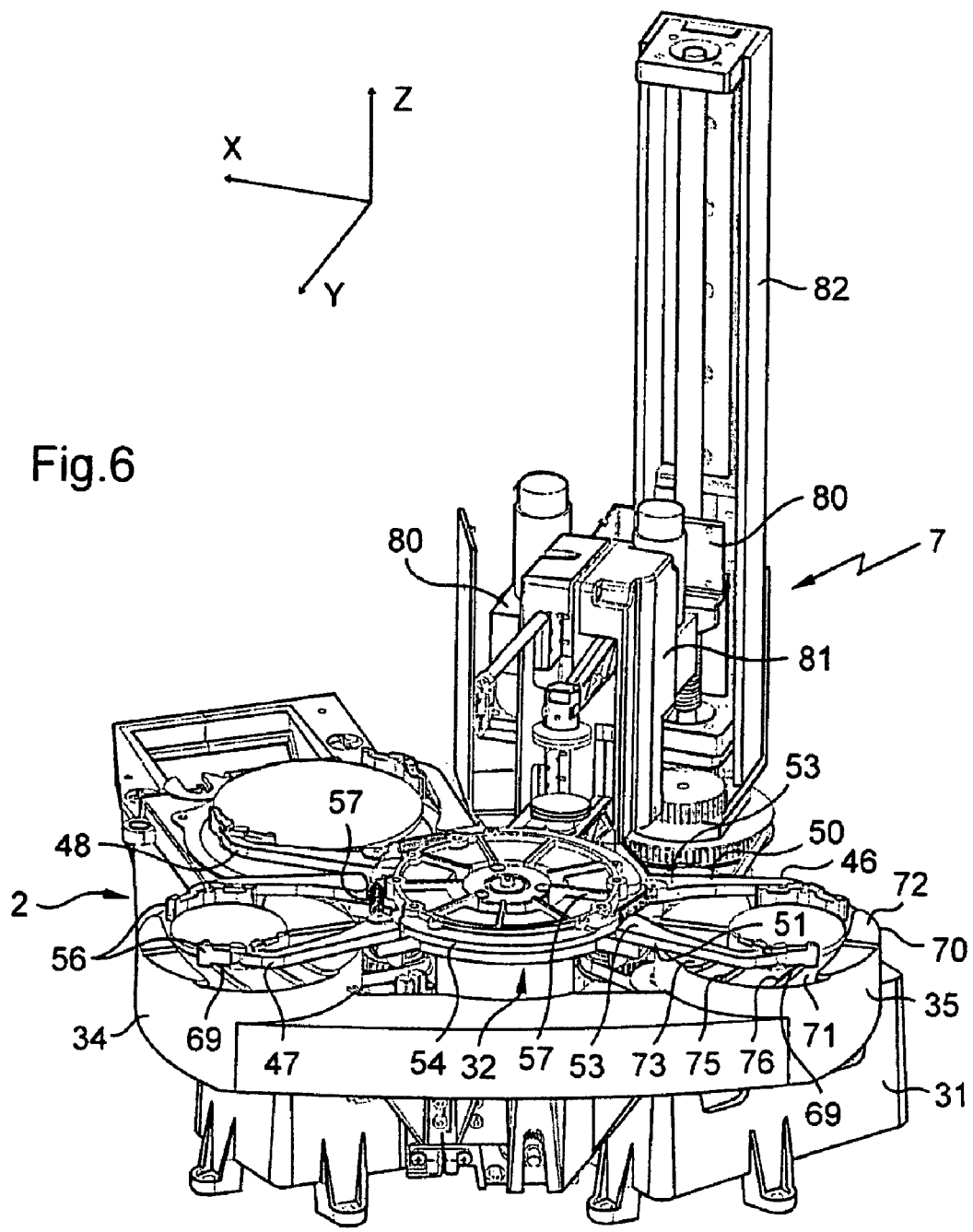
FIG. 6 is a perspective view of a portion of the automatic preparation device, from which the carousel of the reception and first and second transfer means has been removed, revealing the clamps of the reception and first and second transfer means, together with their actuator mechanism.
Figure 7:
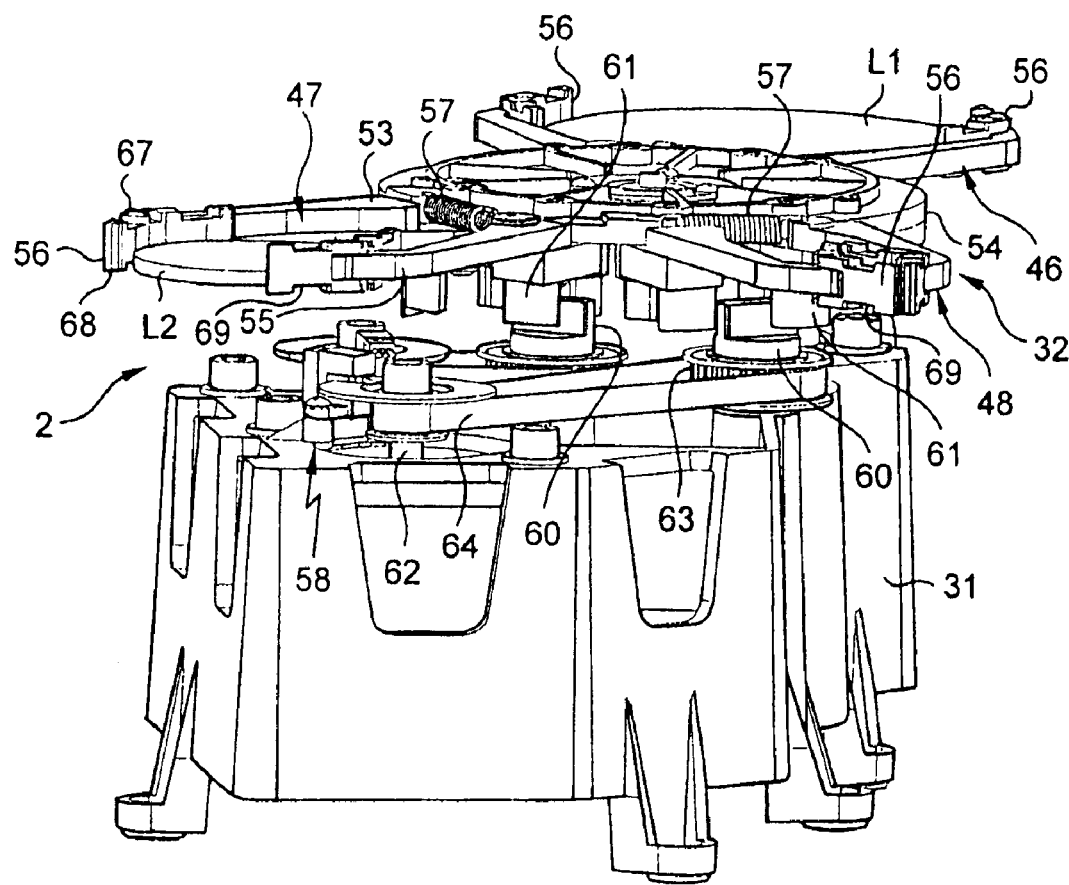
FIGS. 7 and 8 are respectively a perspective view and a plan view of the mechanism for opening the clamps of FIG. 6.
Figure 6A:
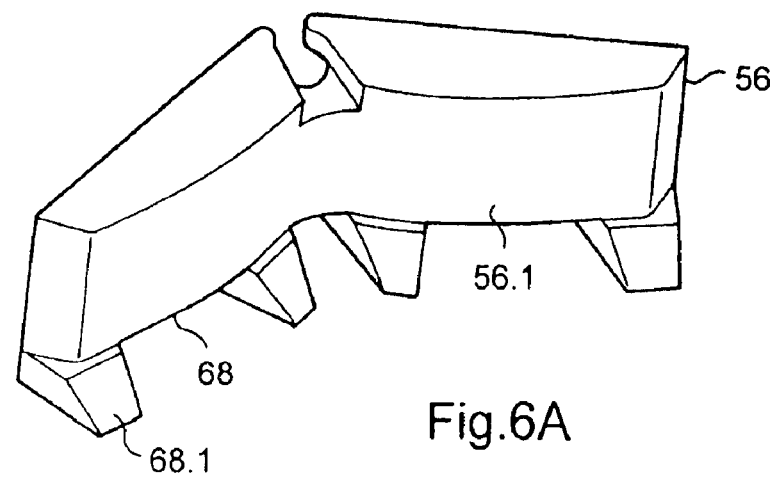
FIG. 6A is a detail view in perspective on a larger scale showing one of the clamp fingers of FIG. 6.

As shown more particularly in FIGS. 4 and 6, each of the seats 34, 35 possesses a top face 70 facing towards the loading and unloading turntable 30. While being loaded on the turntable 30, the lenses for cutting to shape are placed on the top face 70 of each of the two seats 34, 35. Advantageously, set back from the top face 70 of each seat, there is provided a central groove 71 arranged in such a manner that the top face 70 is divided into two bearing zones, an outer zone 72 and an inner zone 73, for bearing against the lenses on either side of the central groove 71. This central groove is curved in shape, with its center of curvature corresponding substantially to the center of rotation of the hub 54 carrying the clamps 46 and 48 and the turntable 30. The depth of the central groove 71 is adapted so that at least some of the crenellations 69 move inside the groove during closure and turning of the clamps. Advantageously, the depth of the groove 71 is substantially equal to one-third of the height of the fingers 56 of the clamps 46 to 48. Thus, during closure, the clamps 46 to 48 come into engagement with the edge face of the lens over its entire thickness and the side faces of the fingers 56 even project downwards, i.e. towards the bottom of the groove 71. This disposition makes it possible to ensure that the lens is held securely and firmly, even when the lens is of small thickness.

In order to ensure better that the lens is seated stably and horizontally, in particular when it is of small size like the right-hand lens in FIG. 6, two beads 75, 76 are formed in the bottom of the central groove 71. Each of the beads 75, 76 possesses a top edge situated in the same plane as the top face 70, and thus serves to provide a plane bearing surface for the lens in addition to the bearing zones 72, 73. These are mutually spaced apart in the form of circular arcs so as to co-operate with the hollow portions in relief of the crenellations 69 of the bottom face 68 of the fingers 56 during closure of the clamps 46 to 48. In a variant, these beads may also have a second function: that of guiding the movement of the fingers 56 during closure and opening of the clamps 46 to 48.

In addition, the seats 34, 35 are mounted on the structure 31 in such a manner as to be vertically movable, like an elevator, between a high position in which the top faces 70 of the seats are in the vicinity of the fingers 56 of the clamps 46 to 48, and a low position in which the top faces of the seats are spaced apart from said fingers 56. Thus, the seats 34 and 35 are in a high position when the lenses are loaded onto the turntable 30 in order to be held in place by the clamps, and they are in a low position when the lenses are taken by the clamps so as to be moved to the following station, i.e. the measurement device 5. In the low position, the seats 34 and 35 are retracted to allow the clamps and the lenses to move freely.

Preferably, the measurement device 5 and the feeler, gripper, and third transfer means 7 are situated side by side in a position diametrically opposite the access door 26. The measurement device 5 is situated at least in part vertically over the path followed by the loading spaces 36 to 38 and unloading spaces 41 to 44 so that the lenses L1, L2 remain carried by the loading and unloading turntable 30 while their characteristics are being determined.

In addition, the cutting-out device 6 is placed adjacent to the loading and unloading turntable 30, and the feeler, gripper, and third transfer means 7 are interposed between the measurement device 5 and the cutting-out device 6.

Combined Feeler, Gripper, and Third Transfer Means

Figure 13:
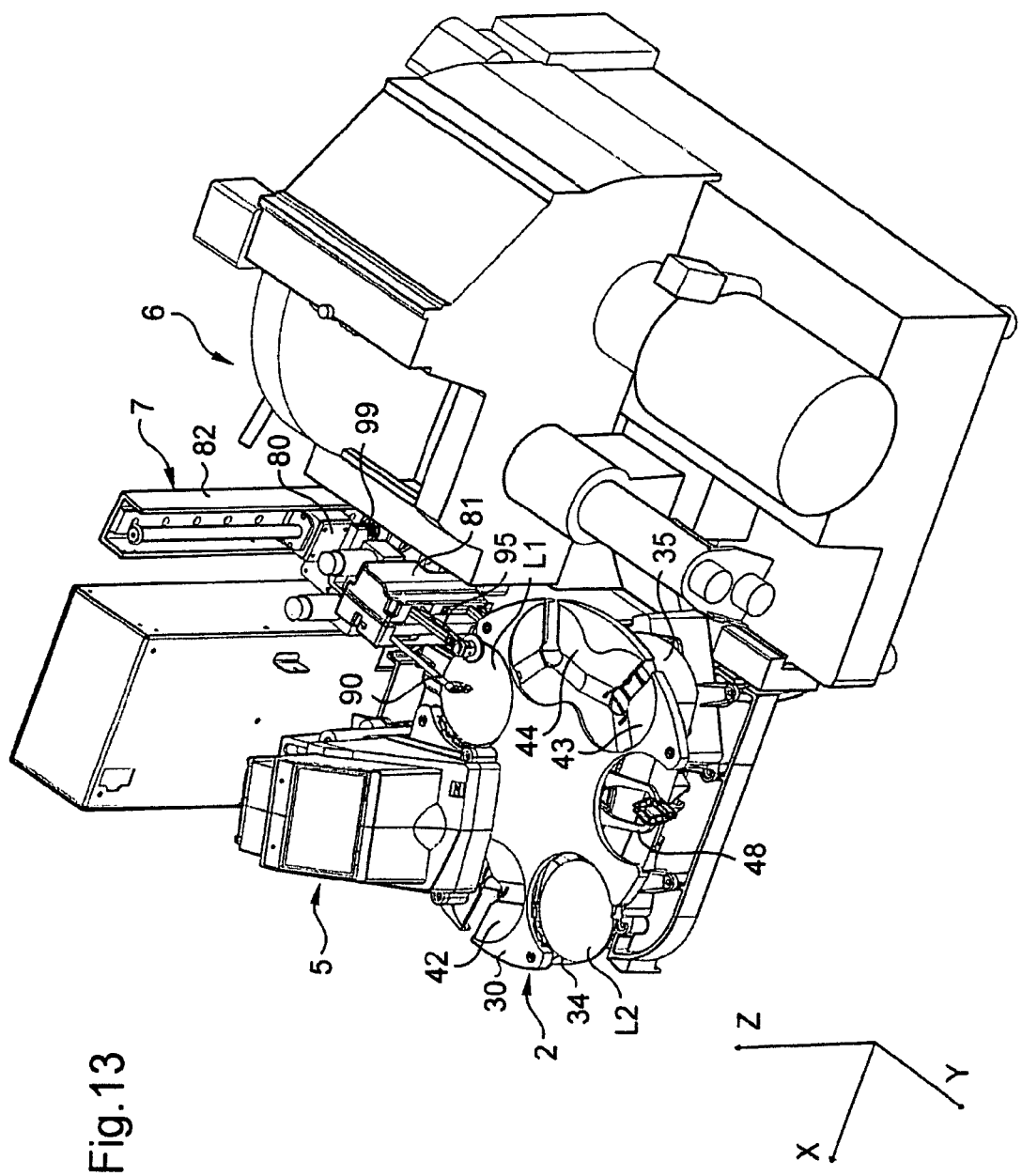
FIG. 13 is a perspective view of the preparation device in a configuration in which the first lens, after a second transfer, is brought into an intermediate position in order to be felt and for its third transfer, in register with the feeler, gripper, and third transfer means.

After certain characteristics of the lens L1 have been determined by means of the measurement device 5, in particular by implementing the method described at the beginning of the present description, the loading and unloading turntable 30 is again turned so as to subject the lens L1 to a second transfer, bringing it into register with the feeler, gripper, and third transfer means 7 (FIG. 13). The lens L1 is then in a so-called "intermediate" position.

In order to identify the lens L1 correctly, it is necessary to add to the preceding measurement by feeling the lens. As a general rule, it is of interest to know the height e of the lens relative to the measurement device 5, and also to an axis referred to below as the boxing axis, written AB and defined below with reference to FIG. 14.

It is recalled that the optical center CO of the lens is the point where it presents no prism deforming the image. The optical axis AO is the axis perpendicular to the plane of the lens passing through the optical center CO. The height e is calculated by feeling the lens at the location of the optical center CO.

The gripping and blocking point of the lens where blocking is to be performed is also defined. This point is selected to coincide with a point referred to as the boxing center CB, well known to the person skilled in the art, and constituted by the point of intersection of the diagonals of the horizontal rectangle in which the shape of the outline desired for the lens after being cut to shape is defined in use (defining the horizontal). This boxing center is determined by the measurement device 5 as a function of the measured identification characteristics of the lens and of parameters concerning the morphology of the wearer and the geometry of the selected frame. For one of the two main faces of the lens, specifically the convex front face, a docking and blocking axis, known as the boxing axis AB, is defined as being the axis that is substantially normal to the surface of the corresponding face of said lens and passing through the boxing center CB.

The feeler, gripper, and third transfer means 7 are designed and arranged to cause a blocking chuck to dock against one of the two main faces of the lens (specifically the convex front face) by moving the first chuck in translation relative to the lens along the boxing axis associated with said face. The blocking chuck is applied against the convex front face by being brought up thereto in translation along the docking direction AB, with this movement in translation being maintained rigidly without any angular movement.

Figure 15:
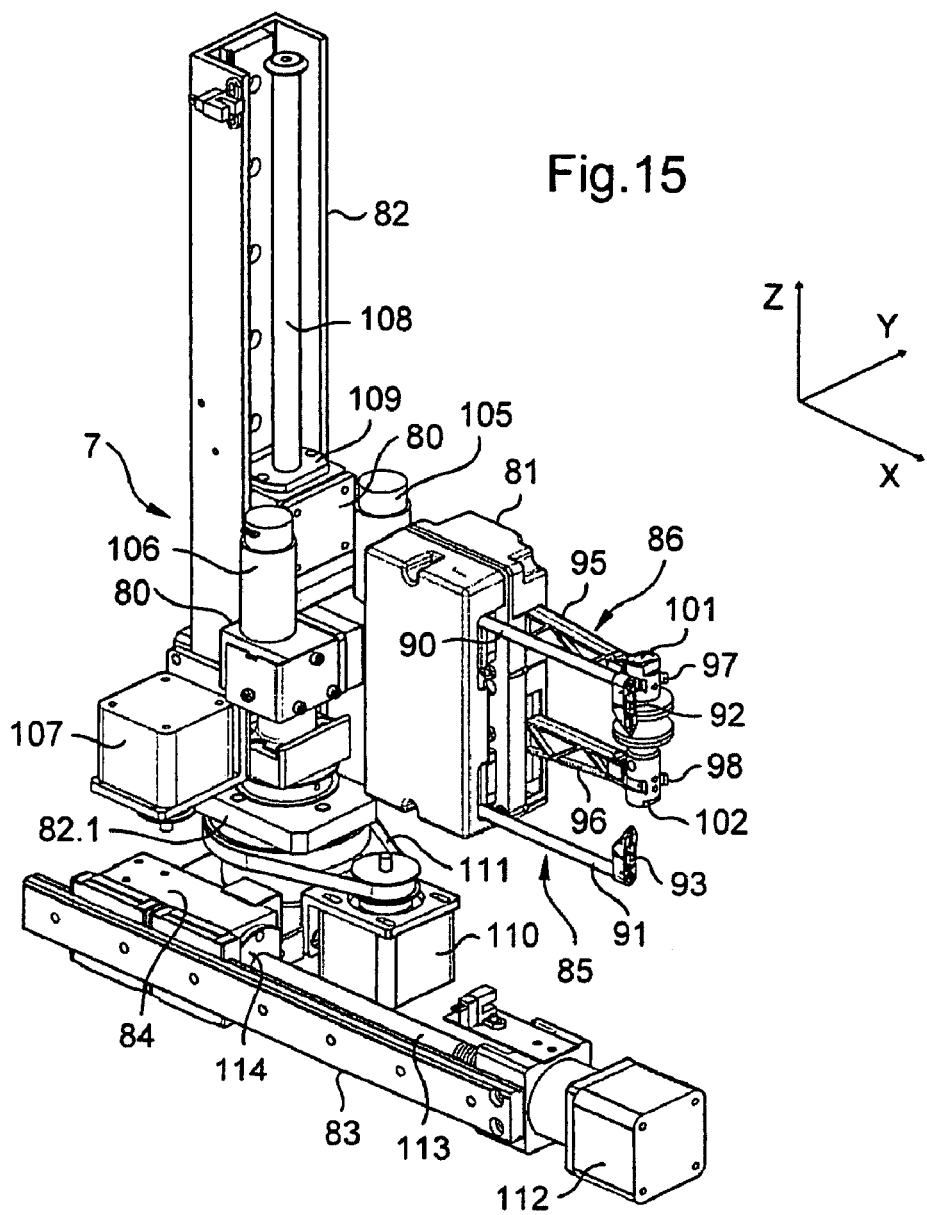
FIG. 15 is a perspective view of the combined feeler, gripper, and third transfer means on their own.

As can be seen more particularly in FIG. 15, the feeler, gripper, and third transfer means 7 are in the form of a member or arm serving firstly to feel the lenses L1 and L2 and secondly to handle the lenses for transfer purposes (third transfer) towards the cutting-out device 6.

For this purpose, the feeler, gripper, and third transfer arm 7 possesses a wrist 81 that has five controlled degrees of freedom of movement relative to the common frame comprising, in the configuration shown in FIG. 15: horizontal translation along the X axis, vertical translation along the Z axis, and three degrees in rotation about the X, Y, and Z axes.

In this embodiment, movement relative to these axes is controlled by electric motor means. However, the person skilled in the art could provide for implementing other control means, such as pneumatic or other means. Regardless of the way in which drive is provided, it is controlled by the electronic and computer system 100.

In practice, and as shown in greater detail in FIG. 15, the wrist 81 is hinged to a support slab 80 so as to be capable of pivoting relative thereto about the X and Y axes. The slab 80 is itself mounted to move in vertical translation along the Z axis on a vertical beam 82 that acts for this purpose as a slideway. The vertical beam 82 is carried at its bottom end by a turret 82.1 that is mounted to rotate about the Z axis on a carriage 84. The carriage 84 is mounted on a horizontal beam 83 associated with the common frame and forming a slideway for sliding along the X axis. By way of example, the beam 83 may be secured to the structure 31.

These five degrees of freedom of the wrist 81 in the stationary frame of reference (X, Y, Z) are controlled by various electric motors driven via a suitable power electronics card by the electronic and computer system 100. Thus, rotations of the wrist 81 relative to the slab 80 about the X and Y axes are controlled by respective motors 105 and 106. Vertical sliding of the slab 80 is controlled by a motor 107 associated with the beam 82 and driving a screw 108 engaged in a nut 109 secured to the slab 80. Rotation of the turret 82.1 carrying the vertical beam 82 about the vertical Z axis is controlled via a belt 111 by a motor 110 whose body is secured to the carriage 84. Finally, the horizontal sliding of the carriage 84 is controlled by a motor 112 associated with the horizontal beam 83 and driving a screw 113 engaged in a nut 114 secured to the carriage 84.

In order to perform the distinct functions both of feeling and of gripping, the wrist 81 of the arm 7 is provided with feeler means 85 and gripper means 86 that are distinct and independent of each other.

The feeler means 85 are arranged to feel, independently or in combination, the two main faces (front or convex face 8 and rear or concave face 9) of the lenses L1 and L2. For this purpose, the feeler means 85 have two branches 90 and 91 that are substantially rectilinear and that each of which terminates at a bent free end forming a feeler tip 92, 93. The two tips 92, 93 of the two branches 90, 91 point towards each other so as to be brought into contact with the front and rear faces 8 and 9 respectively. Each of the two tips 92 and 93 has a mechanical feeler of conventional type mounted thereon, operating merely by mechanical contact.

One and/or the other of the two branches 90 and 91, and in this example both branches 90 and 91 (see FIGS. 16 to 18) can be moved in translation on the wrist 81. This movement in translation enables the two tips 92 and 93 to be moved apart or towards each other. The movement in translation or the branches 90 and 91 are controlled independently of each other by electric encoder motors 180, 181 integrated in the housing of the wrist 81 and under the control of the electronic and computer system 100. Movement in translation and continuous tracking of the position of the branches 90 and 91 are performed by the electric motors 180, 181 via respective rack-and-pinion mechanisms 184 & 182 and 185 & 183, each pinion 182, 183 being driven by the corresponding motor 180, 181, and the associated rack 184, 185 being secured to a corresponding branch 90, 91.

The gripper means 86 are in the form of a blocking clamp constituted by a top jaw 95 and a bottom jaw 96 that are movable relative to each other in translation or in pivoting. In the example shown, the bottom jaw 96 is mounted to move on the wrist 81 so as to slide on a rail 87 in the same direction in translation as the feeler branch 90, for example being driven in translation by a screw-and-nut mechanism 99 driven by an encoder motor integrated in the housing of the wrist 81. The top jaw 95 is mounted stationary on the wrist 81.

The jaws 95 and 96 are substantially rectilinear in shape, being generally parallel to the feeler branches 90, 91, and they are provided at their free ends with releasable clip-fastener means 97, 98 implemented in this embodiment by an open C-shaped resilient ring constituting a clip. These clip-fastener means are for receiving the chucks 101, 102 for gripping and blocking the lens.

The pair of chucks 101, 102 mounted in this way at the ends of the gripper jaws 95, 96 serve to grip the lens and subsequently, on the cutting-out means to block the lens which is sandwiched between them. In general, each chuck possesses both axial fastener means and also transverse fastener means. The two chucks are transferred by means of the feeler, gripper, and third transfer arm 7 together with the lenses they are carrying or blocking, from the reception and first transfer carousel 2 to the cutting-out device 6. This is the third transfer of the lens in question, as is explained in greater detail below when describing the preparation method.

Nevertheless, attention is drawn at this point to an important characteristic of the two functions performed by each chuck: the transverse fastener means are arranged to cooperate with the arm 7 and the axial fastener means are arranged to co-operate with the clamping and rotary drive shafts 612, 613 of the edger. The chucks 101, 102 thus perform two functions. When they are associated with the arm 7, they constitute endpieces of a clamp for gripping and transferring the lens. When they co-operate with the shafts 612, 613 of the edger, they constitute abutments for blocking and driving the lens in rotation. It can thus be understood that this third transfer of the lens performed with the chuck engaging the lens presents the major advantage of avoiding any loss of a frame of reference.

As shown in particular in FIGS. 28 to 31, each gripping and blocking chuck 101, 102 is generally in the form of a mushroom that is circularly symmetrical about an axis which, in operation, is common to both chucks 101, 102. More precisely, each chuck comprises respectively a central peg 161, 162 that is not deformable, extended outwardly by a collar 163, 164 that is elastically deformable. Each collar is shaped to present a bearing surface 165, 166 suitable for coming into contact with the lens L1 and for matching the shape thereof under the effect of an axial clamping force. Such an axial clamping force is applied in opposite directions to both chucks together, either by the jaws 95, 98 of the third transfer member 7, as shown in particular in FIG. 28, or by the shafts 613, 612 of the cutting-out means as they approach each other for final blocking of the lens on said shafts, as shown in FIGS. 29 and 30. In the example, the application surfaces 165, 166 have peripheral portions belonging to said collars, and central portions belonging to the pegs themselves.

In addition, in the example shown, the application surface 165, 166 of each chuck is covered in a thin lining 167, 168 of plastics material or of elastomer material. The thickness of this lining is of the order of 1 mm to 2 mm. By way of example, it may be constituted by flexible PVC or by neoprene.

As can be seen in FIG. 30, the application surfaces 165, 166 of the two chucks 101, 102 do not have exactly the same shape. The chuck 101 for co-operating with the front face of the ophthalmic lens has an application surface 165 that is concave in its unstressed state. The chuck 102 that is for co-operating with the rear face of the ophthalmic lens has an application surface 166 that is substantially plane in its non-stressed state.

It is shown in greater detail that the chucks 101, 102 are transferred to the cutting-out means together with the lens they are gripping, and thus perform blocking of the lens against the cutting-out means without any other repositioning.

When difficulty is anticipated in cutting out the lens, because of the coating material on the lens or because of the special shape to which the lens is to be cut, the blocking of the ophthalmic lens for cutting-out purposes can make use of a reference pad 145 either instead of or in combination with the blocking chuck 101. Such a pad 145 is visible in FIG. 32 and it possesses an adhesive application surface 147 for being secured temporarily on the lens.

In contrast, the application surface 165 of the chuck 101 does not present any adhesive property, but is suitable for co-operating by friction with the lens in order to prevent it from moving.

For co-operation between the reference lens 145 and the blocking chuck 101, the central portion of the peg 161 of the chuck 101 is hollowed out and then presents a stepped axial housing 144 opening out to the application surface and arranged to receive the adhesive reference pad 145, as is explained in greater detail below. The housing 144 opens out in the center of the application surface 165 of the blocking chuck 101.

The reference pad 145 is substantially smaller than the blocking chuck 101, so as to be suitable for use with lenses of all shapes and sizes. Thus, the application surface 165 of the blocking chuck 101 possesses an area that is at least four times greater than that of the application surface 147 of the reference pad 145. Tests have served to optimize the dimensions of the application surfaces of the pad and of the chuck: the application surface 165 of the blocking chuck 101 preferably possesses an area lying in the range 80 square millimeters ($mm^2$) to 500 $mm^2$, and the application surface 147 of the reference pad possesses an area lying in the range 20 $mm^2$ to 80 $mm^2$. The blocking chuck possesses an outside diameter lying in the range 10 mm to 25 mm and an inside diameter lying in the range 5 mm to 10 mm, and the reference pad 145 possesses a diameter that matches the inside diameter of the chuck, i.e. lying in the range 5 mm to 10 mm.

In order to index the chuck 101 in rotation relative to the adhesive reference pad 145, the stepped housing 144 possesses a cross-section of a shape that is not circularly symmetrical about the common axis AB. In the example shown, the section of the housing 144 is oval in shape.

The adhesive centering pad 145, that can be seen more clearly in FIG. 32, possesses an outside shape that is stepped in complementary manner to the housing 144 so as to be received in said housing without clearance, so as to be a snug fit. The common shape of the housing 144 and of the pad 145 is not circularly symmetrical, as mentioned above, so the pad 145 is in an indexed rotary position relative to the chuck 101.

The housing 144 is also arranged to receive the reference pad 145 in such a manner that the application surface 147 of the reference pad 145 is flush with the application surface 165 of the blocking chuck 101. Specifically, the adhesive reference pad 145 possesses an end shoulder 146 that limits its axial stroke in the housing 144 and that carries an adhesive face 147 for sticking against the lens and that is flush for this purpose with the application face 165 of the chuck 101 when the shoulder 146 is in axial abutment against the corresponding shoulder of the stepped housing 144.

As explained below when describing the method that is implemented, the adhesive reference pad 145 can thus be placed in the housing 144 of the chuck 101 so as to be optionally implanted with the chuck 101 and in addition thereto on the lens for centering and blocking for cutting-out purposes. When implanted on the lens in this way, the centering pad 145 embodies the centering frame of reference determined by the measurement means 5 independently of any direct connection between the lens and the transfer means 2 and 7 of the device.

By proceeding in this way, the centering frame of reference of the lens is embodied by the stuck-on pad 145 which remains permanently implanted on the lens even when the lens is unloaded from the device for mounting on a frame. It is thus possible to perform one or more repeat operations on the lens when it is particularly difficult to mount without losing the centering frame of reference thereof, as usually happens with adhesive blocking accessories.

However, in accordance with the invention, this centering frame of reference function is separated from the blocking function proper that is used for transmitting torque to prevent the lens from turning relative to the shafts 612, 613 of the edger. The torque transmission function is always provided by the chucks 101, 102 of shape, dimensions, and material that are adapted to the lens being cut out. The adhesive centering pad 145 can thus be unique, being suitable for all types of lenses and frames, being small in size firstly so as to avoid impeding cutting out of the lens when its outline needs to be brought to a very small size, and secondly to deposit adhesive over as small as possible an area of the lens in order to reduce the risk of scratching during cleaning. Only the chucks need to be adapted to the work that is to be carried out, as is explained in greater detail below.

The measurement means 5 are also designed to detect the presence or the absence of the reference pad 145 in a predetermined location.

The carousel for the first and second transfers 2 is provided with means 140 for receiving the reference pad 145. Specifically, and as can be seen more clearly in FIG. 32, the loading and unloading turntable 30 is fitted on its top face, beside each of the loading faces 36 and 38, with a vertical tenon 140 for receiving an adhesive centering pad 145. Slots 142 are provided in the turntable about each tenon 140. These slots, specifically three for each tenon, are in the form of portions of a disk of diameter smaller than that of the centering pad that is to be engaged on the tenon 140 via a central bore (not shown in the figures) in the pad 145.

When the operator has loaded the adhesive centering pad 145 simultaneously with loading a job on the turntable 30, the measurement device 5 detects that light 142 has been obstructed by said pad and informs the electronic and computer processor system 100.

The manipulator arm 7 serves to implant the blocking chuck 101 and the reference pad 145 together on the lens. The electronic and computer system 100 communicates with said measurement means 5 when they perform their function of detecting presence, and it is thus informed about the presence or the absence of a reference pad 145 on the turntable 30.

The electronic and computer system 100 is programmed to execute the following conditional instructions:

if the presence of the reference pad 145 is detected, the manipulator arm 7 is controlled to implant the reference pad 145 on the lens together with the blocking chuck 101;

else, the manipulator arm 7 is controlled by the system 100 to implant the blocking chuck 101, alone.

The collar and the peg of each chuck 101, 102 are made as a single piece out of the same material. Satisfactory results have been obtained by clamping the lens between the chucks using a clamping force lying in the range 400 newtons (N) to 1000 N, while making the peg and the collar out of a plastics material such as polyvinyl chloride (PVC).

For the thin lining enabling torque to be transmitted without slip, a plastics material or an elastomer should be selected that presents a coefficient of friction with the surface coating of the lens that is as high as possible.

Furthermore, and as can be seen in particular in FIG. 30, the peg 162 of the chuck 102 that is to come into contact with the concave rear face 9 of the lens L1 is hinged by means of a cardan joint 115 to a fastener portion 169. This fastener portion 169 is for connecting to the bottom jaw 96 of the member 7 or to the shaft 613 of the cutting-out means, the peg 162 then possessing freedom of angular orientation about the ball 115. This enables the peg 162 of the chuck 102 to match the local angular orientation of the rear face 9 of the lens in order to enable the lens to be clamped against the other chuck 101 whose own peg 161 is rigidly secured to the top jaw 95 of the member 7 or to the shaft 612 of the cutting-out means, without causing the lens to tilt angularly or slide transversely. This enables the lens to be held and blocked stably and accurately on the boxing axis AB. The ball joint 115 is of the cardan type, i.e. it is capable of transmitting torque about the axis of the chuck 102.

As mentioned above, the chucks 101, 102 perform two functions. Firstly they serve to grip the lens starting from its loading position on the turntable 30 of the carousel during the first and second transfers 2 when they present the lens in the intermediate position. Then, with the lens being held in this way by means of the chucks 101, 102, by the feeler, gripper, and third transfer arm 7, this arm performs the third transfer of the lens towards the cutting-out means 6. When the lens is taken over by the cutting-out means (passing the relay), the chucks retain a role of holding the lens by clamping and then perform a second function, derived from the first, which consists in blocking the lens so as to enable it to be machined in co-operation with the rotary drive and clamping shafts of the cutting-out means 6. The chucks then constitute drive abutments forming an integral portion of the cutting-out means 6. These various steps of the preparation method are described in greater detail below.

These two functions, firstly gripping and secondly blocking for cutting-out purposes, give rise to two mechanical interfaces being present on the chucks 101, 102:

one interface is a transverse interface (i.e. operating transversely relative to the axis of the chucks which coincides with the chuck clamping axis AB) to co-operate with the releasable clip-fastener means (clip means) 97, 98 of the gripper jaws 95, 96 in order to secure the chucks 101, 102 in temporary manner to said jaws;

the other interface is axial (i.e. operating along the axis of the chucks which coincides with the axis of the shafts 612, 613 of the cutting-out means 6) to co-operate with the shafts 612, 613 of the cutting-out means in order to implement firm axial clamping of the lens sandwiched between the chucks 101, 102 with rotary torque being transmitted from the shafts to the lens without slip.

Thus, in the example shown, for the releasable fastening of each chuck 101, 102 to the corresponding jaw 95, 96, the clip rings 97, 98 co-operate with receiver notches 171, 172 formed correspondingly in the chucks 101, 102 transversely to the axis of the chucks. Thus, when the chucks are fitted on the jaws 95, 96, their axes are parallel to the translation direction of the jaws, which corresponds to the clamping direction. The two chucks thus face towards each other with their application surfaces 165, 166 facing each other when they are clipped onto the ends of the gripper jaws 95, 96. The two chucks 101 and 102 can then be moved towards each other or apart from each other in order to grip or release a lens.

For its mechanical interface with the shafts 612, 613 of the cutting-out means 6, each of the chucks 101, 102 co-operates with the free end of the corresponding shaft 612, 613 via a system for mutually engaging complementary male and female portions which, by co-operating shapes, deliver rotary drive without slack. More precisely, in the example shown, each chuck 101, 102 is provided with a housing 173, 174 that is not circularly symmetrical about the axis of the chuck, but that, on the contrary, presents a shape that is conical on an oval base. The housing is for receiving an endpiece 620, 621 of complementary shape without slack that is formed at the free end of the corresponding shaft 612, 613 of the cutting-out means, so as to enable torque to be transmitted from the shafts 612, 613 to the chucks 101, 102, and thus to the clamped lens. In the example shown, the housing 173 of the chuck 101 is provided on the rear of the peg 161 remote from its application surface 165, while the housing 174 of the chuck 102 is formed in the rear of the fastener portion 169 remote from the ball 115. Each chuck is thus provided with means for constraining it to rotate with the corresponding shafts 612, 613 of the cutting-out means. After being transferred to the shafts of the cutting-out means, the chucks thus constitute abutments for driving the lenses in rotation.

As shown in FIG. 31, the mounting preparation device 1 of the present invention also includes a magazine of chucks 130 placed in the vicinity of the feeler, gripper, and transfer arm 7.

This magazine houses three pairs of chucks in a stepped configuration so as to enable the chucks to be taken easily by the arm 7.

By way of example, the magazine has three pairs 131 to 133 of chucks analogous to the chucks 101, 102 and of sizes that are adapted to the dimensions of different jobs of lenses for cutting to shape, and of material adapted to the surface treatment of the lenses, and in particular to the adhesive properties thereof. More precisely, the diameter of the application surfaces 165, 166 of the chucks is adapted to the diameter of the frames in order to optimize torque transmission and consequently machine speed.

A set of several pairs of chucks is arranged on the stepped magazine, and the appropriate pair of chucks is selected automatically. In the example shown, the magazine 130 has three stages in a staircase configuration. The top stage receives the pair of chucks 131 for cutting out lenses around an outline of small diameter; the intermediate stage receives the pair 132 for cutting out lenses around an outline of medium diameter; and the bottom stage receives the pair 133 for cutting out lenses around an outline of greater diameter.

The three stages of the magazine 130 are provided with cradles 134, 135, and 136 suitable for receiving the corresponding pairs of chucks 131, 132, 133 with vertical relative movement. The two chucks of a pair then rest in the cradle of the corresponding stage on a common axis, touching each other with their application surfaces one against the other.

The arm 7 is controlled by the electronic and computer system to pick up automatically the best adapted pair of chucks as a function of the parameters of the lens job to be prepared. The appropriate pair of chucks is taken by the arm 7 from the magazine 130 as follows. The jaws 95, 96 are presented in a common horizontal plane that also contains the common axis of the chucks of the pair in question. The clip rings 97, 98 fitted to the ends of the jaws 95, 96 then present their openings facing towards the chucks of the pair in question. The wrist 81 of the arm 7 is then advanced horizontally towards the chucks 101, 102 in such a manner that the clip rings 97, 98 engage in the notches 171, 172 about the pegs 161 and the fastener portions 169 of the chucks 101, 102. With the chucks clipped in this way to the jaws 95, 96 of the arm 7, the wrist 81 of the arm 7 is raised vertically so that the pair of chucks 131, 132, or 133 moves out form its receiver cradle 134, 135, or 136. When lens preparation has been completed and the pair of chucks used for that preparation is not suitable for use in preparing the following lens, the pair of chucks is replaced in its associated receiver cradle 134, 135, or 136 in the magazine 130 by moving in the opposite direction, initially by being lowered vertically to engage the chucks in the cradle, and then withdrawing the wrist 81 of the arm 7 in a horizontal movement against the resilience of the clip rings 97, 98 so as to force the rings to release the chucks.

In addition to the staged positioning of the various pairs of chucks in the magazine, two mechanical keying systems serve to avoid any error when distinguishing between the pairs of chucks.

A first mechanical keying system consists in the fact that the chuck carrier cradle 134, 135, 136 provided at each stage of the magazine 130 for each of the pairs of chucks possesses longitudinal and transverse dimensions that match the pair of chucks it is to receive.

The second mechanical keying means comprise firstly transverse plugging holes 120 formed in the peg 161 and in the fastener portion 169 of the chucks 101, 102, and secondly corresponding fingers or tenons (not visible in the figures) fitted to the jaws 95, 96 and projecting transversely into the clip rings 97, 98 in line with the jaws 95, 96 so as to co-operate with the transverse plugging holes 120 of the chucks 101, 102. When the two chucks of a given pair are installed in the magazine, they are coaxially in abutment, and the holes 120 formed in each of the chucks are spaced apart from the holes of the other chuck by a certain spacing that is specific to the pair of chucks in question, such that it is necessary for the electronic and computer system 100 to adjust the spacing between the branches of the gripper arm to match the spacing of the selected pair of chucks. If the spacing is wrong, then the keying fingers of the jaws 95, 96 of the arm will come into abutment against the peg 161 and/or the fastener portion 169 of the chucks 101, 102 and will not be able to penetrate into the transverse plugging holes of the chucks, thus preventing the rings 97, 98 from clipping onto the chucks in the notches 171, 172.

In a variant, provision could be made for the spacing of the plugging holes 120 in the chucks stored in their cradles of the magazine to be the same for all of the chucks, such that the jaws 95, 96 of the arm can take hold of all of the chucks at a constant spacing regardless of which pair of chucks is intended. Under such circumstances, keying consists, after the chucks have been taken by the jaws of the arms, in measuring the spacing between the plugging holes 120 by clamping the two jaws together so as to abut the chucks against each other and clamp the chucks against a reference spacer of known thickness. This measurement makes it possible to verify whether the pair of chucks that has been taken is the pair desired for cutting out the job being prepared.

Controlling Electronic and Computer System

The device 1 has a controlling electronic and computer system 100 constituted in this example by an electronics card designed to control in coordinated manner the measurement means, the cutting-out device, the receiver and first and second transfer means, and the feeler, gripper, and third transfer means for automatically processing a lens in application of the automated processing method that is described below.

By way of example, and in conventional manner, the electronic and computer system 100 comprises a mother board, a microprocessor, random access memory (RAM) and a permanent bulk memory. The bulk memory contains a program for executing the automated method of preparing lenses for mounting in accordance with the invention and as described below. This bulk memory is preferably rewritable and advantageously removable in order to enable it to be replaced quickly or to be programmed on a remote computer via a standard interface.

Covering and Controlling Access

As shown more particularly in FIG. 2, the mounting preparation device 1 of the present invention is enclosed in a cover 20 which prevents untimely access to all of the component parts of the device.

The cover is in the form of a casing that presents a front face 21, and an opposite rear face 22. The front face 21 is designed to face the operator and it possesses a top portion 23 and a bottom portion 24 that are substantially vertical, these two portions 23 and 24 being spaced apart by a substantially horizontal flat 25.

Figure 3:
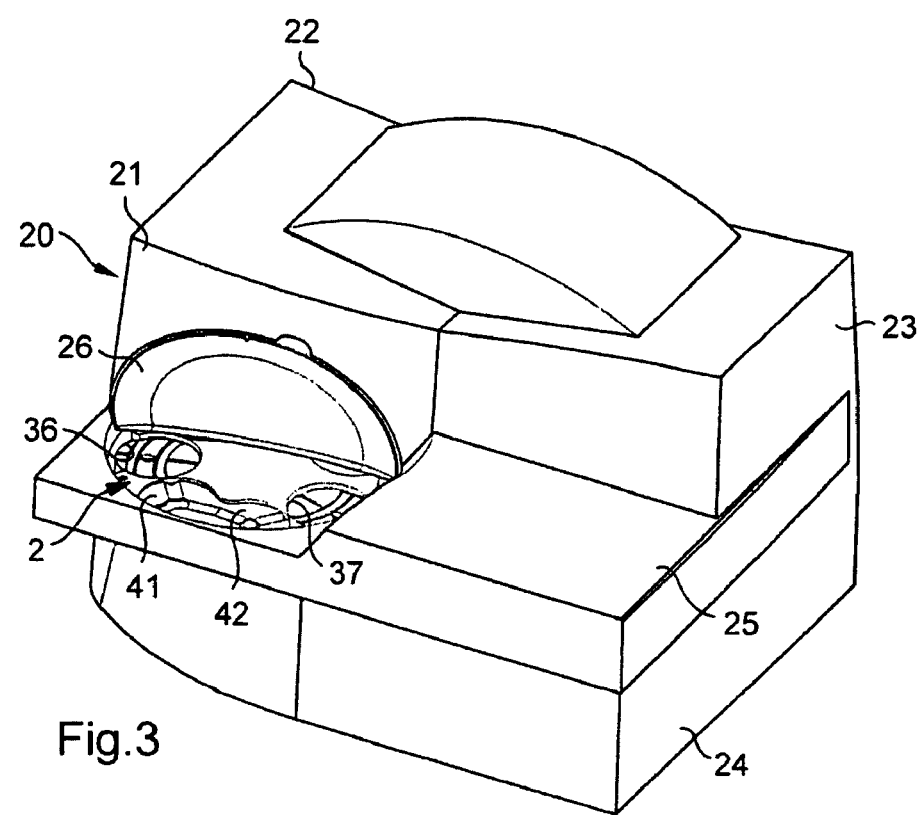
FIG. 3 is a view similar to FIG. 2, with an access door of the cover shown open for loading lenses that are to be prepared onto reception and first and second transfer means, and for unloading lenses therefrom.

An access door 26 is hinged to the flat 25 between a horizontal closed position and a vertical open position as shown respectively in FIGS. 2 and 3. Only this access door 26 hinged on the cover 20 gives access when open to the receiver and first transfer means 2, as described more fully below.

The device of the present invention thus makes it possible to automate all of the operations, avoiding any operator intervention, and thus minimizing risks.

Operation (Automated Processing Method)

The mounting preparation device described above is implemented using an automated method that is described below.

In accordance with a specific characteristic of the invention, it is proposed to process lenses in jobs. The term "job" is commonly used in the ophthalmic business and designates of a pair of associated lenses L1 and L2 belonging to the same pair of eyeglasses and consequently for mounting on the same frame to be worn by a user.

The device described also makes it possible to process a plurality of jobs (typically two jobs) simultaneously, at least in part, i.e. one job in the background while the other job is also being processed.

Automatic Processing for Preparing a Job for Mounting (First Job, J1)

Generically, the processing of a job comprises the following steps.

Preliminary step—Inputting or Transmitting Job Input Data.

As shown in FIG. 38, in order to achieve proper optical mounting, the frame selected by the user is placed on the user's nose in a preliminary step and various measurements are performed thereon using an appliance referred to as a "pupillometer" or "PD meter", or any other appliance for imaging or measuring morphology.

With the pupillometer, the operator obtains a certain amount of data, including:

the pupillary distance D representing the distance between the two pupils P1, P2; and the pupillary half-distances representing the distance between each pupil P1, P2 and the center 13 of the nose of the frame worn by the user.

Thereafter, the optician determines the height H that represents the distance vertically below each pupil P1, P2 between the pupils P1, P2 and the bottom edge of the rims C1, C2 of the frame worn by the user, with this being done manually for example, using a ruler, or by imaging. This height can be measured either using presentation eyeglasses possessing the frame selected by the user and having the locations of the user's pupils marked on its lenses with a felt tip so that the distance can be measured with a rule, or else by means of a digital system for taking an image and processing that image. This measurement thus includes information about the shape of the selected frame.

This information relating to the morphology of the user is then input by the operator using an appropriate interface (typically a keyboard and a screen) and is stored in a memory of the electronic and computer system 100.

Furthermore, information representative of the outline of the selected frame is also delivered to the electronic and computer system 100, which puts that information in its memory. By way of example, the information may be selected by the optician and then extracted from a database stored locally in the memory of the electronic and computer system 100, or from a remote server accessible over the Internet, or over a secure point-to-point connection.

Finally, the optician or operator inputs into the memory of the electronic and computer system 100 the parameters of the prescription relating to the user for whom the job being prepared is intended. This includes in particular the cylindrical power axes and the prismatic axes and powers, and possibly also cylindrical, spherical, and where appropriate power addition powers.

Step 1.1—Presenting the loading and unloading turntable 30 in the loading position.

Where necessary, the electronic and computer system 100 controls rotation of the loading and unloading turntable 30 to present two free loading places 36, 37 in register with the access door 26.

Step 2.1—Opening the access door 26.

Initially, the access door 26 is held closed. As a general rule, the access door is kept closed so as to protect the internal members of the machine and in particular the loading and unloading turntable 30.

The access door of the device is opened at the request of the operator. At the request of the operator, opening of this door is authorized by the electronic and computer system 100 in restrictive manner during the loading and unloading steps, as explained below.

Step 3.1—Loading the lenses.

Figure 10:
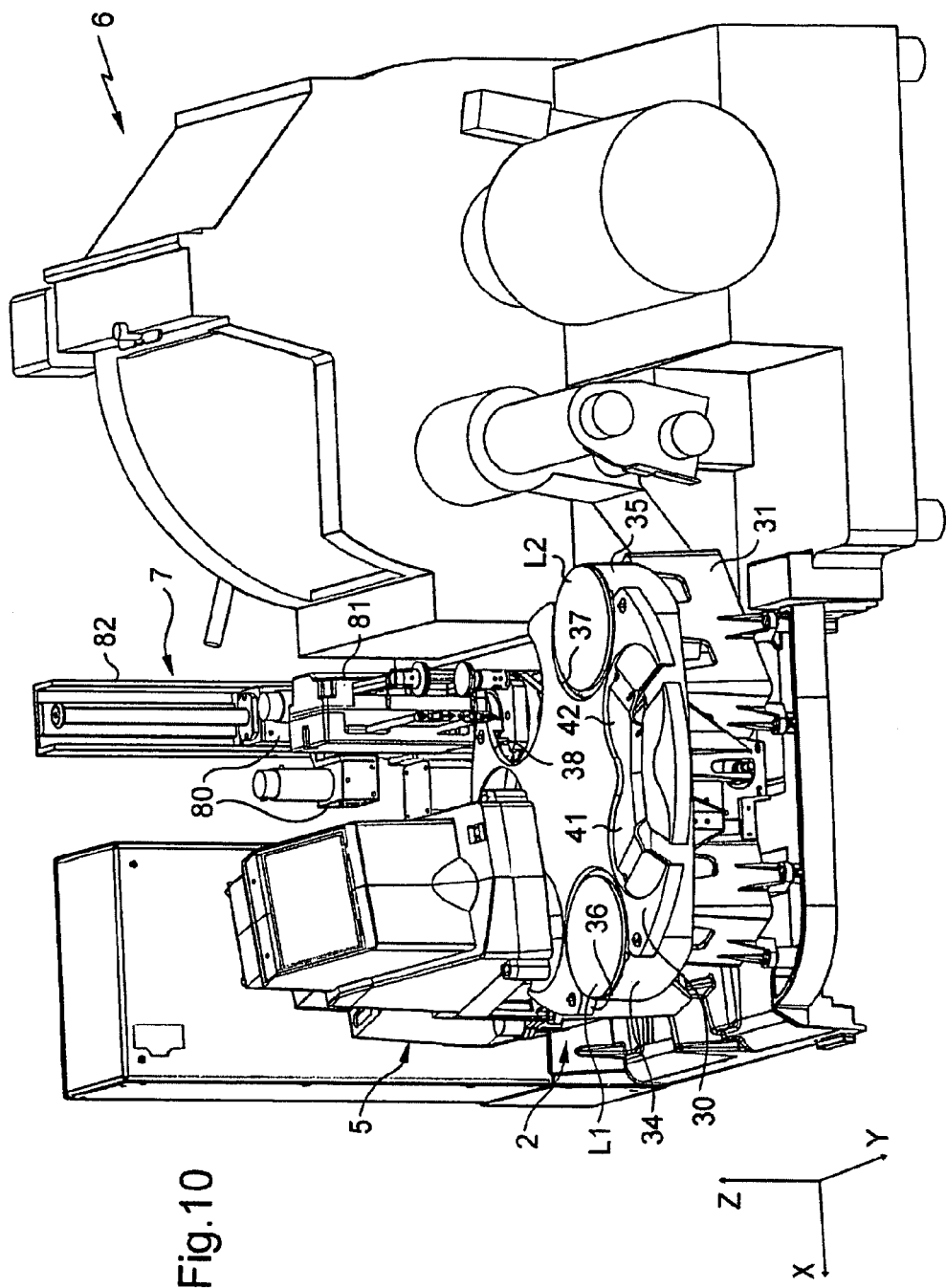
FIG. 10 is a perspective view of the preparation device in the FIG. 9 configuration, with its cover removed.

As can be seen in FIGS. 9 and 10, the loading and unloading turntable 30 is turned so as to occupy identified positions, and in particular a loading position in which only two loading places 36 and 37 and two unloading places 41 and 42 are accessible to the operator after the access door 26 has been opened. The third loading place 38 and the other two unloading places 43 and 44 are masked by the remainder of the cover 20. The operator thus cannot make a mistake when loading and unloading jobs onto and off the turntable 30.

In this identified loading position, the clamps 46 and 47 corresponding to the loading places 36 and 37 are open and the two seats 34, 35 are in the high position. In this high position, the seats 34, 35 mask the clamps 46, 47 laterally, thus acting in combination with the cover 20 to prevent firstly any untimely handling of the clamps by the operator, and secondly any intrusion of an article into the inside of the device which would run the risk of damaging its moving internal components.

It is thus possible to load a first job of two lenses L1 and L2 on the respective bearing zones 72, 73 of the top faces 70 of the seats 34 and 35. In practice, the two lenses L1 and L2 of the first job J1 are placed manually by the operator on the two loading faces 36, 37 of the loading and unloading turntable 30 that are accessible through the access door 26. This is the only physical action taken by the operator on the lenses. Naturally, it is also possible to envisage loading the lenses automatically.

Step 4.1—Lowering the seats and clamping the lenses.

Figure 11:
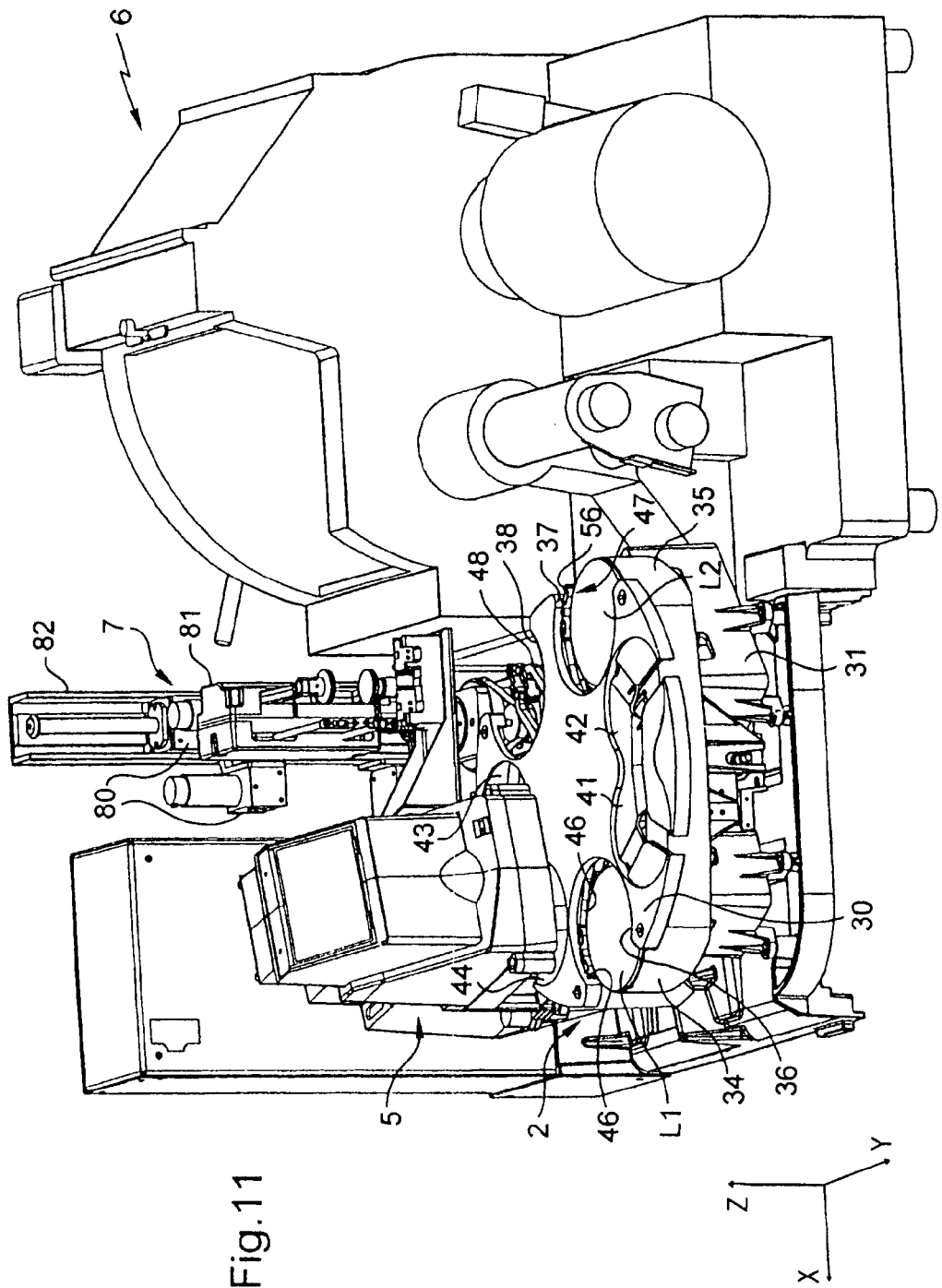
FIG. 11 is a perspective view of the preparation device in a configuration in which the first two lenses are ready to be held stationary by the two clamps of the reception and first and second transfer means.

The two seats 34 and 35 are then controlled so as to move towards their low position in which the lenses L1 and L2 are situated level with the fingers 56 of the respective clamps 46 and 47 (FIG. 11). The clamps are then controlled to take up their closed positions so that the end plates of the fingers 56 are clamped against the lenses L1 and L2.

While the clamps 46 and 47 are closing, the crenellations 69 on each clamp move into the groove 71 of the corresponding seat 34, 35 as the clamps close and turn, such that the clamps 46, 47 take hold of the edge faces of the lenses over their entire thicknesses and extend beyond them on both sides.

The two lenses L1 and L2 of the first job J1 are thus clamped over the full thickness of their edge faces by the clamps 46, 47 of the loading and unloading turntable 30. It will be understood in particular that having the clamps projecting beyond the edge faces of the lenses on both sides serve to ensure that the lenses are held securely and firmly, even when they are of small thickness.

The third clamp 48 corresponding to the third loading place 38 remains in the closed position (being urged thereto by the resilient means 57).

Step 5.1—Lowering the seats 34, 35 of the lenses.

With the lenses L1 and L2 gripped by the clamps, the seats of the lenses are retracted further downwards like an elevator so as to avoid any rubbing during the following step.

Step 6.1—First transfer of the first lens: turning the loading and unloading turntable 30 so as to pass the first lens L1 of the job J1 into the measurement device 5.

Figure 12:
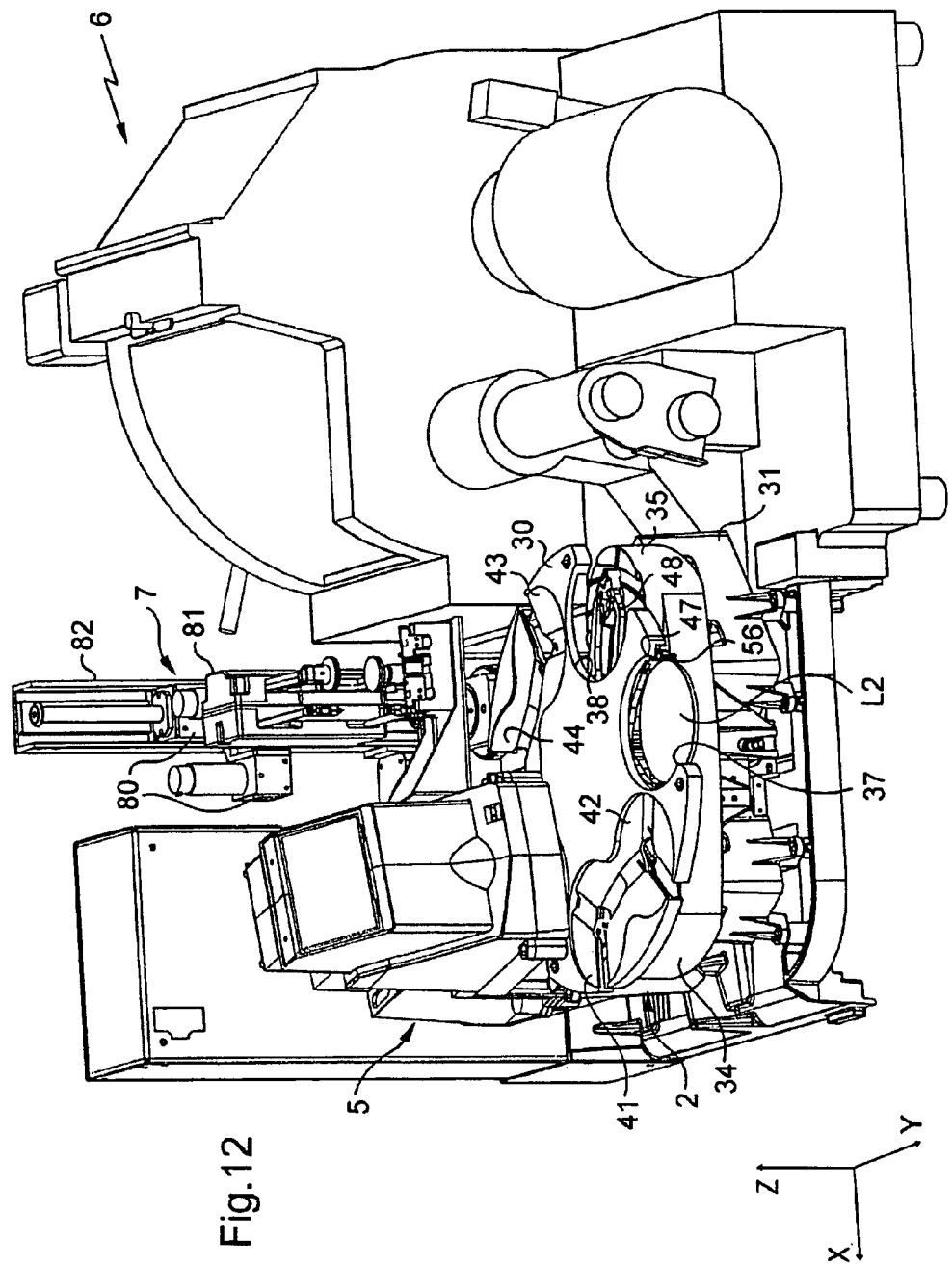
FIG. 12 is a perspective view of the preparation device in a configuration where the first lens, after a first transfer, is brought into a measurement position in register with measurement means for automatically measuring the centering characteristics of the lens.

The entire turntable 30 together with its clamps 46 to 48 is turned simultaneously so as to bring the first lens L1 of the first job into register with the measurement device 5 (FIG. 12). This turning of the turntable 30, when seen from above, takes place in the clockwise direction under the control of the electronic and computer system 100.

In the above-mentioned variant, during this turning movement, the clamps are guided by the crenellations 69 of the fingers 56 which co-operate with the beads 75, 76.

Step 7.1—The measurement device 5 reads the first lens L1 of the job J1.

The shape and the optics of the lens L1 are analyzed by the measurement device 5 automatically in the manner described above so as to provide the electronic and computer system 100 with data relating mainly to the optical powers and to the frame of reference of the lens (centering point and orientation). These optical power and reference characteristics are stored by the electronic and computer system 100.

In particular, the acquisition of the reference characteristics mentioned above makes it possible in association with the geometrical and morphological data acquired during the above-described preliminary step to determine the exact point whereby the ophthalmic lens L1 is gripped and blocked on the carousel of the receiver and first and second transfer means 2 moved into the intermediate position (as explained below), and to determine the cutting-out parameters so as to control the cutting-out device 6 accordingly while it is cutting the lens to shape.

The measurement device 5 thus also determines one or more local optical characteristics at one or more remarkable points of the lens that are of interest for characterizing or verifying the lens or the job. This or these characteristics are stored in a memory of the electronic and computer system 100. They are subsequently reprocessed (see in particular Step 9.1) by the electronic and computer system so as to be combined with or corrected as a function of geometrical data provided by the arm 7 performing its feeler function and relating to the position in three dimensions of the lens being prepared on the turntable 30 in a frame of reference associated with the measurement device 5.

Step 8.1—Second transfer of the first lens: turning the loading and unloading turntable 30 to enable the first lens L1 of the job J1 to be felt.

The turntable 30 is turned clockwise to bring the lens L1 into a so-called "intermediate" position in which said lens is close to the arm 7 so as to be accessible to said arm firstly to be felt thereby and secondly to be taken thereby, as explained in the following steps. During this second transfer, the turntable 30 is turned and monitored by the electronics for controlling rotation of the turntable 30 and the movement is stored in a memory of the electronic and computer system 100. Simultaneously, the position and the axis of the lens measured by the measurement device 5 during the preceding step are tracked and retained in memory.

Step 9.1—Determining the altitude (i.e. the axial position) of the optical center or reference center, and/or of any point of interest or any remarkable point (measurement point) of the first lens of the job J1.

The axial position or altitude of a remarkable point under consideration for measurement, specifically a point on the rear face of the lens L1, is determined in order to be combined with the local value at said measurement point of the optical characteristic of the lens as previously determined from the contactless optical measurement of step 7.1. A vertex optical power of the lens at this measurement point is deduced therefrom. Two methods are proposed for determining the axial position of the measurement point, one by feeling and the other by calculation.

In a first method, the axial position of the measurement point is determined by feeling the face concerned.

FIG. 19 shows the feeler, gripper, and transfer arm 7 while it is feeling the lens L1 in order to determine the height or altitude e of the lens L1 relative to the device 5 for measuring the level of one or more remarkable points on the lens in preparation by feeling, the points being those at which it is desired to make a measurement of one or more optical characteristics such as optical powers (i.e. vertex ophthalmic powers). One such remarkable point, for example, is the reference center CR (optical center for a single-vision lens and mounting cross for a progressive lens) on the concave face of the lens. More generally, this point which may be any point of interest where it is desired to measure a local, spherical, or cylindrical vertex optical power. Typically, it may be the optical center of a single-vision lens or the reference points for near and far vision for a progressive lens.

It is known that the spherical or cylindrical ophthalmic power is defined as the reciprocal of the distance between the focus(es) and the concave rear face of the lens. The measurement device 5 enables the position(s) of the focus(es) to be measured in the fixed frame of reference of the device. Feeling the concave face of the lens at the point of interest makes it possible to measure its position in the frame of reference, and thus the distance(s) between the measured focus(es) and the rear face of the lens.

More precisely, the procedure is as follows.

The measurement means 5 initially determine a local optical characteristic at one or more remarkable points of the lens that are of interest for characterizing or verifying the lens or the job. The characteristic is stored in a memory of the electronic and computer system 100.

The arm 7 performing its feeler function is controlled by the electronic and computer system 100 in order to determine the position, i.e. specifically merely the altitude, of the or each remarkable point on one of the faces of the lens.

In a second method, the axial position of the measurement point is determined by calculating the sagitta of the face under consideration of the lens at the measurement point (i.e. the altitude of the measurement point relative to a reference plane, for example the plane which contains the edge of the lens). To this end, the electronic and computer system 100 possesses means for accessing a data server, e.g. belonging to the manufacturer of the lens L1, from which it obtains the approximate geometrical characteristics of the lens L1, such as for example: the diameter of the lens as ordered; and the curvature of said lens; or more directly in the value of the sagitta of said lens at a remarkable point such as its top.

Since, during the optical measurement of step 7.1, the lens L1 rests on the turntable 30 that is of shape and in particular altitude that are known in the frame of reference of the measurement device 5, the electronic and computer system 100 deduces therefrom the looked-for axial position of the measurement point of the lens by adding the calculated sagitta to the known altitude of the turntable.

The diameter of the lens and its general or mean radius of curvature can be obtained directly when ordering the lens, these characteristics normally being input by the optician by using lens-ordering software connected directly to the electronic and computer processor system 100 in order to transmit the information.

Thus, for example, it is possible to calculate the sagitta of the lens at its top by using the following relationship:

$$F = Rar - (Rar^2 - (Db/2)^2)^{1/2}$$

where F designates the sagitta, Rar the mean radius of curvature of the rear face of the lens, and Db the diameter of the edge of the lens L1 before cutting out.

In analogous manner, the processor system 100 can calculate the sagitta of the lens L1 approximately at any measurement point of its face under consideration that has coordinates that are known in a plane perpendicular to the axis of the lens, i.e. specifically a horizontal plane. Knowing the radius of curvature Rar and the edge diameter Db, the processor system 100 can determine in particular the axial position (or specifically the altitude) of the far vision and near vision points of the lens L1 when the lens is of the multifocal type, the coordinates of these points being determined in the horizontal plane by the optical measurement device 5 while acquiring the frame of reference for centering the lens L1.

Whatever the method used for determining the axial position, this axial position is stored in the memory of the electronic and computer processor system 100 so as to be combined with the value previously stored in Step 7.1 for the local optical characteristic at the point in question. This combination is performed by software comprising calculation instructions which, by combining the position of the remarkable point as obtained by feeling with the local characteristic of the lens as determined by the optical measurement device 5, deduces therefrom the spherical and/or cylindrical powers of the lens at the remarkable point, e.g. the spherical powers at the reference points for near vision and for far vision. The spherical or cylindrical ophthalmic power is then calculated as being the reciprocal of the distance between the focus(es) and the concave rear face of the lens.

In practice, two modes of operation can be envisaged for calculating power.

In a first mode, the measurement device 5 determines the position of a focus of the lens at said remarkable point or point of interest. The calculation instructions of the program executed by the system 100 then deduce the focal length of the lens at the remarkable point in question by associating (or combining) the position of the remarkable point obtained by feeling with the position of the focus of the lens determined by the optical measurement performed by the measurement device 5. The program then calculates the vertex optical power as being the reciprocal of said focal length found in this way.

In a second mode, the measurement device 5 determines an approximate value for the power of the lens at a remarkable point of the lens. The calculation instructions of the program executed by the system 100 then corrects the approximate value for the power of the lens obtained by optical measurement as a function of the position of the remarkable point as obtained by feeling. This correction is carried out by the program by means of a mathematical correction formula resulting both from the approximation made during the optical measurement for evaluating the power at the point in question, and from the fact that the optical power is equal to the reciprocal of the focal length.

During this first feeling operation, only the concave (bottom) face 9 of the lens is felt by the tip 93 of the bottom branch 91. In a variant, it is naturally possible to feel the convex top face 8 of the lens L1 by means of the other tip 92 carried by the top branch 90 of the feeler means 85.

An improved technique for calculating power also makes it possible to correct for measurement errors that might occur when the optical axis of the lens L1 is oblique, i.e. is inclined relative to the optical axis of the optical measurement device 5, which axis is vertical in this example.

When the optical axis of the lens L1 is parallel to the optical axis of the optical measurement device 5, measuring the distance between the rear face of the lens and the focus gives the value of the ophthalmic power, as explained above. However, it can happen that the optical axis of the lens L1 is not parallel to that of the optical measurement device 5. This happens if the lens L1 is not properly positioned on the turntable or if it possesses high cylindrical power (astigmatism), causing its optical axis to be inclined relative to the plane containing its not-yet cut-out edge. This also applies when the lens L1 presents an edge of noncircular shape, implying that it is positioned on a plane that is inclined when it is resting on the turntable. Under such circumstances, the optical power as measured by the optical measurement device 5 includes errors because of the optical aberrations of the lens, which aberrations depend on the optical design of the lens (i.e. the shapes given to its front and rear faces in order to obtain the desired correcting optical function), and on the inclination of the optical axis of the lens relative to the optical axis of the measurement device 5.

The aberrations that generate measurement errors are mainly the field curvature aberration of the lens that tends to falsify the measured spherical power, and the astigmatism aberration that tends to induce an artificial cylindrical power, thereby falsifying the real value of the cylinder and also its axis.

Knowing the inclination of the optical axis of the lens L1 relative to the optical axis of the measurement device 5, and also knowing the optical characteristics of the lens L1 such as its spherical power, its cylindrical power, the orientation of the axis of its cylinder, its refractive index or its material, the curvature of its front face, and the curvature of its rear face, it is possible to calculate the error generated by the non-parallel optical axes of the lens and of the optical measurement device 5, and then to subtract said error from the measurements taken.

It is possible to subtract a correction value without knowing all of the characteristics of the lens, for example by using a mean correction that depends only on the spherical power of the lens and on its material.

The inclination of the optical axis of the lens can be measured by feeling at least three points that are in the vicinity of the optical center and that are not in alignment, for example three points lying on a circle having a diameter of 5 mm to 10 mm and centered on the optical center of the lens, these points being spaced apart by 120°. These three points define a plane and the perpendicular to said plane defines the optical axis of the lens.

With a progressive lens, where the centering point presents non-zero prismatic correction, measuring three points of the rear face gives the normal to the optical surface of the rear surface, while measuring on the front face gives the normal to the front optical surface, these two normals not being parallel because of the prism of the lens.

Consideration can be given either to the angle between the optical axis of the measurement device 5 and the normal to the front surface of the lens L1, or to the angle between the optical axis of the measurement device 5 and the normal to the rear face of the lens L1 when performing the power-correction calculation. The correction is preferably made with reference to the rear face of the lens L1, which corresponds to making a measurement under frontofocometer type conditions.

Step 10.1—Feeling the outline of the first lens L1 of the job J1.

Figure 16:
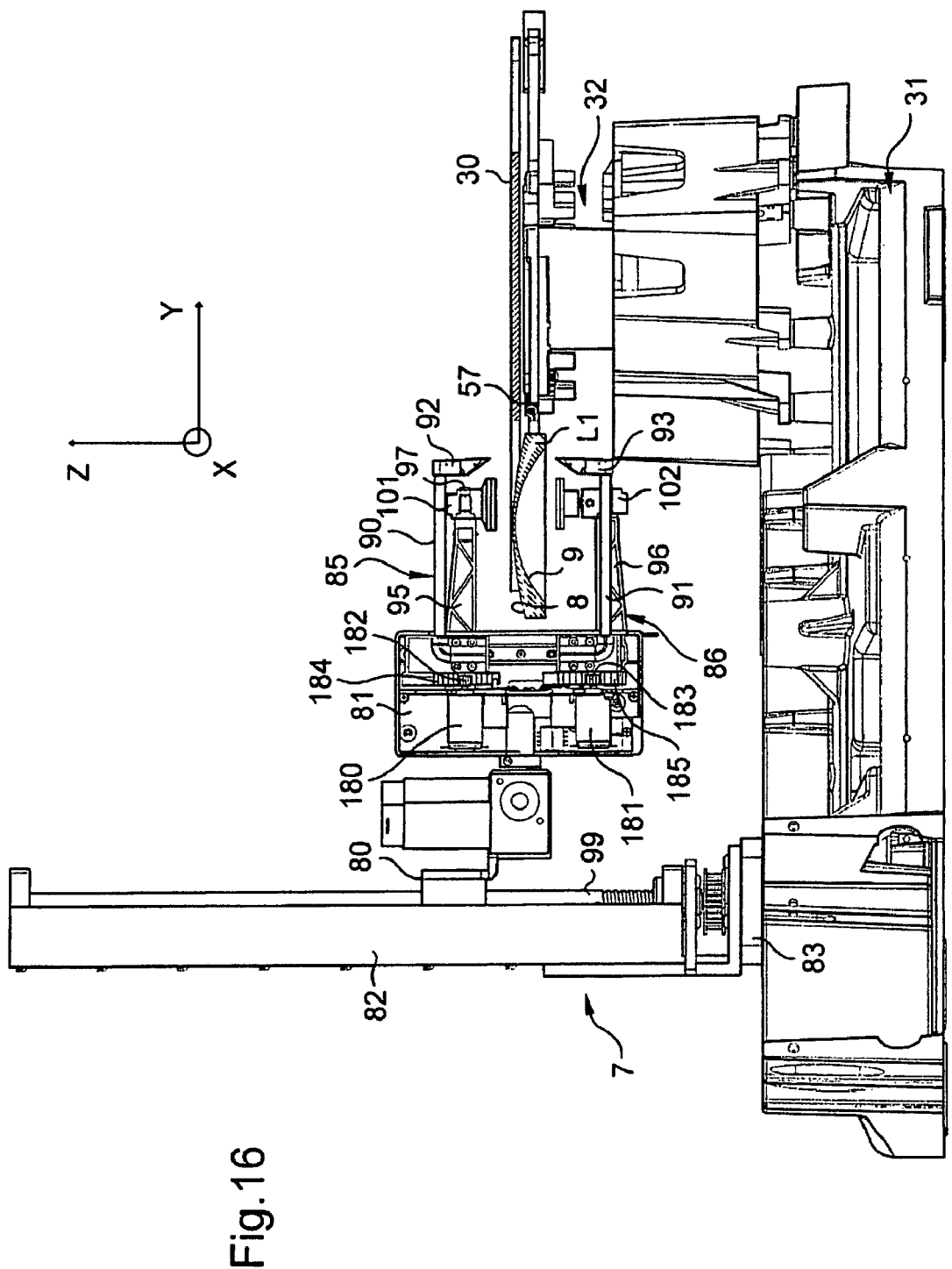
FIGS. 16 to 18 are cross-section views of the automatic preparation device of FIG. 15, the feeler, gripper, and third transfer means being shown in a plurality of successive lens-feeling configurations.
Figure 17:
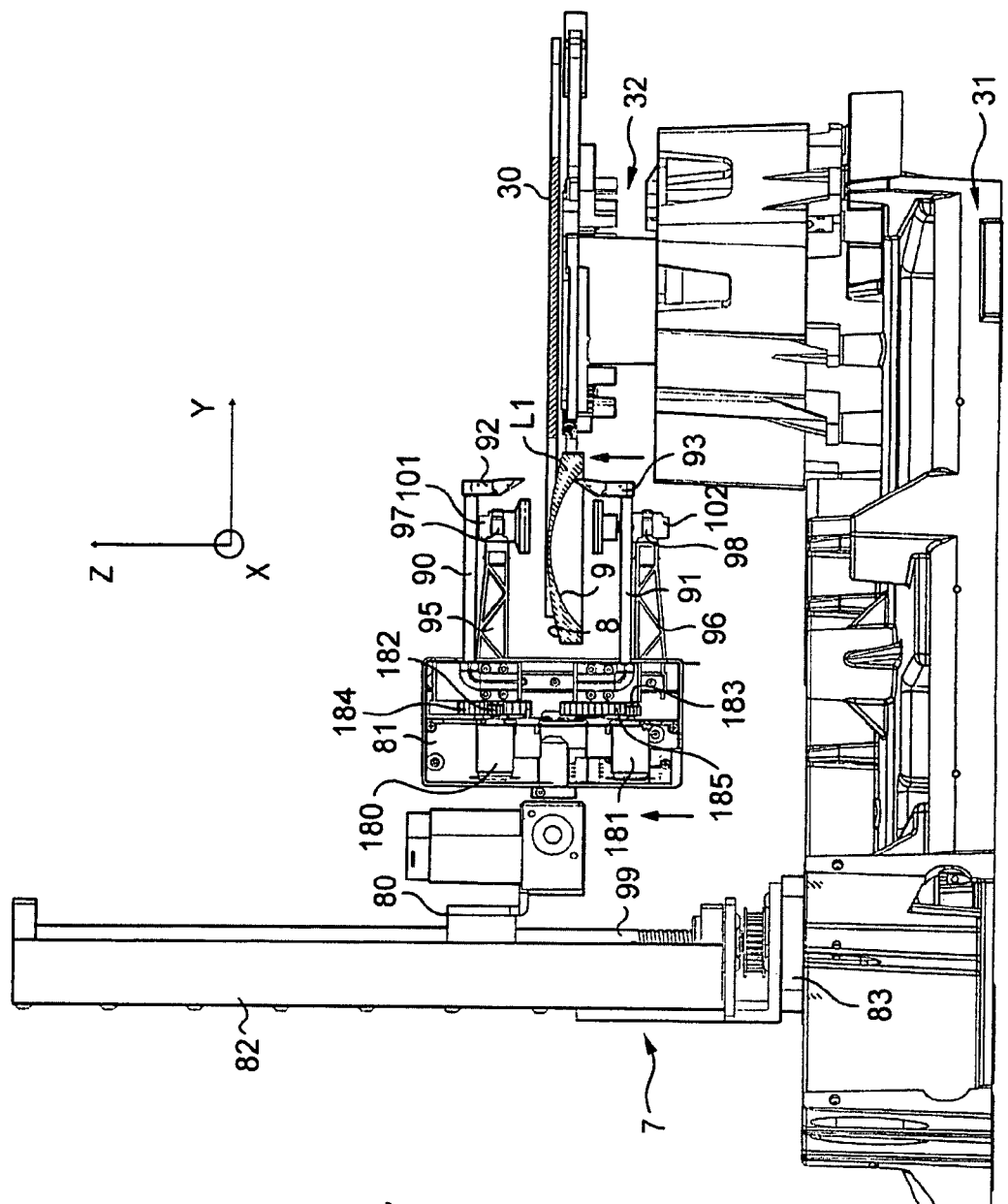
Figure 18:
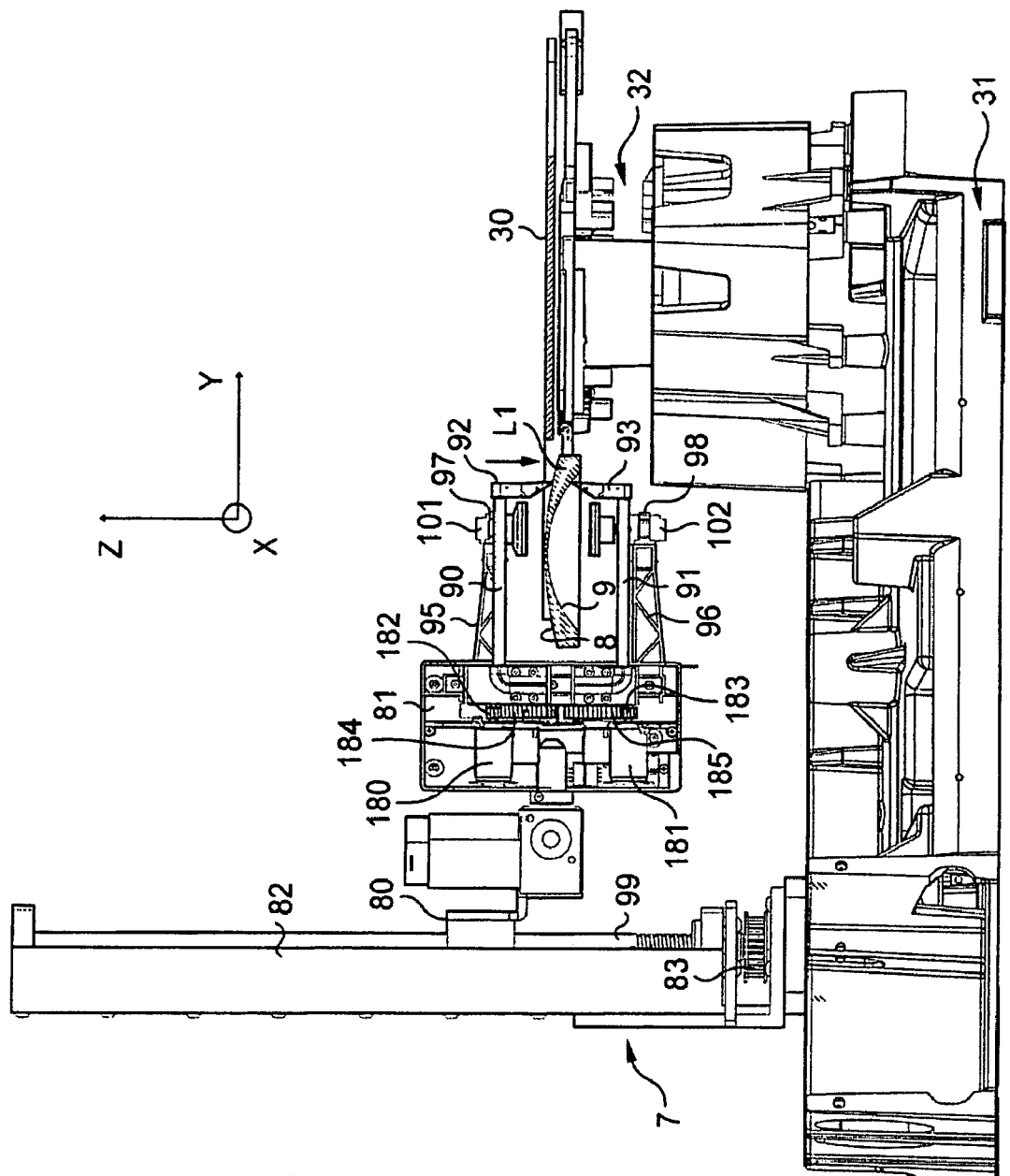

The feeler, gripper, and third transfer arm 7 then feels the outline intended for the lens after it has been cut to shape in order to verify that the lens presents sufficient surface and thickness to enable the desired lens to be obtained after being cut to shape in the cutting-out device 6. For example, the outline T is represented in FIG. 20, while FIGS. 16 to 18 show the approach movements of the tips 92, 93 of the feeler means 85.

The wrist 81 is initially moved to bring the two tips into the vicinity of the periphery of the lens. In the example shown, the bottom tip 93 (FIG. 17) is the first to be put into contact with the rear face 9 of the lens L1 by moving the branch 91 that carries this tip in translation. Then the top tip 92 is moved by moving the branch 90 in translation to feel the front face 8 of the lens (FIG. 18). The assembly is then moved by the wrist 81 so that the tips 92, 93 feel the outline of the lens. Nevertheless, this example is not limiting and an opposite solution could be envisaged with the top tip being the first to make contact, or indeed a combined solution with both tips being approached and put into contact simultaneously.

Step 11.1—Feeling a plurality of points in the vicinity of the boxing center of the first lens L1 of the job J1 and points for determining the normal at the boxing axis.

The boxing axis, as defined above for implementing the invention, is then determined by feeling (FIG. 21), using the tips 92, 93 brought successively into contact with the lens as in the preceding step, at a plurality of points (at least three points) situated in the vicinity of the boxing center CB, and specifically at four points A, B, C, and D.

Step 12.1—First transfer of the second lens: turning the loading and unloading turntable 30 to bring the second lens L2 of the job J1 into the measurement device 5.

Step 13.1—Reading the second lens L2 of the job J1 in the measurement device 5.

Step 14.1—Second transfer of the second lens: turning the loading and unloading turntable 30 to go into the intermediate position in order to feel the second lens L2 of the job J1.

Step 15.1—Feeling the second lens L2 of the job J1 at its optical center.

Step 16.1—Feeling the outline of the second lens L2 of the job J1.

Step 17.1—Feeling a plurality of points in the vicinity of the boxing center of the second lens L2 of the job J1 and feeling points for determining the normal at the boxing axis.

Step 18.1—Comparing the characteristics of the first job J1 with the input data.

The internal program of the electronic and computer system 100 carries out a confirmation examination, automatically or with assistance, on the characteristics of the two lenses L1 and L2 of the job J1. This confirmation examination consists in making two verifications:

firstly individual verification that the characteristics of each lens of the job comply with the prescription input by the operator into the memory of the electronic and computer system; and secondly, checking that the overall characteristics of both lenses considered as a single job, i.e. as a function of belonging to the same pair of eyeglasses, make sense, in particular by simulating mounting the two lenses on the selected frame and verifying that such mounting is possible.

The characteristics for which each lens is validated individually are in particular:
  type of lens: single-vision, progressive, bi- or trifocal, etc.;
  spherical, prismatic, cylindrical powers;
  power addition(s) for progressive lenses;
  cylinder and prism axes;
  hue;
  index;
  material.

The characteristics for which the two lenses of the pair are considered together as belonging to the same job are in particular:
  the centering of each lens on the frame as a function of the frame of reference defined by means of the measurement device 5 for each lens, and the pupillary half-distances and heights specific to the user, this centering making it possible to simulate mounting of the lenses on the frame for which they are intended, as explained in greater detail below;
  the intended axial position for the bevel or groove on the edge face of each lens relative to the front face of the lens, in order to ensure that the mounted frame is pleasing in appearance (balanced axial positioning for the two lenses relative to each other on the frame);
  matching of the hues, indices, shades of the two lenses of the job; and
  complementarity of the two lenses, checking they both belong to the same job: it is verified that the job is indeed made up of a right lens and a left lens and that these two lenses do indeed correspond to a single job.

In particular, the overall reconciliation of the identification characteristics of the job is performed as follows. Starting from information representative of the parameters specific to the morphology of the user, in particular the pupillary half-spacing and the pupillary height relative to the horizontal axis, and starting from information representative of the outline of the selected frame, acquired during the above-described preliminary step, the electronic and computer system 100 generates a video image that is displayed on the display screen such as an LCD screen (not shown). Consequently, there can be seen on the screen, specifically the outline of the frame and the outline of the lens prior to being cut to shape, both being shown at the same scale, together with the special characteristics of the lens, in particular the identification points that are marked thereon or those that have been determined by using the measurement device. Taking account of all of these items, whether measured, calculated, or read, makes it possible to determine the position of the perimeter of the lens as cut to shape compared with the initial ophthalmic glass, and as a result the position of the point where the lens should be gripped for cutting-out purposes, which is generally the center of the rectangle in which the outline of a rim of the frame is inscribed.

The electronic and computer system 100 performs computer processing on this geometrical and morphological data in association with the data relating to the identification characteristics of the ophthalmic lenses L1 and L2 of the job J1 taken together in order to simulate mounting them in the corresponding rims C1 and C2 of the selected frame M, and possibly modifying their centering. FIGS. 39 and 40 are diagrams showing different steps in this combined centering of a pair of ophthalmic lenses constituting a single job in the rims of a frame selected by the user.

As shown in FIG. 39, each ophthalmic lens L1, L2 is positioned in each of the rims C1, C2 so as to make the optical center or reference center CR thereof (mounting cross 11, FIG. 35, if the lens L1 is a progressive lens) coincide with the determined position of the pupil P1, P2 of the user relative to the rim C1, C2 of the frame M. When the initial diameter of the ophthalmic lenses L1, L2 is too small relative to the rims C1, C2 of the selected frame M, then a gap is created between the rim C1, C2 of the frame M and the edge B1, B2 of the lens L1, L2.

Initially, both ophthalmic lenses L1, L2 are displaced (virtually) together (in this case along arrow F) while keeping constant the relative centering height H of the two ophthalmic lenses (the relative height being defined as the difference between the centering heights H of the two ophthalmic lenses) and also keeping constant the pupillary distance D between the two optical centers or reference centers CR of the ophthalmic lenses L1, L2 as positioned during the above step so as to eliminate the points of intersection found between each of the rims C1, C2 of the frame M and the edges B1, B2 of the ophthalmic lenses.

Nevertheless, if after such (virtual) displacement of both ophthalmic lenses L1, L2 there still remain points of intersection between at least one of the rims C1, C2 of the frame M and the edge B1, B2 of the corresponding ophthalmic lens L1, L2, then in a second stage, one of the two lenses or both of the ophthalmic lenses L1, L2 is/are moved while conserving the relative centering height H of the ophthalmic lenses and slightly modifying the pupillary distance between the two optical centers or reference centers of the ophthalmic lenses as positioned in the preceding step in order to eliminate all points of intersection between each rim of the frame and the edge of the corresponding ophthalmic lens.

Under all circumstances, it is preferable, although not essential during combined (virtual) displacement of said ophthalmic lenses L1, L2, to conserve the relative centering height H of said lenses so that once the ophthalmic lenses L1, L2 have been mounted in the rims C1, C2 of the selected frame, both optical or reference centers CR of the ophthalmic lenses L1, L2 and the pupils P1, P2 of the user are situated on the same horizontal or level line (see FIG. 40) even if they do not coincide.

As shown in FIG. 40, since the height H and the pupillary distance D are conserved, the user need only look a little to the left or the right in order to obtain correct vision at infinity.

At worst, if the pupillary distance between the ophthalmic lenses for mounting is not complied with, the user will be obliged to converge or diverge the eyes slightly when looking at infinity.

The electronic and computer system 100 displays the values of the prisms induced for each eye by any modification to the centering of each lens in the frame. It is then up to the optician to determine whether these values are acceptable or not, and, on that basis, accept or refuse the job as recentered in this way. The system may optionally itself refuse a job or warn the optician via a graphical and/or audible interface in the event of at least one of these values exceeding a maximum threshold value. Provision can also be made for the electronic and computer system 100 to accept a job automatically if the induced prism values are less than a predetermined threshold value.

The electronic and computer system 100 also verifies that each near vision zone 14 (FIG. 36) is properly situated within the cutout perimeter of the lens and it enables the optician to verify this visually by displaying the corresponding zone.

Finally, the electronic and computer system 100 compares by calculation and/or displays for comparison by the optician's judgment, the axial position intended for the bevel or the groove on the edge face of each of the two lenses. This serves to assess the expected axial position of each of the two lenses when mounted in the frame, or in other words the positions of the rims or rimless strings of the frame relative to the front faces of the lenses. This calculation or visual comparison seeks to ensure that the positions of the rims or rimless strings of the frame are homogenous relative to the front faces of the lenses so as to avoid excessive asymmetry in the axial positioning of the left and right lenses relative to each other. Where appropriate, the axial position of a bevel or a groove in one or other of the two lenses may be modified.

Alternatively, it can also happen that mounting the lenses L1, L2, or at least one of them, is not possible or desirable because of some mechanical impossibility or because of the visual discomfort that such mounting would inflict on the user.

Step 19.1—Accepting or refusing the first job J1

The job J1 is accepted or refused depending on whether the above-mentioned individual and overall characteristics are or are not validated and/or modified.

Alternative 1: If the first job J1 is refused (alternative 1), then the five following steps are performed. Otherwise they are ignored.

Step 20.1—Turning the loading and unloading turntable 30 to bring the first job J1 into register with the access door 26 (fifth transfer).

Step 21.1—Opening the clamps of the loading and unloading turntable 30 and raising the seats of the lenses to the high position.

Step 22.1—Opening the access door under the control of the operator.

Step 23.1—The operator removing the first job J1.

Step 24.1—Loading the following job for processing, in the manner described at Step 3 et seq.

Alternative 2: If the first job J1 is accepted (alternative 2 being the more probable), the five preceding steps are ignored and the following steps are performed.

Step 25.1—The loading and unloading turntable 30 is turned so as to present the first lens L1 of the job J1 in the intermediate position so that it can be taken by the feeler, gripper, and third transfer arm 7 (end of second transfer).

Step 26.1—Selecting and clipping machining chucks by the feeler, gripper, and third transfer arm 7 in the chuck magazine 130.

In practice, the two preceding steps are performed simultaneously with Step 18.1 and/or 19.1 in which the characteristics are compared and the job is accepted or refused. Steps are thus performed in parallel in order to save time, given that the first job J1 will usually be accepted.

Step 27.1—The first lens L1 of the job J1 is taken by the feeler, gripper, and third transfer arm 7.

After performing the above-described feeling operations, the feeler, gripper, and third transfer arm 7 sandwiches the lens L1 between the two chucks 101 and 102.

Figure 14:
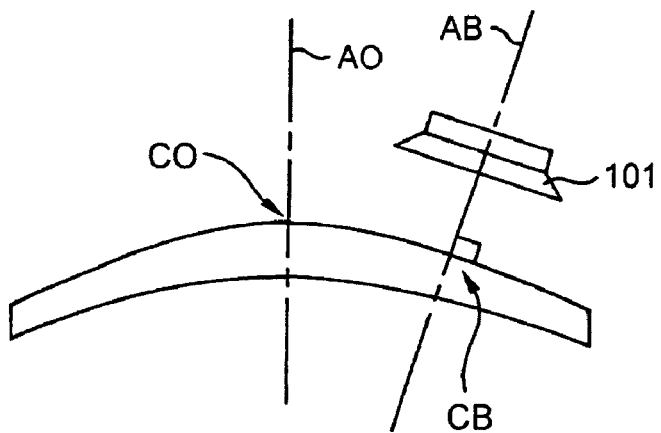
FIG. 14 is a diagrammatic side view of the lens with its associated optical axis and boxing axis (defined below)

A blocking axis AB (FIG. 14) is defined above referred to as the boxing axis, being the axis that is normal to the front face of the lens and that passes through the boxing center CB. In order to avoid positioning errors, the top chuck 101 engages the convex front face of the lens by moving in translation along said boxing axis AB of the lens and it remains pressed against the lens, being held on said axis. The surface of the chuck 101 is moved towards the front face of the lens 8 while already parallel to the plane that is tangential to said lens at the boxing center CB (FIG. 14). Docking occurs when the set of points constituting the application surface 165 of the chuck 101 makes overall and simultaneous contact with the facing face of the lens, without any tilting. This avoids any offset or angular tilt error occurring during docking of the chuck against the lens. Because of this precision, it is possible to rework the lens subsequently because any risk of positioning error is eliminated.

These docking movements and this blocking configuration are made possible by the numerous degrees of freedom of the wrist 81. As shown in FIGS. 22 to 24, the movement of the wrist 81 is adapted to begin by moving up the top chuck 101. The top jaw 95 is stationary relative to the wrist, and the chuck 101 is moved up to the lens by moving the wrist 81 in translation and in rotation.

Thereafter, the screw 99 causes the bottom jaw 96 to move in translation (FIG. 24) so as to move the second chuck 102 up to the lens in the same manner along the boxing axis AB. As can be seen more clearly in FIG. 30, the ball mount of the chuck 102 makes it possible for this chuck, while it is docking against the rear face 9 of the lens, to take up the local angular orientation of said rear face 9 of the lens so as to enable the lens to be blocked against the other chuck 101 which is rigidly connected to the top jaw 95, without modifying in uncontrolled manner the position of the lens as would happen by causing it to tilt angularly or to slide transversely.

The two chucks are then accurately engaged against the lens which is held firmly. This procures blocking to the lens that is stable and accurate on the boxing axis, without any geometrical error.

In this stage of the lens being held by the gripper means, it should be observed that the frame of reference of the lens, defining its centering and its orientation (the direction of its axis) and that has been measured by the measurement device 5, is conserved or tracked by the electronic and computer system 100 during the second transfer of the lens by the turntable 30 between the measurement position and the intermediate position. The chucks, presenting fastening configurations on the jaws 95 and 96 of the arm that are accurately known by construction, are thus engaged against the lens so as to take hold of it in a configuration (positioning in the plane of the lens and orientation) that is known relative to the frame of reference of the lens. The chucks 101, 102 are thus implanted against the lens with an orientation and a position in the plane of the lens that can be arbitrary but that is always accurately known and stored in a memory of the electronic and computer system 100.

Specifically, when clamping the chucks 101, 102 against the lens, no provision is made for adjusting the angular orientations of the chucks relative to the lens about the common blocking axis AB. These orientations, which can be arbitrary, are stored and embodied by the chucks themselves (ignoring a constant, but known angular offset). This known angular offset is taken into account while cutting out the lens.

Nevertheless, in certain particularly difficult circumstances or in order to further improve the accuracy and security with which the chucks are placed, in particular when reworking a lens in order to make a correction, it is also possible to stick an adhesive centering pad 145 on the lens while simultaneously clamping the chucks against the lens.

When the operator has loaded an adhesive centering pad 145 simultaneously with loading a job on the turntable 30, the measurement device 5 detects the light 142 being obstructed by said pad and informs the electronic and computer system 100.

In the absence of a pad on the tenon 140, the manipulator arm 7 is controlled by the system 100 to engage the blocking chuck 101 on its own.

If the presence of the reference pad 145 is detected, then the manipulator arm 7 is controlled to engage the reference pad 145 on the lens together with the blocking chuck 101. The feeler, gripper, and third transfer member 7 is then controlled by the system 100 in order to take hold of the pad so as to engage it against the front face 8 of the lens. More precisely, the feeler, gripper, and third transfer member 7 brings the chuck 101 up to the pad on the turntable and lowers the chuck 101 so that it becomes engaged with a small amount of grip on the pad, via the central housing 144 formed in the peg 161 of the chuck 101. The pad is thus a tight or snug fit in the chuck 101 and it is conveyed therewith towards the lens that is to be held and blocked. While the chucks 101, 102 are being clamped onto the lens by the branches 95, 96 of the member 7, the adhesive face 147 of the pad comes into contact with the convex front face of the lens, and it adheres thereto. The pad 145 then remains engaged on the prepared ophthalmic lens until it is voluntarily removed therefrom by the operator, and while it is engaged thereon it embodies the centering or identification frame of reference of the lens as measured by the measurement device 5, thus enabling the lens to be reworked on one or more occasions.

By proceeding in this way, the centering frame of reference of the lens is embodied by the stuck-on pad 145, as is usually the case. However, in accordance with the invention, this centering function is dissociated from the blocking function proper that serves to transmit torque by preventing the lens from turning relative to the shafts 612, 613 of the edger. This torque transmission function is always provided by the chucks 101, 102 which are of shape, dimensions, and material that are adapted to the lens that is to be cut out.

Step 28.1—Opening the clamp holding the first lens L1 of the job J1 on the turntable.

Step 29.1—Third transfer of the first lens L1 of the job J1 for the go relay handover from the carousel to the cutting-out means.

The lens L1 is then moved by the feeler, gripper, and third transfer arm 7 (FIG. 5) so as to be taken off the loading and unloading turntable 30. Thereafter, the lens is transferred by said member 7 to the cutting-out device 6, as shown in FIGS. 26 and 27.

FIG. 28 shows the final stage of the transfer during which the lens L1 is held simultaneously by the feeler, gripper, and third transfer arm 7, and by the shafts 613, 612 of the cutting-out means 6. In this state, the chucks 101, 102 are held by transverse clip-fastening by the top and bottom jaws 95 and 96 of the wrist 81, and by axial blocking by means of the shafts 613, 612 along the boxing axis, the shafts 613, 612 keeping the lens that is to be cut out clamped in a sandwich between the two chucks 101, 102 via its center.

The wrist is then controlled to move so as to withdraw transversely and disengage the jaws 95 and 96 away from the chucks 101, 102 so that the lens remains held merely between the chucks, on the cutting-out device (FIG. 29). During this transfer, there is no loss of frame of reference since the chucks remain permanently in identified positions that belong, so to speak, both to the gripper arm and to the clamping and drive shafts of the cutting-out device. Given that the frame of reference of the lens has already been stored in memory, the electronic and computer system 100 deduces therefrom the position and the orientation of the frame of reference of the lens in the frame of reference of the cutting-out device.

FIG. 30 is a longitudinal section of the two shafts 613, 612 in engagement with the two chucks 101, 102 by mutual inter-fitting.

Step 30.1—Feeling the first lens L1 of the job J1 in the cutting-out device 6.

Prior to machining and in order to ensure that machining is accurate, the first lens L1 of the job J1 is felt while it is installed in the cutting-out device 6 by being blocked and rotated between the shafts of the edger, feeling being performed by the feeler, gripper, and third transfer arm 7. This feeling is carried out along the desired outline that it is assumed the lens will have after being cut out (taking account of the lens being transferred without losing its frame of reference) and as a function of the identification characteristics of the lens provided by the measurement device 5 and the morphological data of the user and the shape of the frame as input into the memory.

This feeling makes it possible to acquire in the memory of the electronic and computer system 100, concretely and with great precision, the three-dimensional configuration of the lens blocked between the shafts of the edger, with account being taken of any deformation to which the lens might be subjected due to the lens being clamped between the chucks under thrust from the shafts. The electronic and computer system 100 then deduces therefrom by calculation the precise parameters for machining: the outline of the lens, the three-dimensional shape of the bevel or the groove, and the position and orientation of the drill holes.

Step 31.1—Machining (cutting out) the first lens L1 of the job J1 in the cutting-out device 6.

The electronic and computer system 100 controls the cutting-out device 6 to machine the periphery of the lens so as to cut it out to the desired outline, given the identification characteristics of the lens as supplied by the measurement device 5 and the data concerning the morphology of the user and the shape of the frame as input into the memory.

Depending on the type of frame for which the job J1 being processed is intended (frame with rims, frame without rims and having drilled lenses, frame with rims constituted by Nylon string), the lens is beveled, drilled, or grooved.

Step 32.1—Positing the loading and unloading turntable 30 for removal of the first lens L1 of the job J1 by the feeler, gripper, and first transfer arm 7.

The loader and unloader turntable 30 is turned so as to bring the unloading place into register with the cutting-out means 6, in a predetermined position where the arm 7 will place the cutout lens.

Step 33.1—Fourth transfer of the first lens L1 of the job J1 to pass the lens back from the cutting-out means to the carousel.

After being cut out by the cutting-out device 6, the lens is taken hold of again by the feeler, gripper, and third transfer arm 7 so as to be placed on an unloading place in one of the pairs of unloading places 41 to 44 (FIG. 33).

The lens L1 is taken by the feeler, gripper, and third transfer arm 7 while still in the cutting-out device 6 so as to enable it to be put on an unloading place of the loading and unloading turntable 30. This step is performed simultaneously with the preceding step so as to be performed in parallel, thus saving overall processing time. Naturally, the turning of the loading and unloading turntable to bring it into position is terminated before the lens is put into place by the arm 7.

This shows the advantage of the particular arrangement of the loading and unloading turntable with its three loading faces and its four unloading faces.

Step 34.1—Placing the first lens L1 of the job J1 in the unloading place on the turntable of the carousel.

In order to place the cutout lens L1 on one of the unloading recesses 42 to 44, the arm 7 presents the lens horizontally and outside the turntable 30, slightly above it, so that the bottom chuck engaged with the lens is situated radially in register with the outside end of the tongue 49 associated with the radial slot 45 of the unloading recess concerned. The wrist 81 of the arm is then moved in a radial direction of the turntable 30 so that the bottom chuck penetrates into the turntable 30 via the radial slot 45, pushing the tongue 49 into the retracted position against its return spring.

When the axis of the chuck reaches the center of the unloading recess concerned, the arm moves downwards in order to place the lens on the turntable. Thereafter, the bottom jaw 96 of the arm 7 is loosened so to release the lens, and the wrist 81 of the arm 7 withdraws radially outwards so as to disengage the turntable 30, allowing the tongue 49 to return to its outer position overlapping the slot 45.

Step 35.1—Turning the loading and unloading turntable 30 to present the second lens L2 of the job J1 in the zone for being taken by the feeler, gripper, and third transfer arm 7 (end of second transfer).

Step 36.1—Taking the second lens L2 of the job 1 by the feeler, gripper, and third transfer arm 7 along the boxing axis.

Step 37.1—Third transfer of the second lens L2 of the job J1 for the go transfer of the lens L2 from the carousel to the cutting-out means.

Step 38.1—Feeling the second lens L2 of the job J1 in the cutting-out device 6.

Step 39.1—Machining the second lens L2 of the job J1.

Step 40.1—Fourth transfer of the second lens L2 of the job J1 to return the lens L2 form the cutting-out machine back to the carousel.

Step 41.1—Placing the second lens L2 of the job J1 on the unloading place of the loading and unloading turntable 30.

Step 42.1—Fifth transfer: turning the loading and unloading turntable 30 to present the first job J1 for unloading by the operator.

Step 43.1—Opening the access door 26 to unload the first job J1.

The access door 26 is opened to allow the operator access to the prepared job J1 at the request of the operator and under the control of the electronic and computer system 100 that allows the door to be opened only when the turntable 30 is in the loading and unloading position.

Step 44.1—Unloading the first job J1 by the operator.

It is then possible to proceed with loading and processing another job (third job J3). The cycle then restarts at step 4.

Processing a Second Job (Job J2) Parallel with a First Job (Job J1) Itself Being Processed)

In accordance with an advantageous aspect of the method, partially simultaneous processing is proposed of two jobs (pairs of lenses each associated with a respective pair of eyeglasses).

FIG. 43 shows that the device 1 advantageously enables two jobs to be processed simultaneously. A second job can be loaded on the loading places 37, 38 while the first lens of the first job is in the cutting-out device 6 and the second lens of that first job is being processed by the measurement device 5.

Under such circumstances, the processing of the first job J1 takes place as described above, and the steps of the following job J2 are analogous. The processing of the second job J2 then comprises steps referenced 1.2 to 44.2 which are analogous respectively to the steps 1.1 to 44.1 for processing the first job J1.

Nevertheless, the invention makes provision for processing the two jobs in parallel, at least in part. In other words, certain steps of the processing of job J2 take place simultaneously with other steps in the processing of the job J1.

The processing of the second job can begin as soon as the go relay handover has been accomplished for the first lens L1 for the first job J1 from the loading and unloading turntable to the cutting-out means 6, as provided for in step 29.1. A corresponding loading place on the loading and unloading turntable 30 is then left empty by the first lens L1 of the first job J1.

The processing of the second job J2 then takes place in parallel with the steps 30.1 et seq. of the processing for the first job J1.

More precisely, the steps going from step 1.2 of presenting the loading and unloading turntable 30 in the loading position to step 19.2 of accepting or refusing the job J2 are performed in parallel with the step 31.1 of machining the lens L1 of the job J1.

The following steps going from step 25.2 of selecting the machining chucks to the end of processing job J2 are performed after step 41.1 of placing the second lens L2 of the job J1 on the unloading plate of the loading and unloading turntable 30.

The invention claimed is:

1. A method of measuring a local power of an ophthalmic lens at a measurement point, comprising a step of contactless optical measuring of a local value of a position of a focus of said lens at said measurement point of said lens, this step of contactless optical measuring, comprising:
    overall optical measuring during which local values of the position of the focus of the lens are measured at a plurality of local zones around a plurality of points of the lens, including the measurement point in question and other points;
    selecting the measurement point desired for the lens; and
    deducing the local value of the position of the focus at said measurement point of the lens from the overall measurement,
    the method further comprising at least one step of determining an axial position of said measurement point on one of faces of the lens by feeling the face concerned with a means for feeling, and one step of combining the axial position of the measurement point as obtained with the local value of the position of the focus of the lens at the measurement point as determined from the contactless optical measurement, in order to deduce at least one vertex optical power of the lens at the measurement point.

2. The measurement method according to claim 1, in which the lens is received on a support having a known axial position, and the axial position of the measurement point is determined by calculating the sagitta of the lens face under consideration, at the measurement point.

3. The measurement method according to claim 1, in which the axial position of the measurement point is determined on the rear face of the lens.

4. The measurement method according to claim 1, in which:
    during said measuring step, an approximate value is determined for a power of the lens at a measurement point of the lens; and
    the approximate value for the power of the lens as obtained by measurement is corrected as a function of the axial position of the measurement point.

5. The measurement method according to claim 1, in which the axial position of the measurement point of the lens is the only geometrical characteristic of the measurement point of the lens that is used for determining the vertex optical power at said measurement point.

6. A method of automatically preparing an ophthalmic lens for mounting, the method comprising the measurement method according to claim 1 and further comprising:
    blocking said lens on cutting-out means; and
    cutting out said lens, a feeling of said lens comprising a first feeling step prior to blocking said lens on the cutting-out means.

7. The measurement method according to claim 1, in which the lens is received on a support prior to being felt with said feeler means that are distinct from said support and that are movable relative to said support in at least one substantially axial direction of the lens.

8. The measurement method according to claim 7, in which the feeler means are also movable in a substantially transverse direction of the lens.

9. A device for measuring a local power of an ophthalmic lens (L1, L2, L3) at a measurement point, the device comprising:
    contactless optical measuring means (5) suitable for delivering a signal representative of an overall optical measurement, having local values of a position of a focus over a plurality of local zones around a plurality of points of the lens, including the measurement point under consideration and other points;
    an electronic and computer processor system (100) suitable for processing the signal delivered by the overall optical measurement means (5), to select a desired measurement point of the lens to deduce from the overall measurement the local value of said position of the focus at said measurement point of the lens; and
    feeler means (7) for feeling said lens and suitable for determining an axial position of said measurement point one of the faces of the lens,
    the electronic and computer processor system (100) including calculation instructions for combining the axial position of said measurement point obtained by feeling with the local value of the position of the focus of the lens at the measurement point as determined by the electronic and computer system (100) on a basis of the signal delivered by the overall optical measurement means (5), to deduce therefrom at least one optical power of the lens at said measurement point.

10. The measurement device according to claim 9, in which:
    the measurement means (5) are suitable for determining an approximate value for the power of the lens at a measurement point of the lens; and
    the calculation instructions of the electronic and computer system (100) correct the approximate value of the power of the lens as obtained by measurement as a function of the position of said measurement point as obtained by feeling.

11. The measurement device according to claim 9, in which said feeler means are movable relative to the support in at least one substantially axial direction of the lens.

12. A device for automatically preparing an ophthalmic lens for mounting, the device comprising the measurement device according to claim 9, and further comprising:
    cutting-out means (6) for cutting out said lens and including blocking means (613, 612) for blocking said lens; and
    transfer means (2, 7) for transferring said lens and arranged to move said ophthalmic lens between at least two distinct positions, including a measurement position presenting said lens in register with the measurement means (5), and a cutting-out position for cutting out said lens on the cutting-out means (6).

13. The measurement device according to claim 11, in which the feeler means (7) are also movable in a substantially transverse direction of the lens.

14. The device according to claim 12, in which the electronic and computer processor system (100) is designed to control the measurement means (5), the feeler means (7), the cutting-out device (6), and the transfer means (2, 7) in coordinated manner for processing said lens automatically.

15. The device according to claim 14, in which the feeler means (7) are distinct from and independent of the cutting-out means (6) and are arranged to perform a first feeling operation of said lens in an intermediate position that is distinct from its cutting-out position.

16. The device according to claim 15, for automatically preparing a lens for mounting, in which the axial position of the measurement point of the lens is the only geometrical characteristic of the measurement point of the lens that is used for deducing the vertex optical power of the lens at said measurement point.

17. A device for measuring a local power of an ophthalmic lens (L1, L2, L3) at a measurement point, the device comprising:

contactless optical measuring device (5) configured for delivering a signal representative of an overall optical measurement, having local values of a position of a focus over a plurality of local zones around a plurality of points of the lens, including the measurement point under consideration and other points;

an electronic and computer processor system (100) configured for processing the signal delivered by the overall optical measurement device (5), to select a desired measurement point of the lens to deduce from the overall measurement the local value of said position of the focus at said measurement point of the lens; and a feeler (7) configured for feeling said lens and suitable for determining an axial position of said measurement point one of the faces of the lens, the electronic and computer processor system (100) including calculation instructions for combining the axial position of said measurement point obtained by feeling with the local value of the position of the focus of the lens at the measurement point as determined by the electronic and computer system (100) on a basis of the signal delivered by the overall optical measurement device (5), to deduce therefrom at least one optical power of the lens at said measurement point.

18. The measurement device according to claim 17, in which:

the measurement device (5) is configured for determining an approximate value for the power of the lens at a measurement point of the lens; and the calculation instructions of the electronic and computer system (100) correct the approximate value of the power of the lens as obtained by measurement as a function of the position of said measurement point as obtained by feeling.

19. The measurement device according to claim 17, in which said feeler is movable relative to the support in at least one substantially axial direction of the lens.

20. The measurement device according to claim 19, in which the feeler (7) is also movable in a substantially transverse direction of the lens.

* * * * *